US012683294B2

(12) United States Patent
Zhou et al.

(10) Patent No.: US 12,683,294 B2
(45) Date of Patent: Jul. 14, 2026

(54) TERMINAL ANTENNA AND HIGH ISOLATION ANTENNA SYSTEM

(71) Applicant: Honor Device Co., Ltd., Shenzhen (CN)

(72) Inventors: Dawei Zhou, Shenzhen (CN); Yuanpeng Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 299 days.

(21) Appl. No.: 18/258,285

(22) PCT Filed: Dec. 8, 2022

(86) PCT No.: PCT/CN2022/137647
§ 371 (c)(1),
(2) Date: Jun. 19, 2023

(87) PCT Pub. No.: WO2023/207117
PCT Pub. Date: Nov. 2, 2023

(65) Prior Publication Data

US 2024/0388011 A1 Nov. 21, 2024

(30) Foreign Application Priority Data

Apr. 29, 2022 (CN) ........................ 202210474925.4

(51) Int. Cl.
*H01Q 5/35* (2015.01)
*H01Q 1/52* (2006.01)
*H01Q 5/307* (2015.01)
*H01Q 5/342* (2015.01)
*H01Q 5/357* (2015.01)
(Continued)

(52) U.S. Cl.
CPC ............ *H01Q 21/28* (2013.01); *H01Q 1/521* (2013.01); *H01Q 7/00* (2013.01); *H01Q 9/0414* (2013.01); *H01Q 9/065* (2013.01)

(58) Field of Classification Search
CPC .......... H01Q 1/52; H01Q 1/521; H01Q 5/35; H01Q 5/342; H01Q 5/357; H01Q 7/00; H01Q 9/065; H01Q 9/20; H01Q 9/42; H01Q 21/28
See application file for complete search history.

(56) References Cited

U.S. PATENT DOCUMENTS 10,535,921 B2 * 1/2020 Hu .......................... H01Q 9/20
12,283,743 B2 * 4/2025 Wang .................. H01Q 9/0421
(Continued)

FOREIGN PATENT DOCUMENTS

CN 110137664 A 8/2019
CN 112216980 A 5/2021
(Continued)

*Primary Examiner* — Dimary S Lopez Cruz
*Assistant Examiner* — Marin Stoytchev Stoytchev
(74) *Attorney, Agent, or Firm* — Slater Matsil, LLP

(57) ABSTRACT

A terminal antenna includes a first excitation part and a first radiation part, and the first excitation part is disposed at a middle location of the first radiation part. A common-mode feed is disposed on the first excitation part, and the common-mode feed is disposed between the first radiation part and the first excitation part. The common-mode feed is one or two feeds disposed between the first excitation part and the first radiation part.

20 Claims, 44 Drawing Sheets

(51) Int. Cl.

| | |
|---|---|
| ***H01Q 9/20*** | (2006.01) |
| ***H01Q 9/42*** | (2006.01) |
| ***H01Q 21/28*** | (2006.01) |
| *H01Q 7/00* | (2006.01) |
| *H01Q 9/04* | (2006.01) |
| *H01Q 9/06* | (2006.01) |

(56) References Cited

U.S. PATENT DOCUMENTS

2007/0182657 A1* 8/2007 Chiang .................. H01Q 21/30 343/834
2009/0115673 A1* 5/2009 Nysen ...................... H04B 7/04 343/730
2009/0237319 A1* 9/2009 Fukushima ............. H01Q 9/24 343/793
2015/0084819 A1* 3/2015 Montgomery ......... H01Q 1/523 343/727
2019/0221932 A1 7/2019 Pan
2022/0393360 A1 12/2022 Zhang
2022/0407217 A1 12/2022 Wang et al.
2023/0163466 A1 5/2023 Yu et al.

FOREIGN PATENT DOCUMENTS

| | | | |
|---|---|---|---|
| CN | 112751155 | A | 5/2021 |
| CN | 113540758 | A | 10/2021 |
| CN | 113725611 | A | 11/2021 |
| CN | 113745804 | A | 12/2021 |
| CN | 113839204 | A | 12/2021 |
| CN | 215869791 | U | 2/2022 |
| CN | 114122685 | A | 3/2022 |
| WO | 2021083362 | A1 | 5/2021 |

* cited by examiner

TERMINAL ANTENNA AND HIGH ISOLATION ANTENNA SYSTEM

CROSS-REFERENCE TO RELATED APPLICATIONS

This application is a national stage of International Application No. PCT/CN2022/137647, filed on Dec. 8, 2022, which claims priority to Chinese Patent Application No. 202210474925.4, filed on Apr. 29, 2022, both of which are incorporated herein by references in their entireties.

TECHNICAL FIELD

This application relates to the field of antenna technologies, and in particular, to a terminal antenna and a high isolation antenna system.

BACKGROUND

Antennas are disposed in various electronic devices having a wireless communication requirement, to implement conversion between a wired signal and a wireless signal by using the antenna, and further perform wireless communication by using the wireless signal. In a current antenna operating mechanism, the antenna can operate in different modes for radiation. For example, the different modes may include a 0.5-time wavelength mode, a 1.5-time wavelength mode, and the like. The different modes may further include a 1-time wavelength mode, a 2-time wavelength mode, and the like.

To enable the antenna to operate in different operating modes, a corresponding feed needs to be disposed on the antenna for feeding. Currently, a feeding mode is fixed. As a result, a big restriction is imposed on a disposition location and a disposition mode (such as impedance setting, differential mode selection, and common mode selection of the feed) of the feed. In addition, when a plurality of antennas are disposed on a terminal device, implementing a high isolation antenna is also a problem that needs to be resolved.

SUMMARY

Embodiments of this application provide a terminal antenna and a high isolation antenna system, so that a new N-time wavelength excitation solution is provided, and can be applied to the high-isolation antenna system.

To achieve the foregoing objective, the following technical solutions are used in the embodiments of this application:

According to a first aspect, a terminal antenna is provided, where the terminal antenna is disposed in an electronic device, and the terminal antenna includes a first excitation part and a first radiation part, where the first excitation part is disposed at a middle location of the first radiation part; and a common-mode feed is disposed on the first excitation part, the common-mode feed is disposed between the first radiation part and the first excitation part, and the common-mode feed is one or two feeds disposed between the first excitation part and the first radiation part.

Based on this solution, a mode corresponding to the first radiation part can be excited by disposing the common-mode feed. For example, each mode on the first radiation part (for example, a dipole antenna) is excited through electric field excitation provided by the common-mode feed. This enriches an antenna excitation mode, for example, for excitation of an N-time wavelength mode, a solution different from existing high-impedance differential-mode feeding is provided.

In a possible design, the first excitation part is configured to generate an electric field between the first excitation part and the first radiation part under excitation of the common-mode feed, and the electric field is used to excite the first radiation part for radiation. Based on this solution, a mechanism in which the first excitation part excites the first radiation part to perform radiation is provided in this application. For example, electric field excitation is set, so that the N-time wavelength mode is excited by using the common-mode feed.

In a possible design, the terminal antenna including the first excitation part and the first radiation part is of an axisymmetric structure, and an axis of symmetry of the axisymmetric structure is a perpendicular bisector of a radiator of the first radiation part. Based on this solution, a structural limitation on the terminal antenna is provided. In the terminal antenna with a symmetrical structural characteristic, the first excitation part can better excite the first radiation part to perform radiation based on the N-time wavelength.

In a possible design, the middle location of the first radiation part is a point with a large eigenmode electric field at an N-time wavelength of the first radiation part, and N is a positive integer; and the first excitation part is configured to excite the first radiation part to operate in an N-time wavelength mode for radiation, and a current reverse point is distributed at the middle location of the first radiation part. Based on this solution, a relevant situation of the terminal antenna during operating is provided. For example, the first radiation part may be excited to operate in the N-time wavelength mode. For another example, during operating, different from a case in which a current at the middle location is not reversed in differential-mode feeding, in this application, a current at the middle location may have a reverse characteristic.

In a possible design, the feed disposed on the first excitation part is a low-impedance feed, and port impedance of the low-impedance feed is less than 100 ohms. Based on this solution, a limitation on the common-mode feed is provided in this application. For example, the terminal antenna may be excited by using the low-impedance feed, for example, common-mode feeding with target impedance of 50 ohms.

In a possible design, the first excitation part includes two inverted L-shaped radiators that are not connected to each other; and one arm of each of the two inverted L-shaped radiators is connected to the first radiation part by using one feed, and ends of the two inverted L-shaped radiators away from the feed are away from each other. Based on this solution, a specific structural implementation of the terminal antenna is provided. For example, the solution may correspond to the L-shaped probe solution shown in 191 in FIG. 19.

In a possible design, the first excitation part includes a π-shaped radiator, and two ends in the middle of the π-shaped radiator are separately connected to the first radiation part by using two common-mode feeds. Based on this solution, a specific structural implementation of the terminal antenna is provided. For example, the solution may correspond to the π-shaped probe solution shown in 192 in FIG. 19.

In a possible design, the first excitation part includes a T-shaped radiator, and an end in the middle of the T-shaped radiator is connected to the first radiation part by using one feed. Based on this solution, a specific structural implementation of the terminal antenna is provided. For example, the solution may correspond to the T-shaped probe solution shown in 193 in FIG. 19.

In a possible design, the first excitation part includes a vertical radiator, and an end of the vertical radiator is connected to the first radiation part by using one feed. Based on this solution, a specific structural implementation of the terminal antenna is provided. For example, the solution may correspond to the vertical probe solution shown in 194 in FIG. 19.

In a possible design, the first excitation part includes an annular radiator provided with an opening, two ends of the opening of the annular radiator are separately connected to the first radiation part, one feed is disposed in the annular radiator, one end of the feed is connected to the annular radiator, and the other end of the feed is connected to the first radiation part in the opening. Based on this solution, a specific structural implementation of the terminal antenna is provided. For example, the solution may correspond to the CM feeding ring probe solution shown in 195 in FIG. 19.

In a possible design, a coupling radiator is disposed on the first excitation part, the coupling radiator is disposed between the common-mode feed and the first radiation part, the coupling radiator is connected to the first excitation part by using the common-mode feed, and the coupling radiator is connected to the first radiation part through coupling by using a slot. Based on this solution, a specific structural implementation of the terminal antenna is provided. For example, the solution may correspond to the coupling feeding solution shown in any one of FIG. 20.

In a possible design, the first excitation part includes two inverted L-shaped radiators that are not connected to each other; and one arm of each of the two inverted L-shaped radiators is connected to the coupling radiator by using one feed, and ends of the two inverted L-shaped radiators away from the feed are away from each other. Based on this solution, a specific structural implementation of the terminal antenna is provided. For example, the solution may correspond to the L-shaped probe solution based on coupling feeding shown in 201 in FIG. 20.

In a possible design, the first excitation part includes a $\pi$-shaped radiator, and two ends in the middle of the $\pi$-shaped radiator are separately connected to the coupling radiator by using two common-mode feeds. Based on this solution, a specific structural implementation of the terminal antenna is provided. For example, the solution may correspond to the $\pi$-shaped probe solution based on coupling feeding shown in 202 in FIG. 20.

In a possible design, the first excitation part includes a T-shaped radiator, and an end in the middle of the T-shaped radiator is connected to the coupling radiator by using one feed. Based on this solution, a specific structural implementation of the terminal antenna is provided. For example, the solution may correspond to the T-shaped probe solution based on coupling feeding shown in 203 in FIG. 20.

In a possible design, the first excitation part includes an annular radiator provided with an opening, two ends of the opening of the annular radiator are respectively connected to two ends of the coupling radiator, one feed is disposed in the annular radiator, one end of the feed is connected to the annular radiator, and the other end of the feed is connected to the coupling radiator in the opening. Based on this solution, a specific structural implementation of the terminal antenna is provided. For example, the solution may correspond to the common-mode (CM) feeding ring probe solution based on coupling feeding shown in 204 in FIG. 20.

In a possible design, the first radiation part includes any one of the following: a dipole antenna, a symmetric square loop antenna, a symmetric circular loop antenna, and a symmetric polygon antenna. Based on this solution, an example of a specific implementation of the first radiation part is provided. The first radiation part may have a symmetrical structure. In this case, when various structure implementations of the first excitation part provided in this application are used for implementation, the first radiation part can be better excited to operate in the N-time wavelength mode.

According to a second aspect, a terminal antenna is provided, where the terminal antenna is disposed in an electronic device, and the terminal antenna includes a first excitation part and a first radiation part, where a radiator of the first excitation part includes two parts, and the two parts are respectively disposed at two ends of the first radiation part; and common-mode feeds are respectively disposed on the two parts included by the first excitation part, the common-mode feeds are disposed between the first radiation part and the first excitation part, and the common-mode feeds are two feeds disposed between the first excitation part and the first radiation part. Based on this solution, another possibility of setting locations of the first excitation part and the first radiation part is provided. For example, two radiators corresponding to the first excitation part may be respectively disposed at two ends of the first excitation part, and correspond to points with a large eigenmode electric field of the two ends of the first excitation part in an N-time wavelength mode. Therefore, the first excitation part is excited based on low-impedance common-mode feeding.

In a possible design, the radiator of the first excitation part is of an inverted L-shaped structure, or the radiator of the first excitation part is of a vertical structure. Based on this solution, several specific structural implementations of the first excitation part are provided when the two radiators are disposed at two ends.

According to a third aspect, a high isolation antenna system is provided, where the antenna system includes a first antenna and a second antenna, the first antenna has the structure of the terminal antenna according to any one of the first aspect and the possible designs of the first aspect, or the first antenna has the structure of the terminal antenna according to any one of the second aspect and the possible designs of the second aspect, differential-mode feeding is disposed on the second antenna, and the second antenna includes a second radiation part; the differential-mode feeding of the second antenna is disposed at a middle location of the second radiation part, and is parallel to a common-mode feed of the first antenna; and the first radiation part and the second radiation part are integrated or not integrated.

Based on this solution, a specific application of a terminal antenna implemented by using a low-impedance common-mode feeding solution in this application is provided. With reference to the descriptions in the first aspect and the second aspect, in the low-impedance common-mode feeding solution provided in this application, the terminal antenna may operate in an N-time wavelength mode, and a current reverse point may be distributed in the middle of the first radiation part. Correspondingly, in an existing differential-mode feeding solution, there is no current reverse point at a middle location of a radiator. Therefore, the two solutions are combined, and because different current distribution of the two antennas, the two antennas can have a high isolation characteristic. In some implementations, operating bands of the first antenna and the second antenna may overlap at least partially.

In a possible design, when the high isolation antenna system operates, the first antenna operates in the N-time wavelength mode, N is a positive integer, a current reverse point is distributed at a middle location of the first radiation part of the first antenna, and a current at the middle location of the second radiation part of the second antenna is not reversed. Based on this solution, a limitation on operating statuses of the two antennas in an operating process of the antenna system is provided.

In a possible design, the first radiation part and the second radiation part are not integrated; the first antenna and the second antenna are not connected to each other, and the first antenna operates in the N-time wavelength mode; and the second antenna also operates in the N-time wavelength mode, or the second antenna operates in another mode different from the N-time wavelength mode. Based on this solution, a limitation on relative locations and operating modes of the two antennas when the two antennas are not integrated is provided.

In a possible design, the first radiation part and the second radiation part are integrated, and both the first antenna and the second antenna operate in the N-time wavelength mode. Based on this solution, radiators of the two antennas may also overlap at least partially. For example, the first radiation part of the first antenna and the second radiation part of the second antenna may be reused to implement integration. Because the operating bands of the two antennas overlap at least partially, and the radiation parts of the two antennas have a same size (integration), the two antennas can simultaneously operate in the N-time wavelength mode. Current distribution is different when the two antennas separately operate in the N-time wavelength mode. Therefore, good isolation can also be obtained.

In a possible design, the second radiation part of the second antenna is a dipole antenna. Based on this solution, a specific implementation of the second antenna is provided.

In a possible design, the differential-mode feeding includes: a second excitation part is further disposed on the second antenna, and the second excitation part is disposed at the middle location of the second radiation part; the second excitation part includes one U-shaped structure radiator, two ends of the U-shaped structure radiator are separately connected to the second radiation part, and a differential-mode feed connected in series is disposed at the bottom of the U-shaped structure radiator; or the second excitation part includes two U-shaped structure radiators, the two U-shaped structure radiators are not connected to each other and have openings in a same direction, one feed is disposed on each of ends of the two U-shaped structure radiators close to each other, and is connected to the second radiation part, ends of the two U-shaped structure radiators away from each other are separately connected to the second radiation part directly, and the feeds on the two U-shaped structure radiators are separately configured to feed an equal-amplitude phase-inverted differential-mode feeding signal. Based on this solution, another specific implementation of the second antenna based on direct feeding is provided.

In a possible design, the differential-mode feeding includes: a second excitation part is further disposed on the second antenna, the second excitation part is disposed at the middle location of the second radiation part, and the second excitation part and the second radiation part are not connected to each other; the second excitation part includes one annular structure radiator, and a differential-mode feed is connected in series on the annular structure radiator; or the second excitation part includes two annular structure radiators, the two annular structure radiators are disposed axisymmetrically, two feeds are respectively disposed on sides of the two annular structure radiators close to each other, and the two feeds are separately configured to feed an equiamplitude phase-inverted differential-mode feeding signal. Based on this solution, another specific implementation of the second antenna based on coupling feeding is provided.

In a possible design, when the second antenna operates, the second antenna operates in a 0.5*M-time wavelength mode, and M is an odd number. Based on this solution, a limitation on an operating mode of the second antenna is provided.

According to a fourth aspect, an electronic device is provided, where the terminal antenna according to any one of the first aspect and the possible designs of the first aspect is disposed in the electronic device, or the terminal antenna according to any one of the second aspect and the possible designs of the second aspect is disposed in the electronic device; and when transmitting or receiving a signal, the electronic device transmits or receives the signal by using the terminal antenna.

According to a fifth aspect, an electronic device is provided, where the high isolation antenna system according to any one of the third aspect and the possible designs of the third aspect is disposed in the electronic device, and when transmitting or receiving a signal, the electronic device transmits or receives the signal by using the high isolation antenna system.

It should be understood that technical solutions of the fourth aspect can correspond to any one of the first aspect and the possible designs of the first aspect, and technical solutions of the fifth aspect can correspond to any one of the third aspect and the possible designs of the third aspect. Therefore, beneficial effects that can be achieved are similar. Details are not described herein again.

DETAILED DESCRIPTION OF ILLUSTRATIVE EMBODIMENTS

An antenna may be disposed in an electronic device, to implement a wireless communication function of the electronic device. A high isolation antenna system is disposed to provide excellent wireless communication performance for the electronic device.

Figure 1:
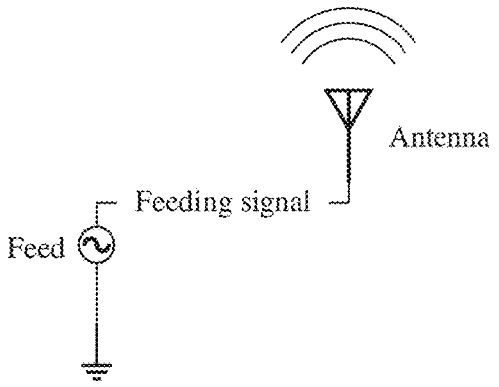
Prior Art FIG. 1
FIG. 1 is a schematic diagram of an antenna operating scenario.

In an example, FIG. 1 shows a related link of an antenna disposed in an electronic device. As shown in FIG. 1, the antenna may be connected to a feed. When the antenna operates, a signal transmission scenario is used as an example, and the feed may provide a feeding signal for the antenna. The feeding signal may be an analog signal transmitted by using a radio frequency transmission line. The antenna may convert the analog signal into an electromagnetic wave transmitted in space. Similarly, in a signal receiving scenario, the antenna may convert an electromagnetic wave into an analog signal, so that the electronic device processes the analog signal to implement signal receiving.

Figure 2:
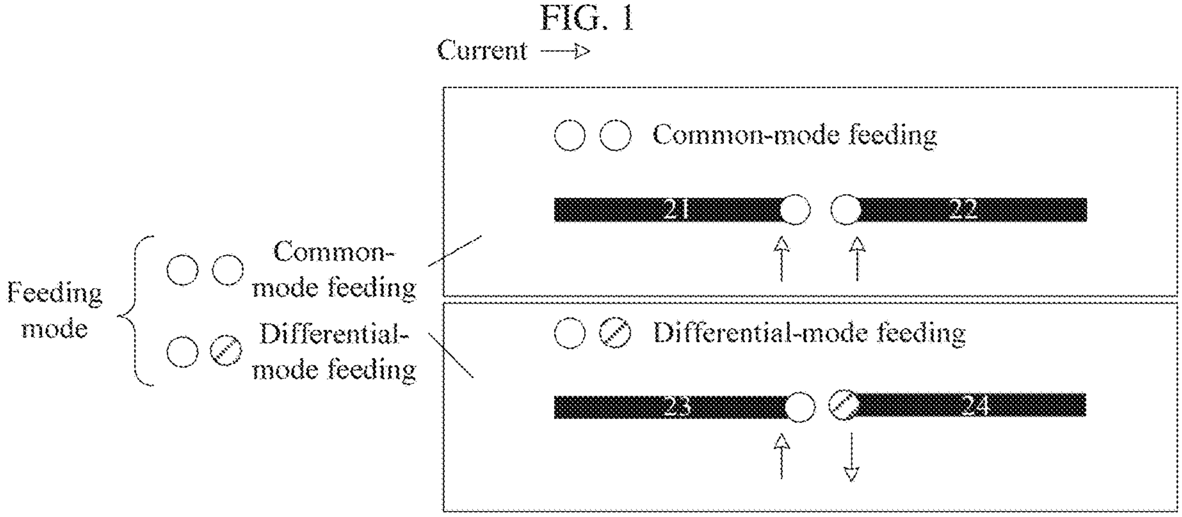
Prior Art FIG. 2
FIG. 2 is a schematic diagram of different feeding modes.

In some cases, the antenna may be fed in different feeding modes. For example, as shown in FIG. 2, a frequently used feeding mode may include common-mode (Common Mode, CM) feeding and differential-mode (Differential Mode, DM) feeding. Common-mode feeding may mean that a feeding signal transmitted to a radiator has an equi-amplitude in-phase characteristic. Correspondingly, differential-mode feeding may mean that a feeding signal transmitted to a radiator has an equi-amplitude phase-inverted characteristic. In an example in FIG. 2, a direction of a current fed into a radiator 21 may be a direction of flowing into the radiator 21. Correspondingly, a direction of a current fed into a radiator 22 may also be a direction of flowing into the radiator 22. That is, the feeding signals fed into the radiator 21 and the radiator 22 have an in-phase characteristic. When amplitudes of the two feeding signals are also the same, this is referred to as performing common-mode feeding on the radiator 21 and the radiator 22. In an example of differential-mode feeding in FIG. 2, a direction of a current fed into a radiator 23 may be a direction of flowing into the radiator 23. Correspondingly, a direction of a current fed into a radiator 24 may be a direction of flowing out of the radiator 24. That is, the feeding signals fed into the radiator 23 and the radiator 24 have a phase-inverted characteristic. When amplitudes of the two feeding signals are also the same, this is referred to as performing differential-mode feeding on the radiator 23 and the radiator 24.

Figure 3:
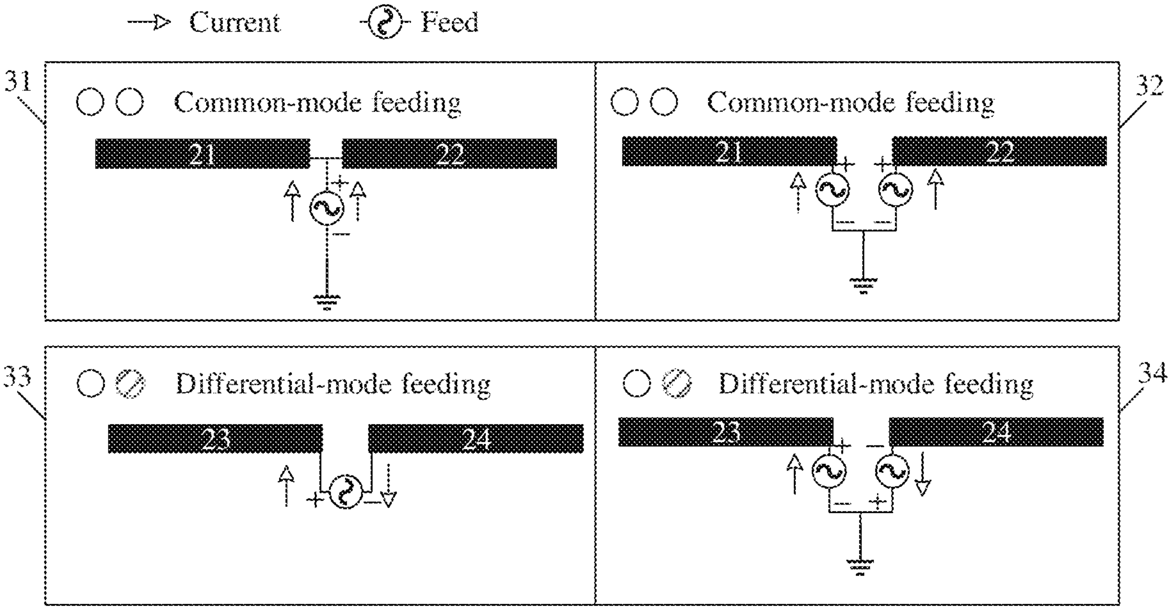
Prior Art FIG. 3
FIG. 3 is a schematic diagram of implementations of different feeding modes.

In a specific implementation, FIG. 3 shows several specific solutions for implementing common-mode feeding and differential-mode feeding. In this example, common-mode feeding is used as an example. As shown in 31 in the figure, one end of a feed may be connected to two radiators. For example, a positive pole of the feed may be connected to ends of the radiator 21 and the radiator 22 close to each other, to implement common-mode feeding on the radiator 21 and the radiator 22. As shown in 32 in the figure, common-mode feeding may alternatively be implemented by using two feeds. For example, both negative poles of the two feeds may be grounded. A positive pole of one feed is connected to the radiator 21, and the other feed is connected to the radiator 22. The two feeds may output equi-amplitude in-phase feeding signals, thereby implementing common-mode feeding on the radiator 21 and the radiator 22.

Differential-mode feeding is used as an example. As shown in 33 in the figure, one end of a feed may be connected to one radiator, and the other end of the feed may be connected to the other radiator. That is, the feed may be connected in series between the two radiators. In this case, when the feed outputs a positive current to one radiator, the feed may further output a phase-inverted current to the other radiator. For example, a positive pole of the feed may be connected to an end of the radiator 23 close to the radiator 24. A negative pole of the feed may be connected to an end of the radiator 24 close to the radiator 23. In this case, differential-mode feeding is implemented on the radiator 23 and the radiator 24. As shown in 34 in the figure, differential mode feeding may alternatively be implemented by using two feeds. For example, a positive pole of one feed is connected to the radiator 23, a negative pole of the other feed is connected to the radiator 24, and ends that are of the two feeds and that are not connected to the radiators are grounded. In this case, the two feeds may output equi-amplitude phase-inverted feeding signals to the radiator 23 and the radiator 24, thereby implementing differential-mode feeding on the radiator 23 and the radiator 24.

It should be understood that, after the feed is disposed on the antenna, an eigenmode radiation characteristic of a radiator of the antenna may be used, so that the feed can excite the radiator of the antenna to operate in different modes. In this way, the antenna can send/receive a signal in a band corresponding to an excited mode.

Figure 4:
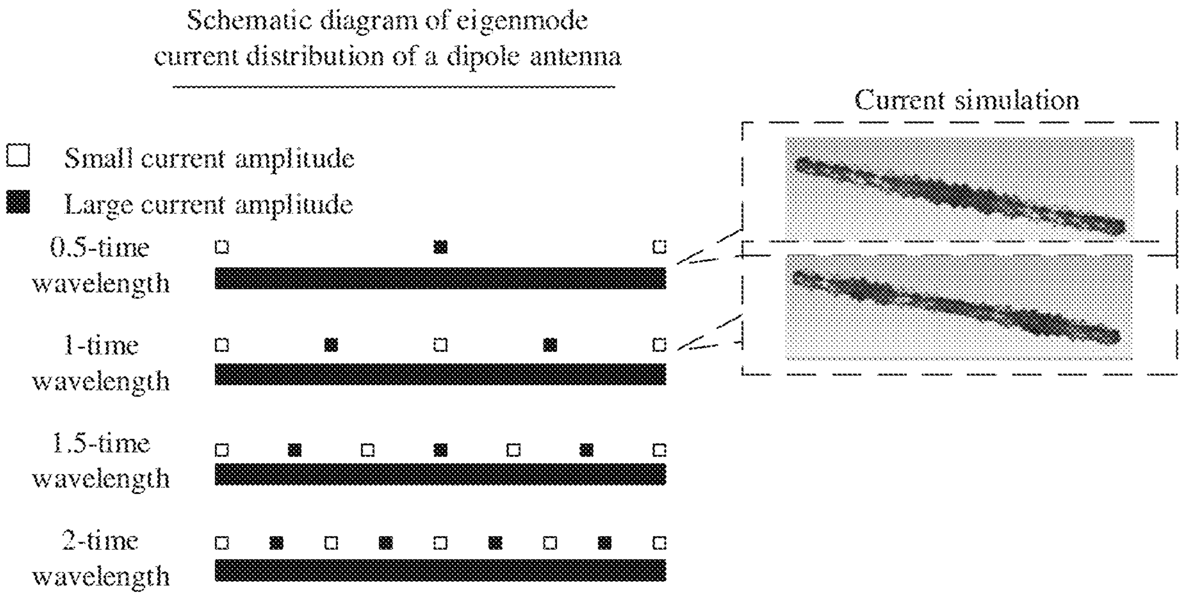
FIG. 4 is a schematic diagram of eigenmode current distribution.

For example, a dipole antenna is used as an example. FIG. 4 is a schematic diagram of eigenmode current distribution of a dipole antenna. Distribution characteristics of a current on a radiator in different modes are shown.

It should be noted that, in this application, the dipole antenna may be a symmetric dipole. In different implementations, the dipole antenna may include a half-wave symmetric dipole of which each arm is a quarter wavelength in length. The dipole antenna may also include a full-wave symmetric dipole with a full length equal to a wavelength. In the following example, that the dipole antenna is a half-wave symmetric dipole is used as an example. That is, a sum of lengths of two arms of the dipole antenna may correspond to ½ of an operating wavelength.

As shown in FIG. 4, in a 0.5-time wavelength (namely, a half wavelength) mode, the radiator of the antenna may include two points with a small current amplitude and one point with a large current amplitude. The point with a large current amplitude may be located at a middle location of the radiator, and the points with a small current amplitude may be located at two ends of the radiator. In the following example, the point with a large current amplitude may also be referred to as a point with a large current, and the point with a small current amplitude may also be referred to as a point with a small current.

In a 1-time wavelength mode, the radiator of the antenna may include three points with a small current and two points with a large current. The points with a large current may be respectively located at middle locations of a left half part and a right half part of the radiator. Locations of the points with a small current may include the two ends of the radiator and a middle location between the two points with a large current.

In a 1.5-time wavelength mode, the radiator of the antenna may include four points with a small current and three points with a large current. The two ends of the radiator are points with a small current. The points with a small current and the points with a large current are alternately distributed on the radiator successively.

In a 2-time wavelength mode, the radiator of the antenna may include five points with a small current and four points with a large current. The two ends of the radiator are points with a small current. The points with a small current and the points with a large current are alternately distributed on the radiator successively.

With reference to eigenmode current distribution characteristics in the foregoing different modes, in a 0.5 M-time (that is, 0.5×M times, where M is an odd number) wavelength mode, the middle location of the radiator may be a point with a large current. Correspondingly, in an N-time wavelength mode, the middle location of the radiator may be a point with a small current, where N is a positive integer.

It should be noted that in this application, a location relationship between the point with a large current and the point with a small current cannot be used to determine a current flow direction. For example, in some cases, current intensity may periodically change, and the current flow direction may be unchanged. In some other cases, there may be a reverse point in the current flow direction as current intensity periodically changes.

Therefore, with reference to the foregoing eigenmode current distribution, that a current source is used to excite different modes is used as an example.

The feed may be disposed at the middle location (that is, corresponds to the point with a large current) of the antenna, to excite the 0.5 M-time wavelength mode. The feed may be a low-impedance feed, for example, a feed with impedance of 50 ohms or about 50 ohms. In this embodiment of this application, the low-impedance feed may be a frequently used feed with target impedance less than 100 ohms, for example, the target impedance is 50 ohms.

Correspondingly, the feed may also be disposed at the middle location (that is, corresponds to the point with a large current) of the antenna, to excite the N-time wavelength mode. A difference lies in that, because eigenmode current intensity at the middle location is weak, a high-impedance feed needs to be used as the feed. In this embodiment of this application, impedance of the high-impedance feed may be up to hundreds of ohms or more. For example, the impedance of the feed may reach about 500 ohms or even higher than 500 ohms. High impedance may refer to an impedance state corresponding to impedance matching close to an open circuit. In some implementations, for the high-impedance feed, another matching device (for example, a capacitor) may be disposed on a low-impedance feed link to implement a high-impedance matching state required for a corresponding mode.

In a specific implementation, with reference to descriptions of the feeding modes in FIG. 1-FIG. 3 in the foregoing descriptions, antisymmetric feeding may be currently used to excite the dipole antenna.

Figure 5:
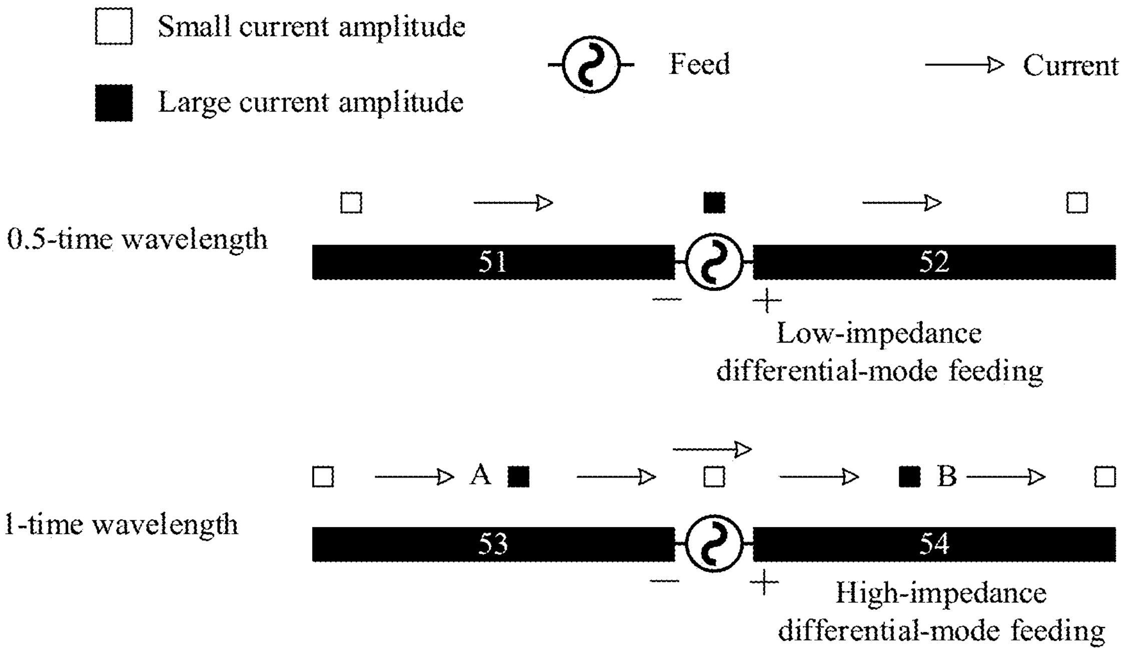
FIG. 5 is a schematic diagram of current distribution in a differential-mode feeding solution.

For example, as shown in FIG. 5, when antisymmetric feeding is used to excite the 0.5-time wavelength mode, a low-impedance feed may be connected in series between a radiator 51 and a radiator 52, to perform low-impedance differential-mode feeding on the dipole antenna. A positive pole of the feed may be connected to the radiator 52, and a negative pole of the feed may be connected to the radiator 51. In this way, when the dipole antenna operates at a 0.5-time wavelength, two points with a small current are distributed at an end of the radiator 51 away from the radiator 52 and an end of the radiator 52 away from the radiator 51. Ends of the two radiators close to the feed are points with a large current. FIG. 5 also shows a current flow direction in the 0.5-time wavelength mode in case of differential-mode feeding. It can be seen that, due to the differential mode feed, an internal current flows from the negative pole to the positive pole, directions of currents at locations on the radiator 51 and the radiator 52 close to the feed are the same, and no reverse effect is generated.

Figure 6:
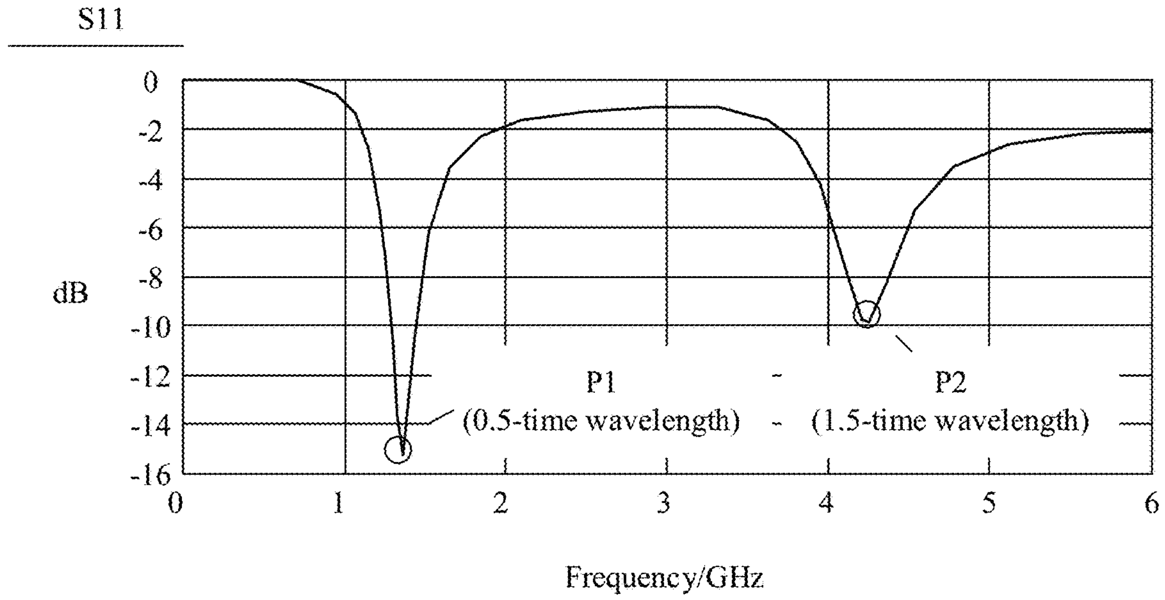
FIG. 6 is a schematic diagram of S parameter simulation of a 0.5 M-time wavelength mode in a differential-mode feeding solution.
Figure 6:
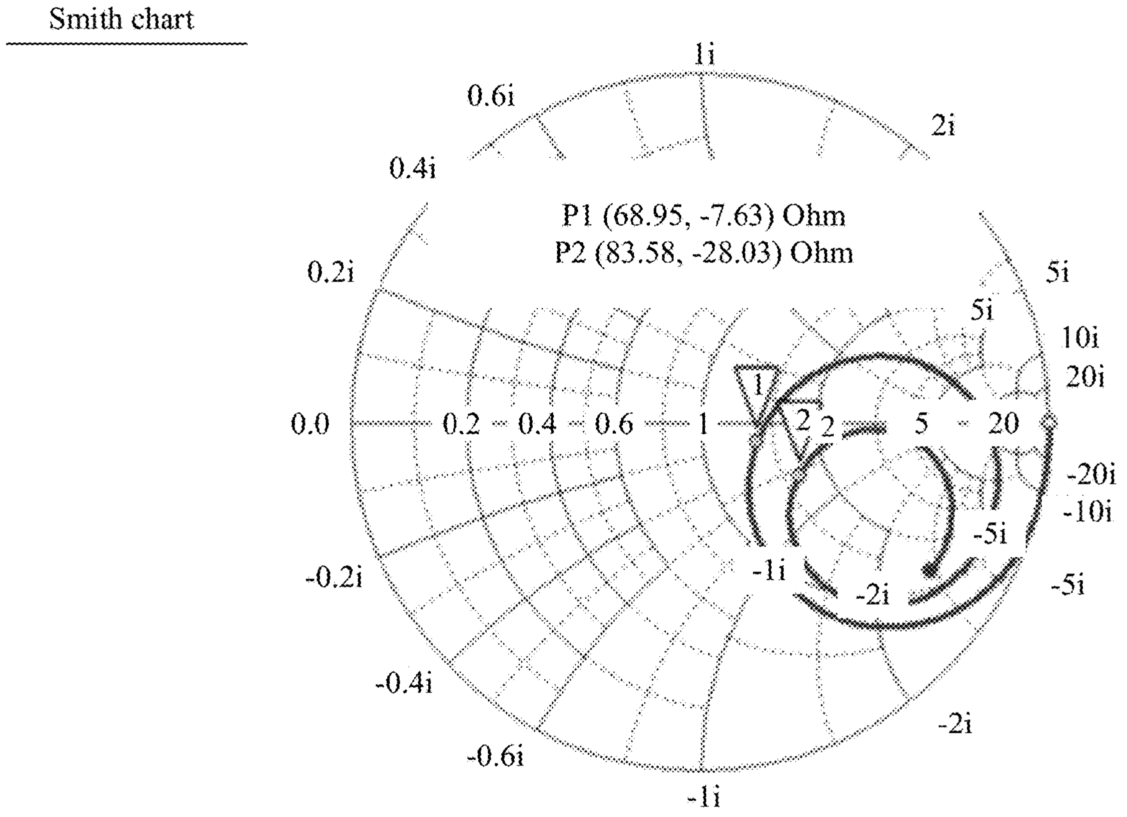

A structure in FIG. 5 is used as an example, and an operating situation of the antenna is described through simulation. For example, a radiator width of the dipole antenna is set to 2 mm, and a length of a single arm is set to 49 mm for simulation description. It should be noted that setting of the size is merely a design used for subsequent description, and does not constitute an actual limitation on this embodiment of this application. FIG. 6 shows a return loss (S11) and a Smith (Smith) chart in low-impedance differential-mode feeding (corresponding to the 0.5-time wavelength mode) shown in FIG. 5. As shown by S11 in FIG. 6, an excited mode may include the 0.5-time wavelength mode near P1 (namely, 1.2 GHz) and the 1.5-time wavelength mode near P2 (namely, 4.2 GHz). It may be understood that, with reference to eigenmode current distribution shown in FIG. 4, in the 0.5 M-time wavelength mode, the middle location (namely, ends of the radiator 51 and the radiator 52 close to each other) of the dipole antenna is the point with a large current. Therefore, when a low-impedance differential-mode feed is disposed at the location, the 0.5 M-time wavelength mode can be excited. In the Smith chart shown in FIG. 6, it can be seen that impedance corresponding to both P1 and P2 is low impedance. For example, P1 corresponds to 68.95 ohms, and P2 corresponds to 83.58 ohms. To be specific, a low-impedance (for example, a low-impedance differential-mode) feed is disposed at the middle location of the dipole antenna, so that the 0.5-time wavelength mode corresponding to P1 and the 1.5-time wavelength mode corresponding to P2 can be effectively excited.

Still referring to FIG. 5, FIG. 5 also shows excitation of a 1-time wavelength through antisymmetric feeding. In this example, a high-impedance feed may be connected in series between a radiator 53 and a radiator 54, to perform high-impedance differential-mode feeding on the dipole antenna. A positive pole of the feed may be connected to the radiator 53, and a negative pole of the feed may be connected to the radiator 54. In this case, when the dipole antenna operates at the 1-time wavelength, ends of the radiator 53 and the radiator 54 away from each other are points with a small current. There is also a point with a small current near the feed. One point with a large current is distributed between two adjacent points with a small current. Similar to current distribution in the 0.5-time wavelength mode, due to a differential-mode feeding mechanism, directions of currents on the radiator 53 and the radiator 54 near the feed are the same.

Figure 7:
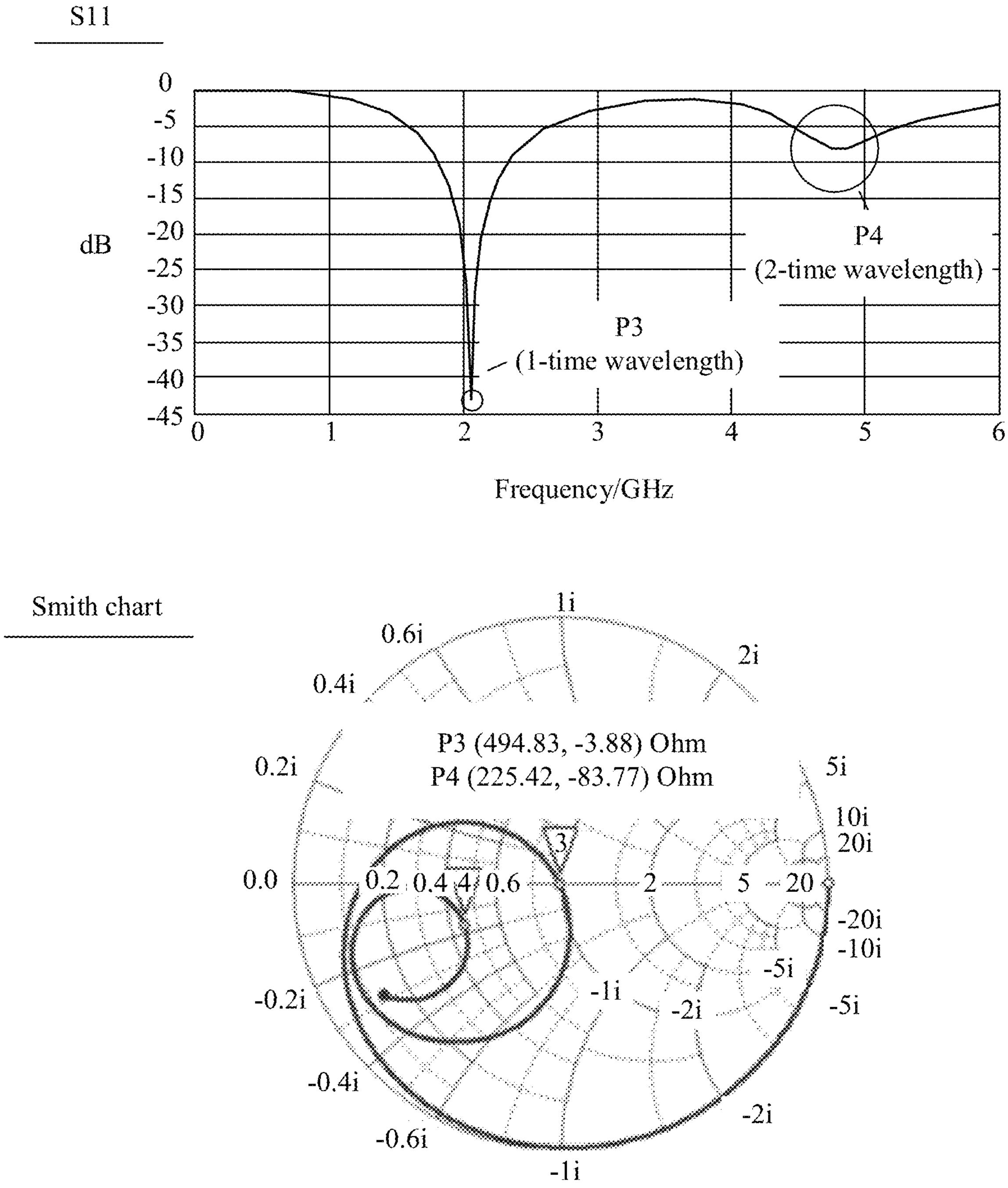
FIG. 7 is a schematic diagram of S parameter simulation of an N-time wavelength mode in a differential-mode feeding solution.

FIG. 7 shows a return loss (S11) and a Smith (Smith) chart in high-impedance differential-mode feeding (corresponding to the 1-time wavelength mode) shown in FIG. 5. As shown by S11 in FIG. 7, an excited mode may include the 1-time wavelength mode near P3 (that is, 2 GHz) and the 2-time wavelength mode near P4 (that is, 4.5 GHz). It may be understood that, with reference to eigenmode current distribution shown in FIG. 4, in the N-time wavelength mode, the middle location (namely, ends of the radiator 53 and the radiator 54 close to each other) of the dipole antenna is the point with a small current. Therefore, when a high-impedance differential-mode feed is disposed at the location, the N-time wavelength mode can be excited. In the Smith chart shown in FIG. 7, it can be seen that the impedance corresponding to both P3 and P4 is high impedance. For example, P3 corresponds to 494.83 ohms, and P4 corresponds to 225.42 ohms. To be specific, a high-impedance (for example, a high-impedance differential-mode) feed is disposed at the middle location of the dipole antenna, so that the 1-time wavelength mode corresponding to P3 and the 2-time wavelength mode corresponding to P4 can be effectively excited.

Currently, when a feed is disposed at the middle location of the dipole antenna for feeding, low-impedance differential-mode feeding may be used to excite the 0.5 M-time wavelength mode, and high-impedance differential-mode feeding may be used to excite the N-time wavelength mode. It can be seen that the differential-mode feeding mode is used in the foregoing feeding, and therefore the feeding mode is single.

In this case, in an antenna solution provided in this embodiment of this application, low-impedance excitation can be implemented on the N-time wavelength mode, to obtain good antenna performance corresponding to low impedance while enriching an antenna excitation manner.

It should be noted that the solution provided in this embodiment of this application can be widely applied to various antennas. The following first uses a dipole antenna as an example to describe a specific implementation of the solution provided in this embodiment of this application.

In some embodiments, the antenna solution provided in this embodiment of this application may be applied to an electronic device of a user, to support a wireless communication function of the electronic device. For example, the electronic device may be a portable mobile device, such as a mobile phone, a tablet computer, a personal digital assistant (personal digital assistant, PDA), an augmented reality (augmented reality, AR)/virtual reality (virtual reality, VR) device, or a media player. The electronic device may alternatively be a wearable electronic device such as a smartwatch. A specific form of the device is not specially limited in the embodiments of this application. In some other embodiments, the antenna solution can also be applied to another communication device, for example, a base station, a roadside station, or another network communication node.

Figure 8:
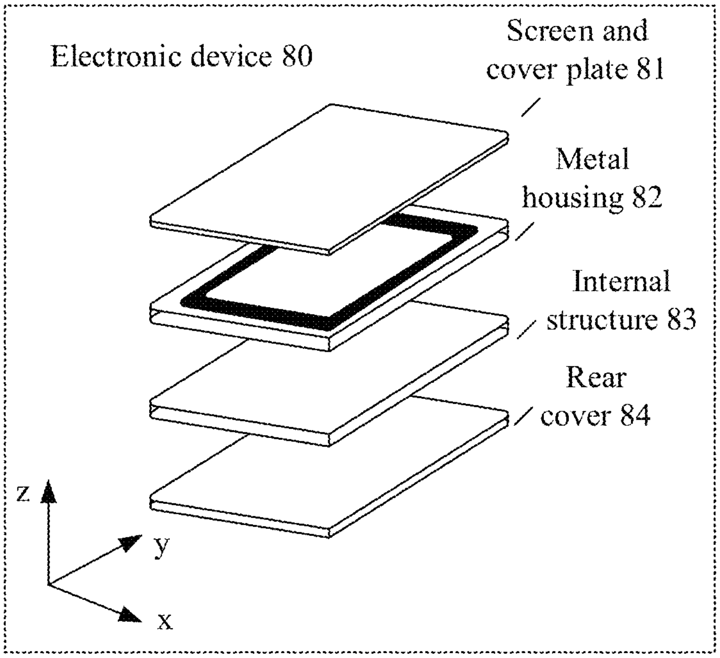
FIG. 8 is a schematic diagram of a composition of an electronic device according to an embodiment of this application.

That this solution is applied to the electronic device is used as an example. FIG. 8 is a schematic diagram of a structure of an electronic device 80 according to an embodiment of this application. As shown in FIG. 8, the electronic device 80 provided in this embodiment of this application may be sequentially provided with a screen and cover plate 81, a metal housing 82, an internal structure 83, and a rear cover 84 along a z-axis from top to bottom.

The screen and cover plate 81 may be used to implement a display function of the electronic device 80. The metal housing 82 may be used as a main frame of the electronic device 80 to provide rigid support for the electronic device 80. The internal structure 83 may include a set of electronic components and mechanical components that implement various functions of the electronic device 80. For example, the internal structure 83 may include a shielding case, a screw, a rib, and the like. The rear cover 84 may be a rear external surface of the electronic device 80, and a glass material, a ceramic material, a plastic material, and the like may be used for the rear cover 84 in different implementations.

The antenna solution provided in this embodiment of this application can be applied to the electronic device 80 shown in FIG. 8, to support a wireless communication function of the electronic device 80. In some embodiments, an antenna in the antenna solution may be disposed on the metal housing 82 of the electronic device 80. In some other embodiments, the antenna in the antenna solution may be disposed on the rear cover 84 or the like of the electronic device 80.

Figure 9:
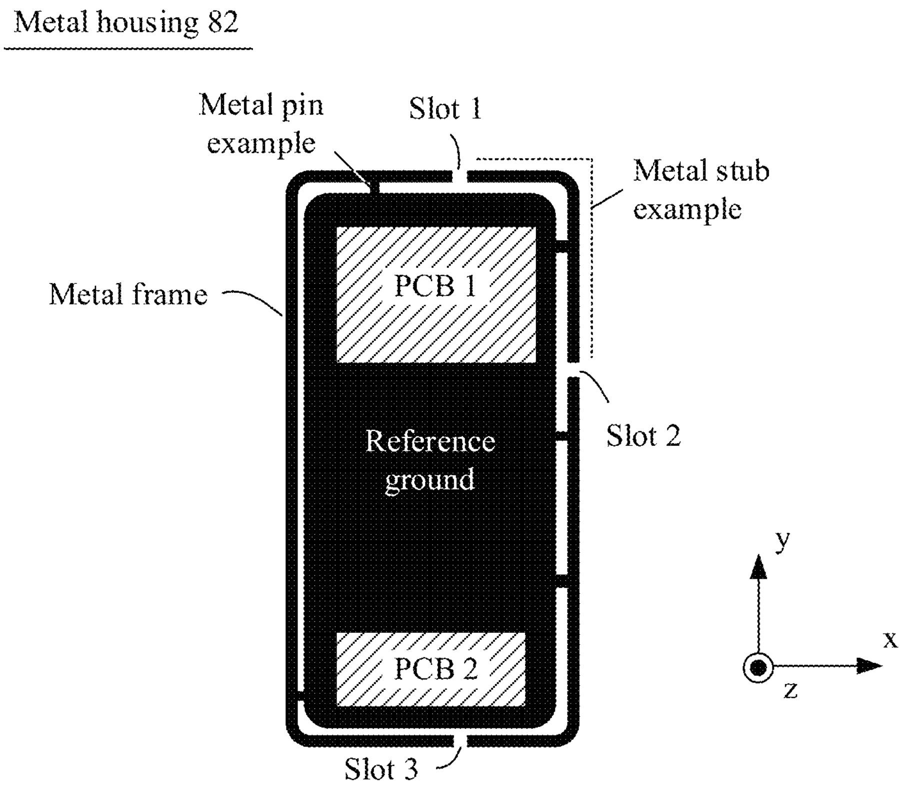
FIG. 9 is a schematic diagram of disposing a metal housing of an electronic device according to an embodiment of this application.

In an example, that the metal housing 82 has a metal frame architecture is used as an example. FIG. 9 shows a composition of the metal housing 82. In this example, a metal material such as aluminum alloy may be used for the metal housing 82. As shown in FIG. 9, a reference ground may be disposed on the metal housing 82. The reference ground may be of a metal material with a large area, and is used to provide most rigid support and provide a zero potential reference for each electronic component. In the example in FIG. 9, a metal frame may also be disposed on a periphery of the reference ground. The metal frame may be a complete and closed metal frame, and the metal frame may include some or all metal strips disposed in suspension. In some other implementations, the metal border frame may alternatively be a metal frame interrupted by one or more slots shown in FIG. 9. For example, in the example in FIG. 9, a slot 1, a slot 2, and a slot 3 may be separately disposed at different locations on the metal frame. These slots may interrupt the metal frame, to obtain an independent metal stub. In some embodiments, some or all of these metal stubs may be used as radiation stubs of the antenna, thereby implementing structural reuse in an antenna disposition process and reducing antenna disposition difficulty. When the metal stub is used as the radiation stub of the antenna, a location of a slot correspondingly disposed at one or two ends of the metal stub may be flexibly selected based on antenna disposition.

In the example in FIG. 9, one or more metal pins may be further disposed on the metal frame. In some examples, a screw hole may be disposed on the metal pin, to fasten another structural member by using a screw. In some other examples, the metal pin may be coupled to a feeding point, so that the metal pin is used to feed the antenna when a metal stub connected to the metal pin is used as the radiation stub of the antenna. In some other examples, the metal pin may be further coupled to another electronic component, to implement a corresponding electrical connection function.

In this example, disposition of a printed circuit board (printed circuit board, PCB) on the metal housing is also shown. That a main board (main board) and a sub board (sub board) are separately designed is used as an example. In some other examples, the main board and the sub board may alternatively be connected, for example, an L-type PCB design. In some embodiments of this application, the main board (for example, a PCB 1) may be used to bear the electronic components implementing various functions of the electronic device 80, for example, a processor, a memory, and a radio frequency module. The sub board (for example, a PCB 2) may also be used to bear electronic components, for example, a universal serial bus (Universal Serial Bus, USB) interface, a related circuit, and a speak box (speak box). For another example, the sub board may be further used to bear a radio frequency circuit and the like corresponding to an antenna disposed at the bottom (namely, a part in a negative direction of a y-axis of the electronic device).

The antenna solution provided in this embodiment of this application can be applied to an electronic device having the composition shown in FIG. 8 or FIG. 9.

Figure 10:
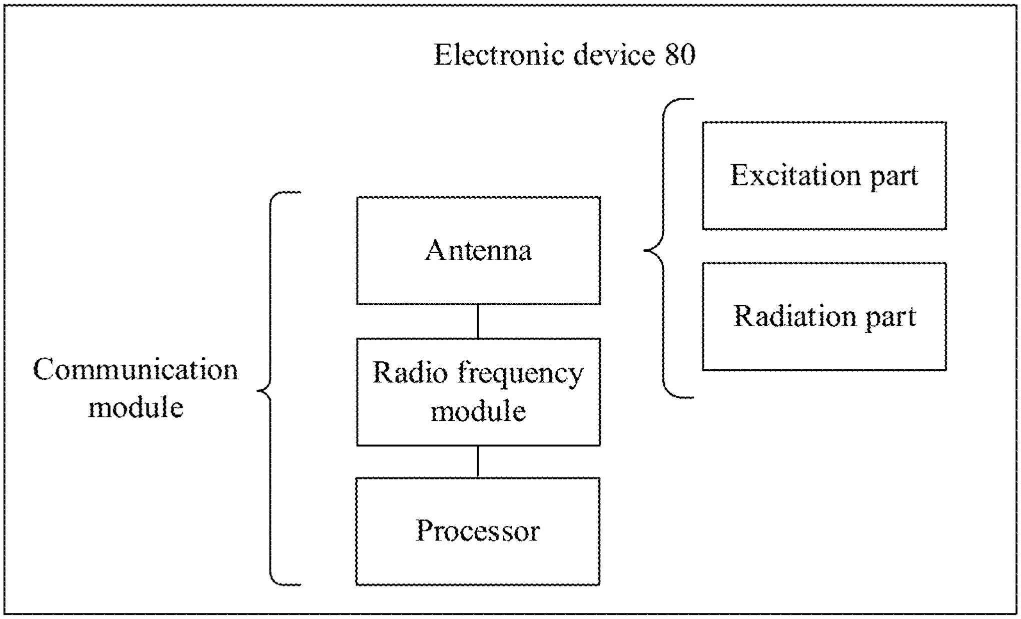
FIG. 10 is a schematic diagram of a composition of an electronic device according to an embodiment of this application.

It should be noted that the electronic device 80 in the foregoing example is only one possible composition. In some other embodiments of this application, the electronic device 80 may further have another logical composition. For example, to implement the wireless communication function of the electronic device 80, a communication module shown in FIG. 10 may be disposed in the electronic device. The communication module may include an antenna, a radio frequency module performing signal interaction with the antenna, and a processor performing signal interaction with the radio frequency module. For example, a signal stream between the radio frequency module and the antenna may be an analog signal stream. A signal stream between the radio frequency module and the processor may be an analog signal stream or a digital signal stream. In some implementations, the processor may be a baseband processor.

In the composition of the electronic device shown in FIG. 9, the antenna may have the solution composition provided in this embodiment of this application. For example, in some embodiments, the antenna may include an excitation part and a radiation part. A feed may be disposed on the excitation part, and the excitation part is mainly configured to excite the radiation part based on a feeding signal transmitted by the feed. In a possible implementation, the excitation part may generate a same-direction or opposite-direction electric field based on the feeding signal, to feed the radiation part through electric field excitation.

It should be noted that, in the example in FIG. 9, the composition of the antenna is briefly divided from a functional perspective. This division does not constitute any limitation on an antenna structure. For example, in some embodiments, the excitation part may not be directly connected to the radiation part, to excite the radiation part through coupling feeding. In some other embodiments, a connection part may alternatively be disposed for the excitation part and the radiation part, to implement direct feeding excitation.

In the antenna solution provided in this embodiment of this application, based on eigenmode distribution of the antenna, a corresponding mode can be excited by using a low-impedance feed at a location at which feeding needs to be performed by using a high-impedance feed. For example, in a conventional solution, when the N-time wavelength needs to be excited, high-impedance differential-mode feeding is used for excitation at the middle location of the dipole antenna. However, in the solution provided in this embodiment of this application, the low-impedance feed can be used at the middle location of the dipole antenna to excite the N-time wavelength mode through electric field excitation or the like.

Figure 11:
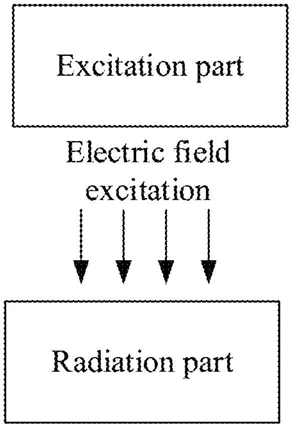
FIG. 11 is a schematic diagram of an operating principle according to an embodiment of this application.

For example, with reference to the foregoing descriptions, as shown in FIG. 11, when the antenna provided in this embodiment of this application operates, a same-direction electric field may be generated between the excitation part and the radiation part. The same-direction electric field may be used to excite the radiation part to generate a corresponding mode. For example, the radiation part is a dipole. With reference to the descriptions in FIG. 4 and FIG. 5, for the N-time wavelength mode such as the 1-time wavelength mode and the 2-time wavelength mode, when a feed is disposed at a middle location of the dipole for feeding, a feeding mode such as high-impedance differential-mode feeding needs to be used. When the solution provided in this embodiment of this application is used, a low-impedance common-mode feeding mode may be used at this location to excite the N-time wavelength mode.

The following specifically describes the antenna provided in this embodiment of this application.

Figure 12:
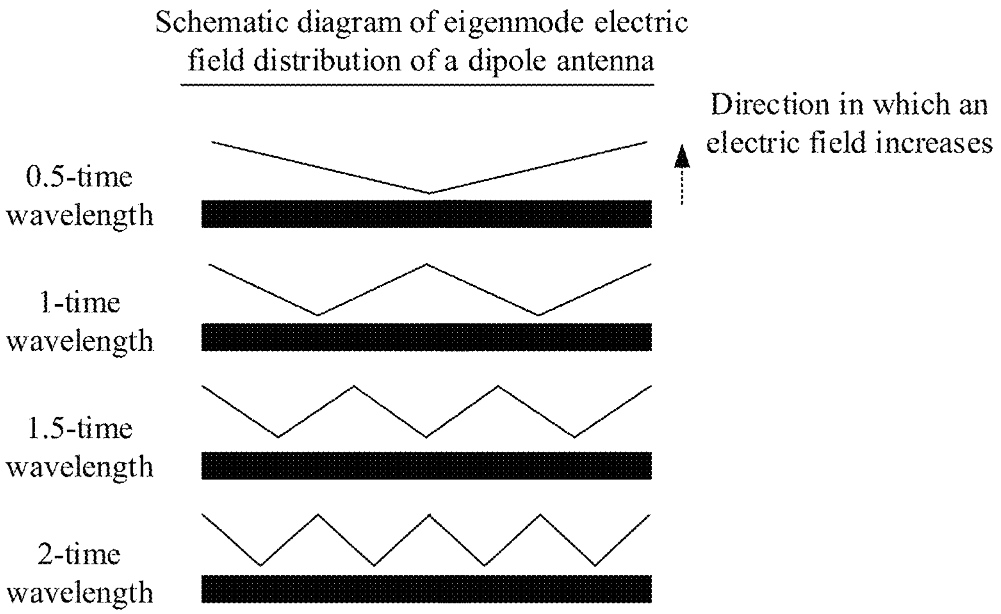
FIG. 12 is a schematic diagram of eigenmode electric field distribution of a dipole antenna.

For example, with reference to FIG. 12, that the radiation part is a dipole antenna is used as an example, and a correspondence between electric field strength and each part of the dipole antenna in each wavelength mode is described in the example. For the 0.5 M-time wavelength, that N=1, namely, the 0.5-time wavelength, is used as an example, electric fields at two ends of the dipole antenna are strong, and an electric field at a middle location is weak. For the N-time wavelength, that N=1, namely, the 1-time wavelength, is used as an example, electric fields at the two ends of the dipole antenna are strong, and an electric field at the middle location is also strong. Two points with a small electric field may also be distributed on the dipole antenna. The points with a small electric field and a point with a large electric field alternately appear successively.

Figure 13:
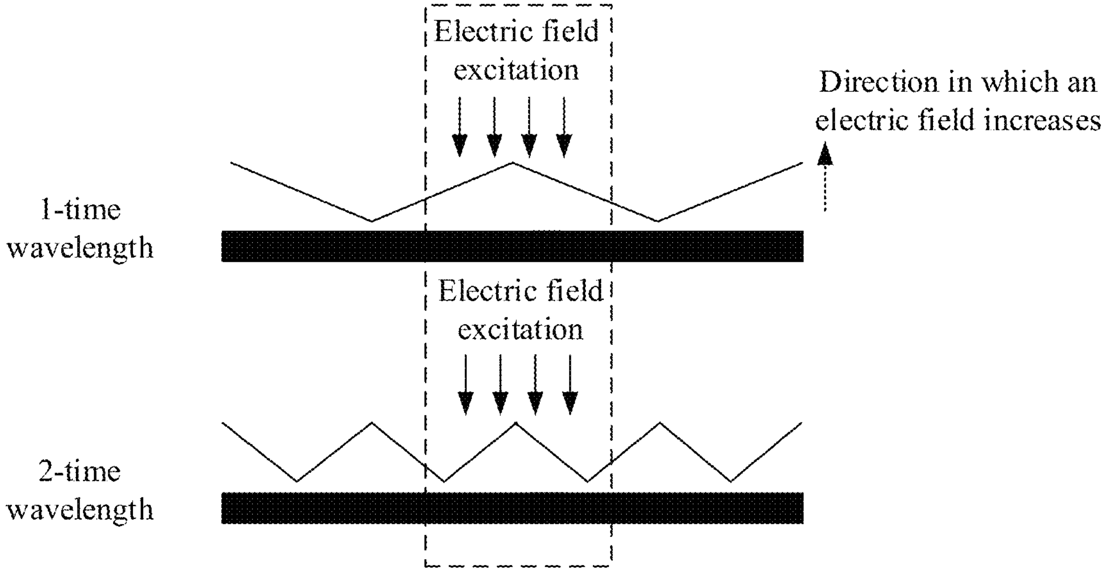
FIG. 13 is a schematic diagram of an electric field excitation solution according to an embodiment of this application.

Based on this, in this embodiment of this application, the excitation part may be disposed at a location of a point with a large electric field in a corresponding wavelength mode to excite the mode. For example, with reference to FIG. 13, the 1-time wavelength is used as an example, and the excitation part (not shown in the figure) is disposed at the middle location of the radiation part (namely, the dipole antenna). Based on an electric field between the excitation part and the radiation part, coupling feeding is implemented for the radiation part. However, because an eigenmode electric field of the radiation part is a strong point at the middle part, it is easy to excite and obtain radiation in the 1-time wavelength mode by performing electric field excitation at this location.

Similarly, for another N-time wavelength mode, for example, the 2-time wavelength mode, electric field excitation may also be performed at the middle location of the dipole antenna to obtain a corresponding radiation mode.

That is, when the radiation part has a structural characteristic of the dipole antenna, if the excitation part is disposed at the middle location, excitation can be implemented for the N-time wavelength such as the 1-time wavelength and the 2-time wavelength.

In addition, in an operating process of the excitation part in the antenna solution provided in this embodiment of this application, a low-impedance common-mode feed is disposed on the excitation part, so that electric field excitation can be generated. In this way, low-impedance common-mode feeding is used to excite the N-time wavelength on the radiation part.

The following describes, with reference to a specific structure, an implementation of the antenna solution provided in this embodiment of this application.

Figure 14:
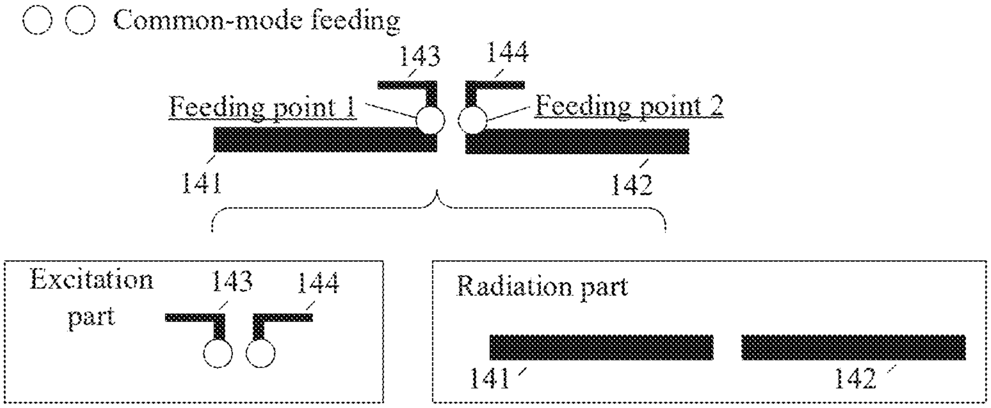
FIG. 14 is a schematic diagram of a terminal antenna solution according to an embodiment of this application.

For example, FIG. 14 shows a composition of an antenna solution according to an embodiment of this application.

In the antenna solution, a composition of an antenna may include an excitation part and a radiation part. The excitation part may be disposed on a same side of a radiator of the radiation part. In an example in FIG. 14, the radiation part is a dipole antenna, and two arms of the dipole antenna are collinear. For example, the radiation part may include a radiator 141 and a radiator 142. In some embodiments, long sides of the radiator 141 and the radiator 142 are collinear, and the radiator 141 and the radiator 142 are not connected to each other. In this case, the excitation part may be disposed on a same side on which the two arms are collinear, or it may be described as follows: the excitation part may be disposed on a same side of a straight line in which a long arm of the radiation part is located.

The excitation part may include a radiator 143 and a radiator 144. The radiator 143 and the radiator 144 may be separately disposed in an inverted L shape. A feeding point, for example, a feeding point 1, may be disposed at a location on the radiator 143 close to the radiator 141. In this case, the radiator 143 is connected, at the feeding point 1, to an end of the radiator 141 close to the radiator 142. A feeding point, for example, a feeding point 2, may be disposed at a location on the radiator 144 close to the radiator 142. In this case, the radiator 144 is connected, at the feeding point 2, to an end of the radiator 142 close to the radiator 141. When a structure having the foregoing characteristics is disposed, in some embodiments, the excitation part and the radiation part may be axisymmetric about a perpendicular bisector of the dipole antenna.

Figure 15:
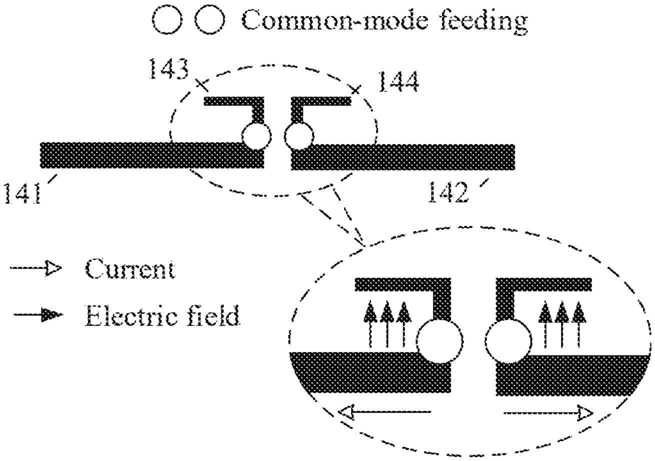
FIG. 15 is a schematic diagram of an operating mechanism of a terminal antenna solution according to an embodiment of this application.

Common-mode feeding may be performed on the radiator 143 and the radiator 144 by using the two feeding points (for example, the feeding point 1 and the feeding point 2). For example, as shown in FIG. 15, a unidirectional current may be obtained on the radiator 143 and the radiator 144 through common-mode feeding. For example, a direction of a current on the radiator 143 may point from the feeding point 1 to an open end of the radiator 143, and a direction of a current on the radiator 144 may point from the feeding point 2 to an open end of the radiator 144. In this case, a direction of an electric field between the radiator 143 and the radiator 141 may be the same as a direction of an electric field between the radiator 144 and the radiator 142. With the same-direction electric field, electric field excitation at a middle location of the radiation part (namely, the dipole antenna) is implemented. With reference to eigenmode electric field distribution of the dipole antenna in FIG. 12, the middle location of the dipole antenna may be a point with a large electric field in an N-time wavelength mode. Therefore, electric field excitation can be performed at the point with a large electric field to excite the N-time wavelength (for example, a 1-time wavelength or a 2-time wavelength). Still with reference to FIG. 15, the excitation part and the radiation part that are provided in this embodiment of this application are disposed, so that a same-direction electric field can be generated between the excitation part and the radiation part, thereby implementing electric field excitation at the middle location of the dipole antenna.

It should be noted that in this example, feeding signals fed into the feeding point 1 and the feeding point 2 may be low-impedance common-mode signals. Therefore, in the N-time wavelength mode, the common-mode feeding signal does not directly excite the radiation part to operate, and therefore does not affect an operating status that is of the antenna and that is based on electric field excitation.

Figure 16:
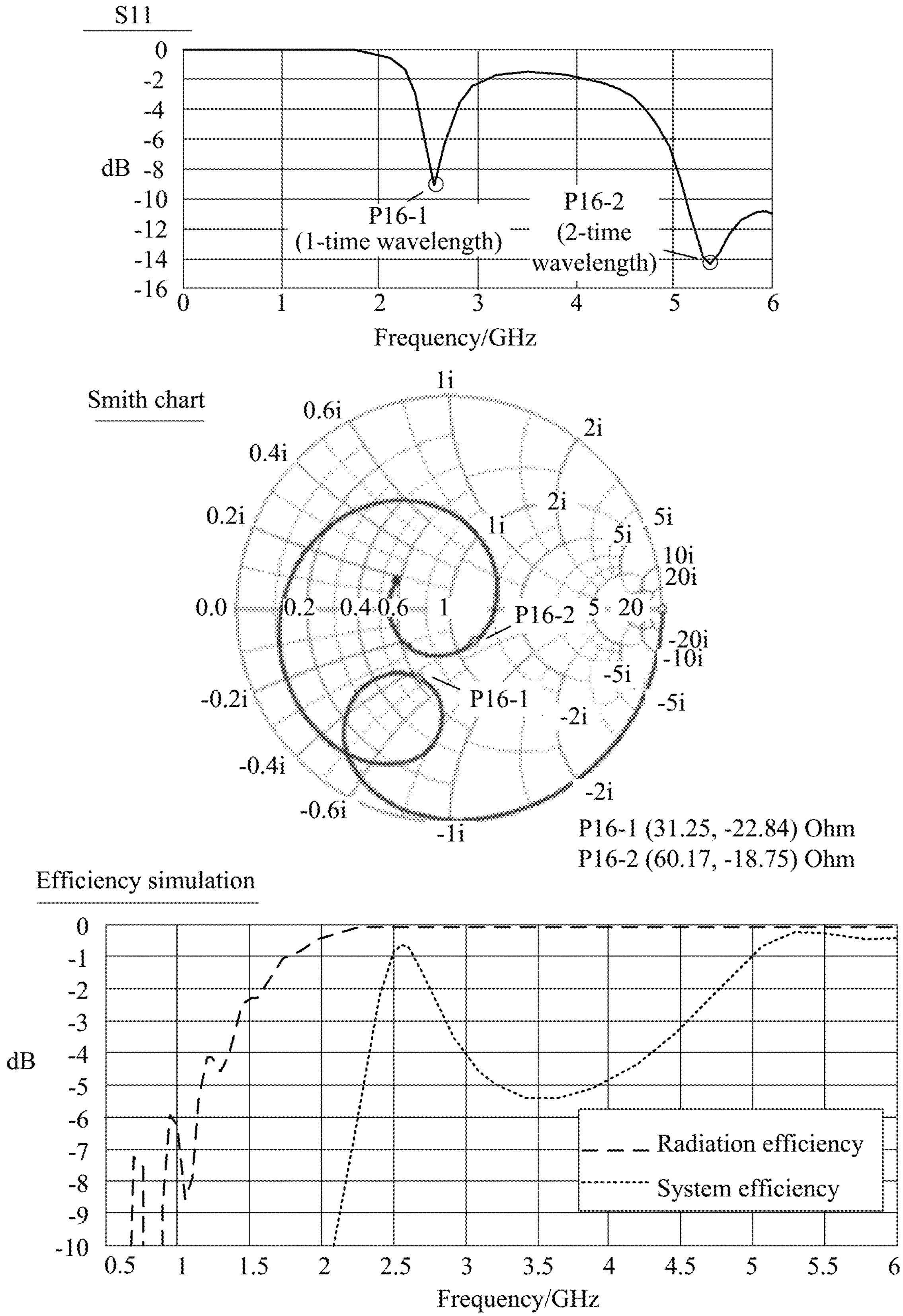
FIG. 16 is a schematic diagram of S parameter simulation of a terminal antenna solution according to an embodiment of this application.

FIG. 16 shows simulation of an antenna solution with the composition shown in FIG. 14 or FIG. 15. For example, the radiation part has a same structure size as a simulation result shown in FIG. 6. In the excitation part, a part of the radiator 143 parallel to the radiator 141 may be set to 11 mm, and a distance between the radiator 143 and the radiator 141 may be set to 3 mm. The following simulation result may be obtained based on the size. It should be noted that setting of the size is merely a design used for subsequent description, and does not constitute an actual limitation on this embodiment of this application. It can be seen from S11 simulation shown in FIG. 16 that the 1-time wavelength and the 2-time wavelength can be excited through electric field excitation. For example, the 1-time wavelength may be at a location shown by P16-1 in S11, and the 2-time wavelength may be at a location shown by P16-2 in S11. Based on a Smith chart, a port matching situation corresponding to each frequency of current excitation resonance can be seen. As shown by the Smith chart in FIG. 16, impedance of P16-1 corresponding to the 1-time wavelength is 31.25 ohms (Ohm), namely, low impedance. Similarly, impedance of P16-2 corresponding to the 2-time wavelength is 60.17 ohms (Ohm), and is also low impedance. Therefore, P16-1 and P16-2 can be excited through low-impedance excitation, that is, the 1-time wavelength and the 2-time wavelength are excited. It should be understood that in this example, only excitation within 6 GHz is shown. Based on the foregoing descriptions, a mode related to another N-time wavelength (for example, a 3-time wavelength and a 4-time wavelength) may also be excited and obtained by using the antenna composition shown in FIG. 14 or FIG. 15.

FIG. 16 also shows efficiency simulation of an antenna solution with the composition shown in FIG. 14 or FIG. 15. Simulation results of radiation efficiency and system efficiency are provided in this efficiency simulation. The radiation efficiency may be used to identify an optimal radiation effect that can be achieved when the current antenna composition is in a matching state on each band. Correspondingly, the system efficiency may be used to identify an actual radiation effect obtained by the current antenna composition in case of current port matching. It can be seen that, near 2.5 GHz corresponding to P16-1, radiation efficiency is close to 0 dB, and system efficiency exceeds −1 dB, indicating that resonance generated near the 1-time wavelength based on the antenna solution has good radiation performance. Similarly, near 5.3 GHz corresponding to P16-2, radiation efficiency is close to 0 dB, and system efficiency exceeds −0.5 dB and is close to 0 dB, indicating that resonance generated near the 2-time wavelength based on the antenna solution has good radiation performance.

Therefore, through simulation shown in FIG. 16, it can indicate that the antenna solution with the composition shown in FIG. 14 or FIG. 15 has good radiation performance.

Figure 17:
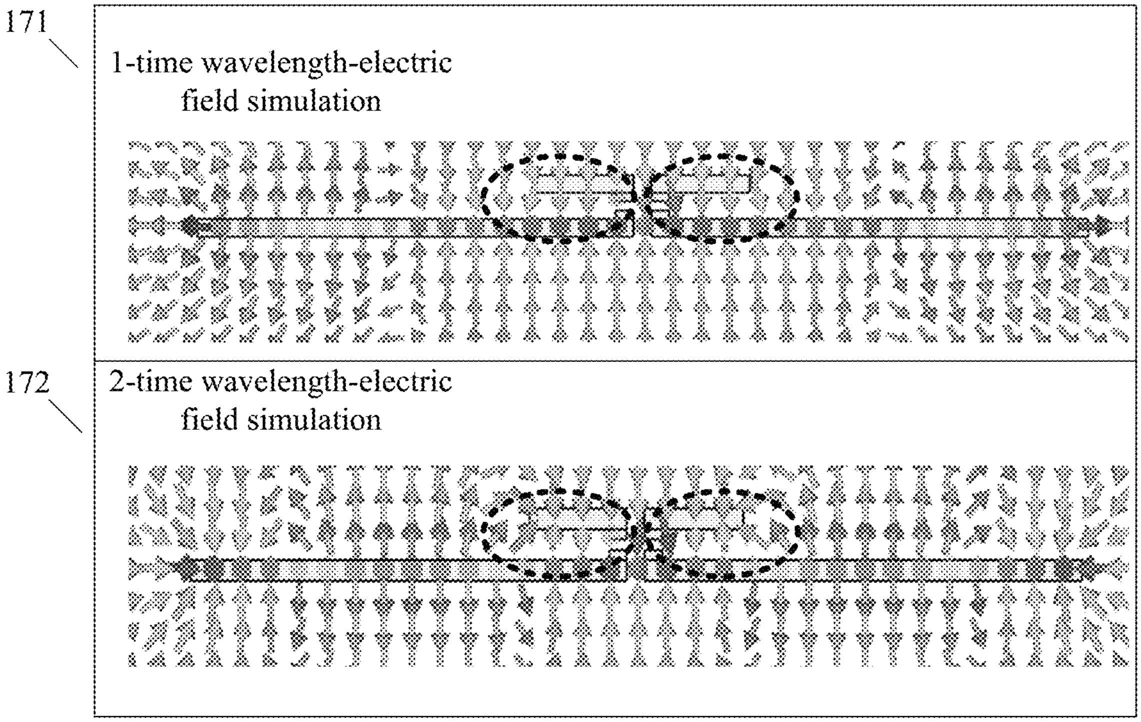
FIG. 17 is a schematic diagram of electric field parameter simulation of a terminal antenna solution according to an embodiment of this application.

FIG. 17 shows electric field distribution in an operating process of an antenna solution with the composition shown in FIG. 14 or FIG. 15. 171 shows an electric field of a corresponding frequency (namely, the 1-time wavelength) at P16-1. It can be seen that a same-direction electric field (for example, a downward same-direction electric field) may be distributed between the excitation part and the radiation part. Therefore, the description of electric field excitation in the description shown in FIG. 15 is supported. 172 shows an electric field of a corresponding frequency (namely, the 2-time wavelength) at P16-2. It can be seen that a same-direction electric field (for example, a downward same-direction electric field) may be distributed between the excitation part and the radiation part. Therefore, the description of electric field excitation in the description shown in FIG. 15 is also supported. Based on electric field simulation of the frequencies corresponding to the 1-time wavelength and the 2-time wavelength, an effect of electric field excitation in the operating process of the antenna solution is the same as that described in FIG. 15. It should be understood that for the mode related to the another N-time wavelength (for example, the 3-time wavelength and the 4-time wavelength), the antenna solution with the composition in FIG. 14 or FIG. 15 can also provide an effect of corresponding electric field excitation. Details are not described herein again.

Figure 18:
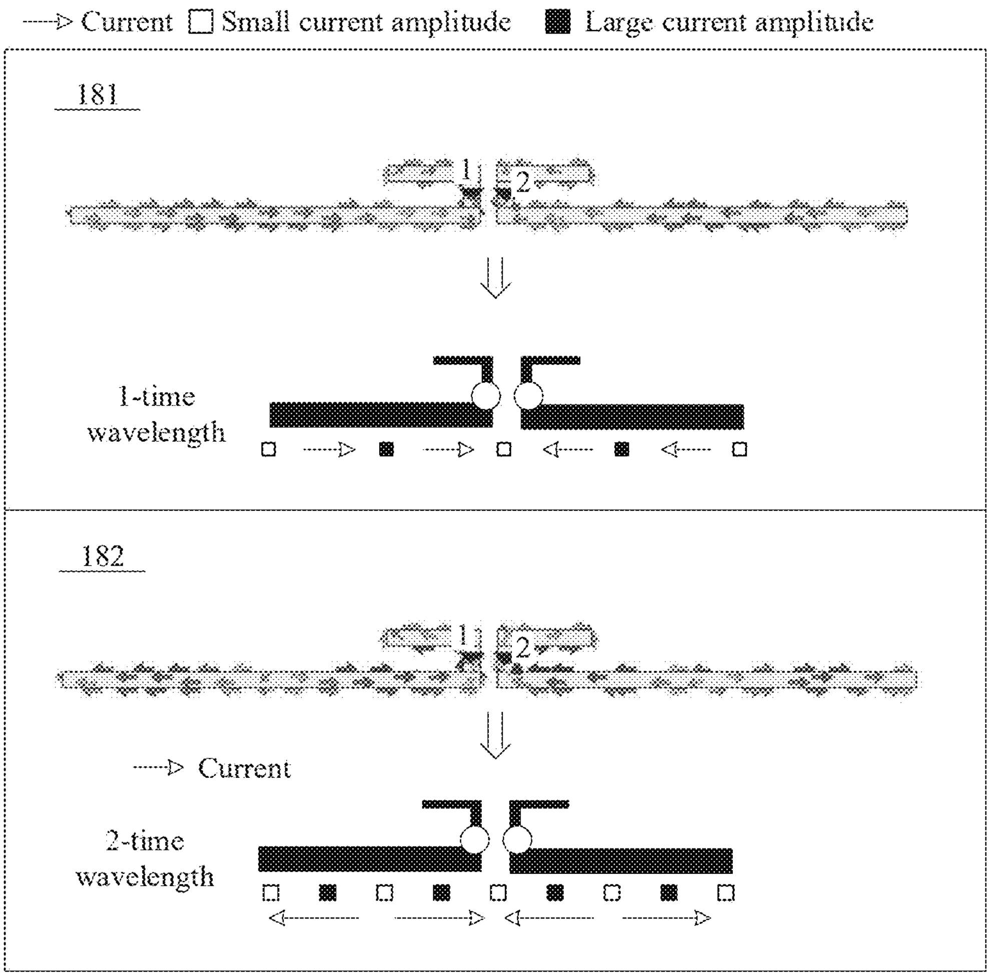
FIG. 18 is a schematic diagram of current parameter simulation of a terminal antenna solution according to an embodiment of this application.

To describe the solution provided in this embodiment of this application more clearly, FIG. 18 shows current distribution simulation of a radiation part that mainly plays a radiation role when the antenna solution with the composition shown in FIG. 14 or FIG. 15 operates. For ease of description, logic of current distribution in a corresponding case is also shown. In an example in FIG. 18, 181 shows current distribution of a frequency near the 1-time wavelength. In this scenario, three points with a small current and two points with a large current may be distributed on the radiation part. Two ends of the radiation part are points with a small current. The points with a small current and the points with a large current are alternately distributed on the radiation part. In comparison with current distribution of the 1-time wavelength excited through conventional high-impedance differential-mode feeding shown in FIG. 5, it can be seen that although distribution of the points with a large current and the points with a small current is similar, there is a significant difference between current directions at a middle location of the radiation part. For example, in 181 shown in FIG. 18, in a solution of the 1-time wavelength excited based on an electric field excitation solution provided in this application, there is a current reverse point at the middle location of the radiation part. Correspondingly, in a conventional high-impedance differential-mode feeding solution shown in FIG. 5, there is no current reversal at the middle location of the radiation part. To be specific, for the N-time wavelength mode obtained based on electric field excitation provided in this application, current distribution thereof is different from current distribution in the N-time wavelength mode in the conventional high-impedance differential-mode feeding solution.

FIG. 18 further shows current distribution on the radiation part at the 2-time wavelength. It can be seen that there is also a current reverse point at the middle location of the radiation part. By analogy, this current reverse characteristic is caused by electric field excitation based on common-mode feeding. Therefore, during operating in the mode related to the another N-time wavelength (for example, the 3-time wavelength and the 4-time wavelength), there is also a current reverse characteristic at the middle location of the radiation part.

Figure 19:
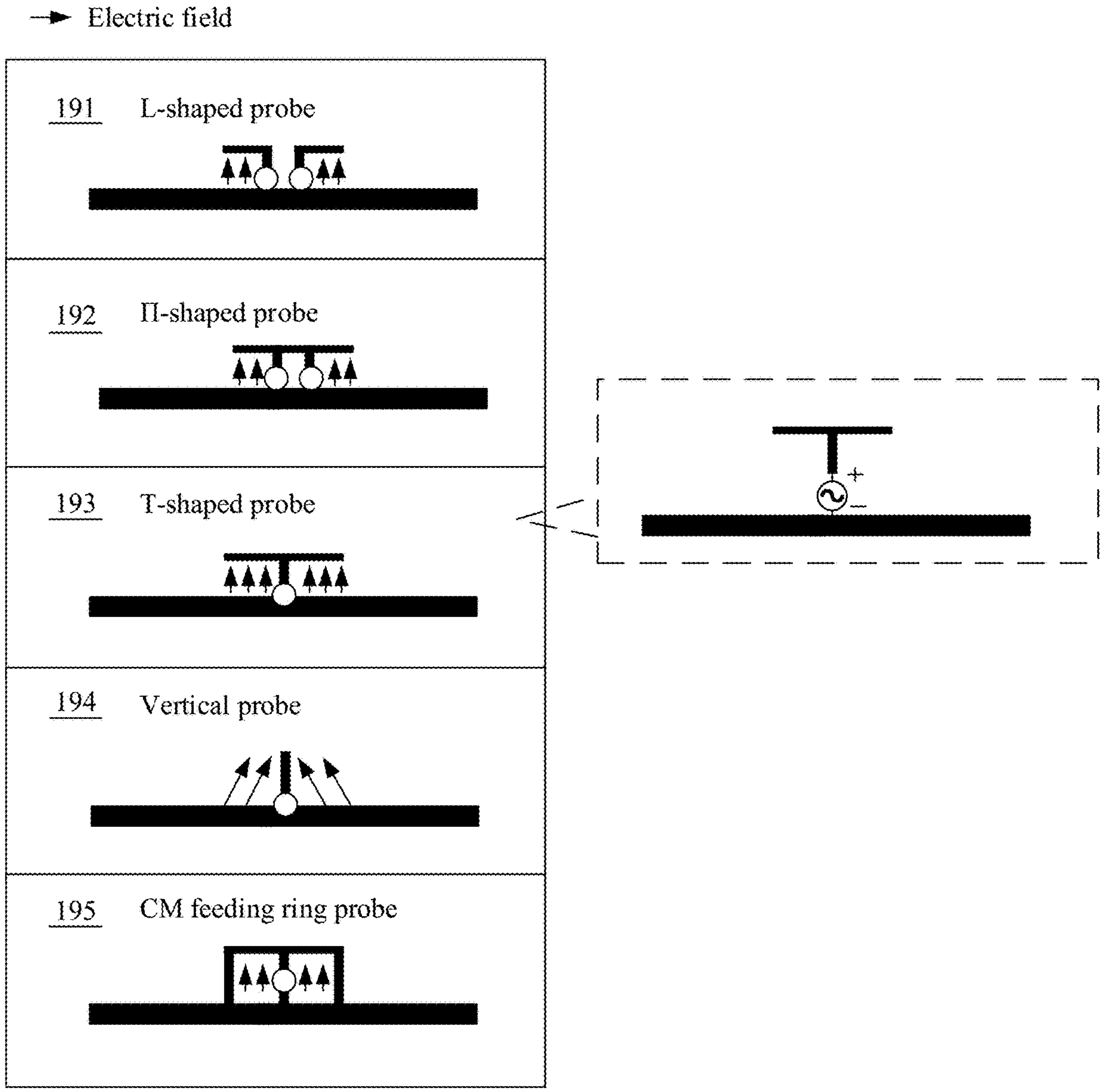
FIG. 19 is a schematic diagram of an implementation of a direct feeding solution of a terminal antenna solution according to an embodiment of this application.

In the examples in FIG. 14-FIG. 18, that the excitation part includes 143 and 144 shown in FIG. 14 is used as an example for description. In some other embodiments of this application, the excitation part may further have another structural composition. For example, FIG. 19 shows several specific examples of an excitation part according to an embodiment of this application. With any structure in this example, a same-direction electric field generated between the excitation part and the radiation part based on low-impedance common-mode feeding can also be excitated, so that resonance corresponding to the N-time wavelength can be obtained on the radiation part through electric field excitation.

For example, as shown in FIG. 19, 191 shows a structure of an excitation part of an L-shaped probe. In this example, the structure of the excitation part may be similar to the structure shown in FIG. 14. It should be noted that in this example, a composition of the radiation part (for example, a dipole antenna) may be different from a split structure shown in FIG. 14. In the example in FIG. 14, the two arms (for example, 141 and 142) of the dipole antenna may not be connected to each other at the middle location of the radiation part. In an example in 191, the two arms of the dipole antenna may alternatively be continuous radiators connected to each other. In subsequent examples, as shown in 191, the radiators corresponding to the radiation part may be connected to each other. Certainly, as shown in FIG. 14, the radiators corresponding to the radiation part may not be connected to each other. In the following descriptions, that the radiator of the radiation part includes two arms connected to each other is used as an example. In this example, for a specific implementation of common-mode feeding, refer to 31 or 32 in FIG. 3. Certainly, common-mode feeding may be implemented in another manner, for example, an equi-amplitude in-phase current is input into the L-shaped probe to implement common-mode feeding.

As shown in FIG. 19, 192 shows a π-shaped probe. In this example, the excitation part may include a continuous radiator. The radiator may be disposed in a π-shape, for example, the radiator may include a part parallel to the radiation part and two stubs disposed between this part and the radiation part. One end of each of the two stubs may be connected to the part that is of the π-shaped probe and that is parallel to the radiation part. A feeding point may be disposed at the other end of each of the two stubs, to perform feeding by using a low-impedance common-mode feed. The other end of the feed may be connected to the radiation part. In some embodiments, the π-shaped probe may be disposed at the middle location of the radiation part. This antenna including the π-shaped probe and the radiation part may have an axisymmetric structural characteristic. When the antenna shown in 192 operates, a same-direction electric field may be generated between the radiation part and the part that is of the π-shaped probe and that is parallel to the radiation part, to excite the radiation part to perform radiation based on the N-time wavelength mode. In this example, for a specific implementation of common-mode feeding, refer to 31 or 32 in FIG. 3. Certainly, the specific implementation of common-mode feeding may be implemented in another manner, and an equi-amplitude in-phase current is input into the π-shaped probe to implement input of common-mode feeding.

As shown in FIG. 19, 193 shows a T-shaped probe. In this example, the excitation part may include a continuous radiator. The radiator may be disposed in a T-shape, for example, the radiator may include a part parallel to the radiation part and one stub disposed between this part and the radiation part. One end of the stub may be connected to the part that is of the T-shaped probe and that is parallel to the radiation part. A feeding point may be disposed at the other end of the stub, and the feeding point is used to dispose a feed for feeding. The other end of the feed may be connected to the radiation part. In some embodiments, the T-shaped probe may be disposed at the middle location of the radiation part. This antenna including the T-shaped probe and the radiation part may have an axisymmetric structural characteristic. In this example, a specific implementation of the T-shaped probe in this example is also provided. For example, the feed may be connected in series between the excitation part and the radiation part, to implement signal feeding similar to common-mode feeding on the T-shaped probe. It should be understood that, in this example, the feed is connected in series between the radiation part and the excitation part, instead of connecting the feed in series on the radiator in conventional differential-mode feeding. A structural implementation is different, and a specific effect is also different. When the antenna shown in 193 operates, a same-direction electric field may be generated between the radiation part and the part that is of the T-shaped probe and that is parallel to the radiation part, to excite the radiation part to perform radiation based on the N-time wavelength mode. It should be understood that, from an equivalent perspective, one feed disposed in this example may be considered as a combination of two ports corresponding to a common-mode feed. In some embodiments, the feed disposed in this example may be a low-impedance feed. In the following example, for a signal feeding solution in which common-mode feeding is implemented by disposing one feed, refer to an implementation solution in this example, for example, an effect similar to common-mode feeding is implemented by connecting a feed in series at a corresponding location.

As shown in FIG. 19, 194 shows a vertical probe. In this example, the excitation part may include one radiator. The radiator may be disposed vertically, for example, the radiator may be perpendicular to the radiation part. A feeding point may be disposed between the vertical probe and the radiation part. The feeding point is used to dispose a feed for feeding. In some embodiments, the vertical probe may be disposed at the middle location of the radiation part. This antenna including the vertical probe and the radiation part may have an axisymmetric structural characteristic. When the antenna shown in 194 operates, an electric field may be formed between the vertical probe and a partial radiator of the radiation part close to the probe. For example, as shown in 194, an electric field pointing from the radiation part to an end of the probe away from the radiation part may be distributed on the left of the vertical probe. At a current moment, after orthogonal decomposition, in a vertical direction, a direction of the electric field may be upward. An electric field pointing from the radiation part to the end of the probe away from the radiation part may be distributed on the other side (for example, right) of the vertical probe. At a current moment, after orthogonal decomposition, in the vertical direction, a direction of the electric field may also be upward. That is, a same-direction electric field in the vertical direction may be distributed on the two sides of the vertical probe. In this case, the radiation part is excited to perform radiation based on the N-time wavelength mode. It should be understood that, from an equivalent perspective, one feed disposed in this example may be considered as a combination of two ports corresponding to a common-mode feed. In some embodiments, the feed disposed in this example may be a low-impedance feed.

As shown in FIG. 19, 195 shows a CM feeding ring probe. In this example, the excitation part may include one CM feeding ring. The CM feeding ring may include two annular structures coupled to each other. For example, the two annular structures may include two rectangular radiation rings. The two rectangular radiation rings each have one side connected to (or shared with) each other. A feeding point may be disposed on the shared side, and the feeding point is used to dispose a feed for feeding. In this example, the two annular structures each may further include one side connected to (or partially shared with) the radiation part. In some embodiments, the two annular structures included in the CM feeding ring may be two annular structures with a same structure size. The CM feeding ring probe may be disposed at the middle location of the radiation part. This antenna including the CM feeding ring probe and the radiation part may have an axisymmetric structural characteristic. When the antenna shown in 195 operates, a same-direction electric field may be distributed inside the annular structures corresponding to the CM feeding ring probe, so that the radiation part is excited to perform radiation based on the N-time wavelength mode. It should be understood that, from an equivalent perspective, one feed disposed in this example may be considered as a combination of two ports corresponding to a common-mode feed. In some embodiments, the feed disposed in this example may be a low-impedance feed.

From another perspective, the CM feeding ring probe may be further described as follows: The CM feeding ring probe includes an annular radiator provided with an opening, two ends of the opening of the annular radiator are separately connected to the radiation part, one feed is disposed in the annular radiator, one end of the feed is connected to the annular radiator, and the other end of the feed is connected to the radiation part in the opening.

It should be noted that, in the examples shown in FIG. 14-FIG. 19, the radiators of the excitation part and the radiation part are directly connected or connected by using the feed, namely, a direct-feeding connection manner. In some other embodiments of this application, electric field excitation for the N-time wavelength mode based on low-impedance common-mode feeding may be implemented through coupling feeding.

Figure 20:
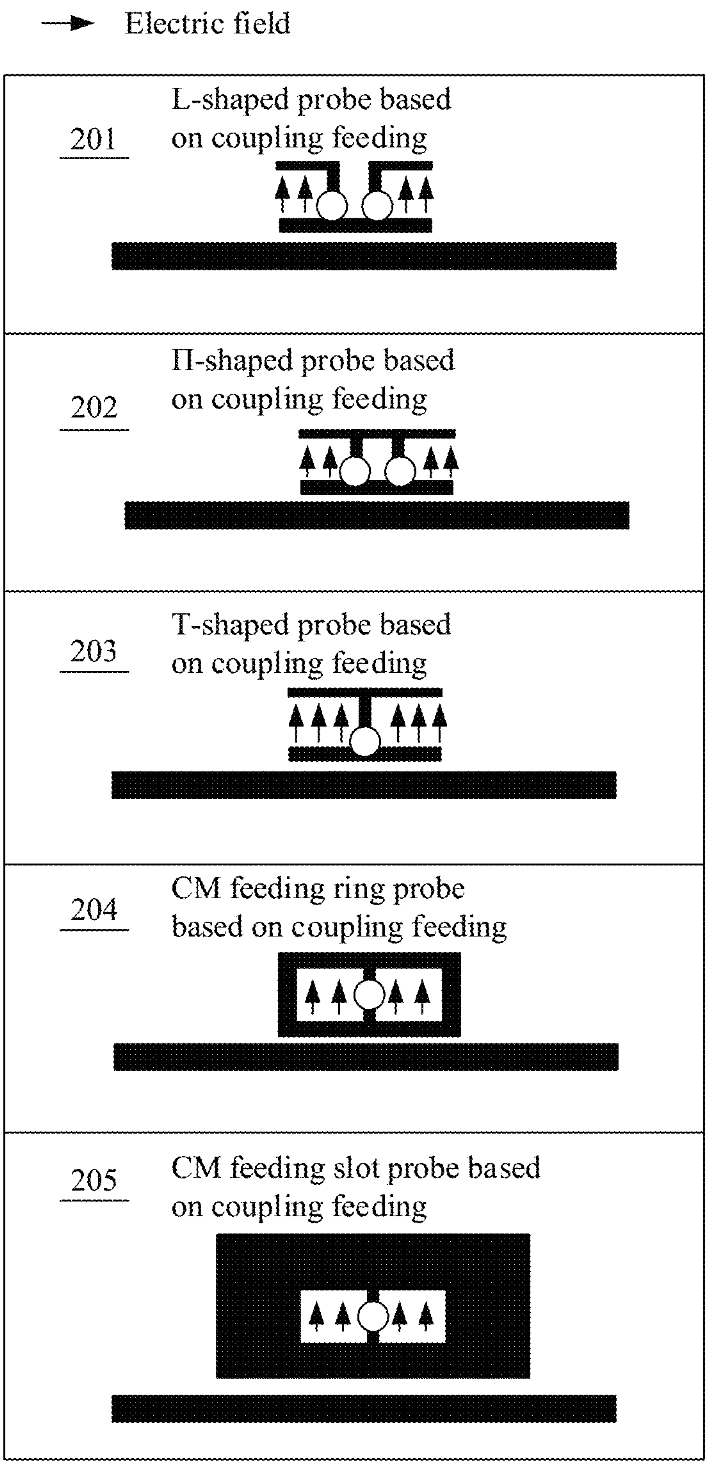
FIG. 20 is a schematic diagram of an implementation of a coupling feeding solution of a terminal antenna solution according to an embodiment of this application.

For example, FIG. 20 shows examples of several antenna solutions based on coupling feeding according to an embodiment of this application. In this example, structural compositions of the excitation part are similar to the structural compositions shown in FIG. 14-FIG. 19, and may be in a one-to-one correspondence with the structural compositions. A difference lies in that the excitation part and the radiation part are not directly connected or connected by using a feed. The following describes this difference in detail.

In the example in FIG. 20, 201 shows a coupling feeding solution based on an L-shaped probe. A composition of the L-shaped probe may correspond to 191 shown in FIG. 19. In an example in 201, an end of the L-shaped probe close to the radiation part is not connected to the radiation part by using a feed. In this example, the end of the L-shaped probe close to the radiation part may be connected, by using a feed, to another radiator (also referred to as a coupling radiator) parallel to the radiation part. The coupling radiator and the radiation part are not connected to each other. Therefore, the structure including the L-shaped probe and the radiator parallel to the radiation part may constitute the L-shaped probe based on coupling feeding provided in this example. In some embodiments, this antenna including the L-shaped probe based on coupling feeding and the radiation part may have an axisymmetric structural characteristic.

In the example in FIG. 20, 202 shows a coupling feeding solution based on a π-shaped probe. A composition of the π-shaped probe may correspond to 192 shown in FIG. 19. In an example in 202, an end of the π-shaped probe close to the radiation part is not connected to the radiation part by using a feed. In this example, the end of the π-shaped probe close to the radiation part may be connected, by using a feed, to another coupling radiator parallel to the radiation part. The coupling radiator and the radiation part are not connected to each other. Therefore, the structure including the π-shaped probe and the radiator parallel to the radiation part may constitute the π-shaped probe based on coupling feeding provided in this example. In some embodiments, this antenna including the π-shaped probe based on coupling feeding and the radiation part may have an axisymmetric structural characteristic.

In the example in FIG. 20, 203 shows a coupling feeding solution based on a T-shaped probe. A composition of the T-shaped probe may correspond to 193 shown in FIG. 19. In an example in 203, an end of the T-shaped probe close to the radiation part is not connected to the radiation part by using a feed. In this example, the end of the T-shaped probe close to the radiation part may be connected to another coupling radiator by using a feed. The coupling radiator and the radiation part are not connected to each other. Therefore, the structure including the T-shaped probe and the coupling radiator may constitute the T-shaped probe based on coupling feeding provided in this example. In some embodiments, this antenna including the T-shaped probe based on coupling feeding and the radiation part may have an axisymmetric structural characteristic.

In the example in FIG. 20, 204 shows a coupling feeding solution based on a CM feeding ring probe. A composition of the CM feeding ring probe may correspond to 195 shown in FIG. 19. In an example in 204, sides that are of two annular structures corresponding to the CM feeding ring probe and that are close to the radiation part may be separated from the radiation part. That is, the two annular structures corresponding to the CM feeding ring probe are not directly connected to the radiation part. Therefore, the structure including the two annular structures not connected to the radiation part may constitute the CM feeding ring probe based on coupling feeding provided in this example. In some embodiments, this antenna including the CM feeding ring probe based on coupling feeding and the radiation part may have an axisymmetric structural characteristic.

In the example in FIG. 20, a coupling feeding solution based on a CM feeding slot probe is provided. As shown in 205, a composition of the CM feeding slot probe is similar to the structural characteristic of the CM feeding ring probe shown in 204. A difference lies in that the annular structure in the CM feeding ring probe shown in 204 includes a radiator part with a smaller width. When the probe shown in 204 operates, radiation is mainly performed by using a current on the annular structure. Correspondingly, in the CM feeding slot probe shown in 205, a radiator width is larger, that is, an inner part of the ring is compressed based on the annular structure shown in 204, so that a slot is obtained at a location corresponding to each annular structure. When the CM feeding slot probe shown in 205 operates, radiation is mainly performed by using the slot.

In the example of each coupling feeding probe shown in FIG. 20, a same-direction electric field can be generated between the probe and the radiation part to excite the N-time wavelength mode on the radiation part. An operating situation and an operating mechanism thereof are similar to those of the solutions shown in FIG. 19. Details are not described herein again.

In the foregoing example descriptions for FIG. 14-FIG. 20, electric field excitation is performed at the point with a large electric field in the N-time wavelength mode based on the eigenmode electric field distribution of the radiation part, to excite the N-time wavelength through low-impedance common-mode feeding. It should be understood that a location of electric field excitation may be a point with a large eigenmode electric field corresponding to the middle location of the radiation part shown in any one of FIG. 14-FIG. 20. In some other embodiments, electric field excitation may alternatively be set at another point with a large eigenmode electric field on the radiation part.

Figure 21:
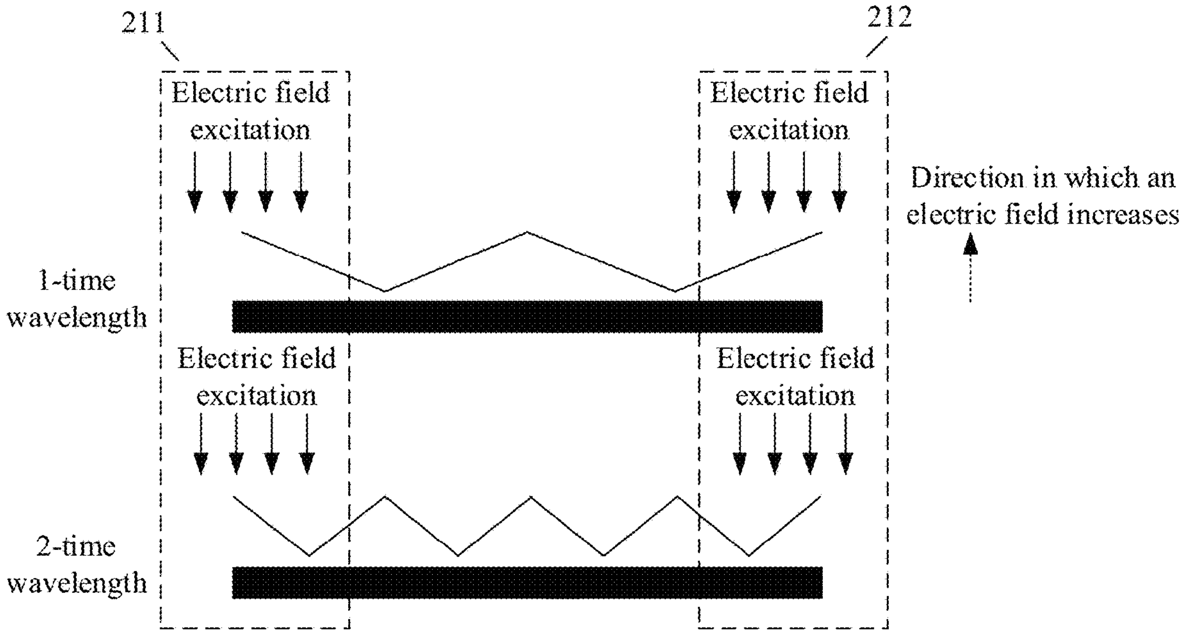
FIG. 21 is a schematic diagram of an electric field excitation solution according to an embodiment of this application.

For example, as shown in FIG. 21, in some embodiments, electric field excitation may be set at the two ends of the radiation part. Based on eigenmode electric field distribution of the radiation part, that the radiation part is a dipole antenna is used as an example. In the N-time wavelength mode (for example, the 1-time wavelength and the 2-time wavelength), the two ends of the radiation part are points with a large electric field. For example, as shown in FIG. 21, at an end shown in 211, electric field excitation may be set to excite the 1-time wavelength and the 2-time wavelength. For another example, at an end shown in 212, electric field excitation may also be set to excite the 1-time wavelength and the 2-time wavelength.

Based on this, an embodiment of this application further provides an antenna solution, to excite an N-time wavelength mode based on electric field excitation generated through low-impedance common-mode feeding. For example, referring to FIG. 22, in this example, an antenna may include a radiation part and an excitation part. The radiation part may include a radiator 221, and the radiator 221 may correspond to a dipole antenna. The excitation part may include a radiator 223 and a radiator 224 that are of an inverted L-shaped structure. The radiator 223 and the radiator 224 may be respectively disposed at corresponding locations at two ends of the radiator 221. For example, a part of the radiator 223 perpendicular to the radiator 221 may be connected to the radiator 221 by using a feed. An end of a part of the radiator 223 parallel to the radiator 221 is connected to the part perpendicular to the radiator 221. The part of the radiator 223 parallel to the radiator 221 extends from a perpendicular line, on which the part of the radiator 223 perpendicular to the radiator 221 is located, to a median of the radiator 221. In this way, in a vertical direction, a projection of the part of the radiator 223 parallel to the radiator 221 may fall on the radiator 221. The radiator 224 may be disposed at the other end of the radiator 221 that is different from an end corresponding to the radiator 223. Similar to the radiator 223, a part of the radiator 224 perpendicular to the radiator 221 may be connected to the radiator 221 by using a feed. An end of a part of the radiator 224 parallel to the radiator 221 is connected to the part perpendicular to the radiator 221. The part of the radiator 224 parallel to the radiator 221 extends in a direction from a perpendicular line, on which the part of the radiator 224 perpendicular to the radiator 221 is located, to the median of the radiator 221. In this way, in the vertical direction, a projection of the part of the radiator 224 parallel to the radiator 221 may fall on the radiator 221.

Figure 23:
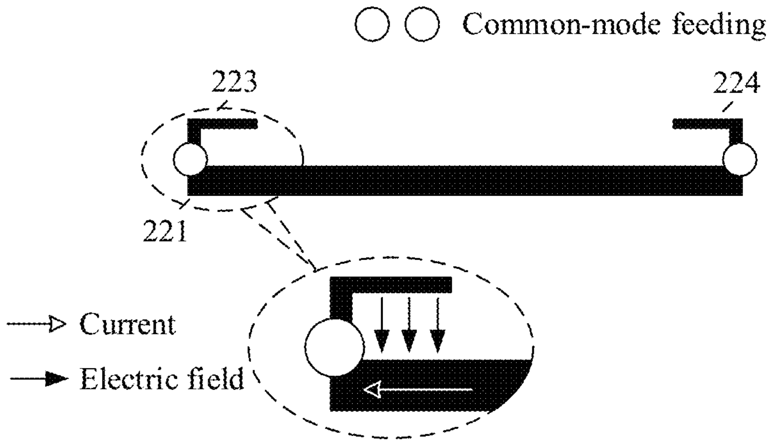
FIG. 23 is a schematic diagram of an operating mechanism of a terminal antenna solution according to an embodiment of this application.

The feeds disposed on the radiator 223 and the radiator 224 may be configured to input low-impedance common-mode feeding signals. The radiator 223 is used as an example. As shown in FIG. 23, after the feeding signal is input, an electric field may be distributed between the radiator 221 and the part of the radiator 223 parallel to the radiator 221. For example, in an example in FIG. 23, this electric field direction may be downward, and a corresponding current direction at the end of the radiator 221 may point to the end at which the radiator 223 is located. In this way, electric field excitation is implemented on an end that is of the radiator 221 and at which the radiator 223 is disposed. The radiator 224 is similar to the radiator 223, and electric field excitation can also be implemented at a location of an end of the radiator 221 close to the radiator 224. From a current perspective, a current direction at the end of the radiator 221 may point to the end at which the radiator 224 is located.

Figure 22:
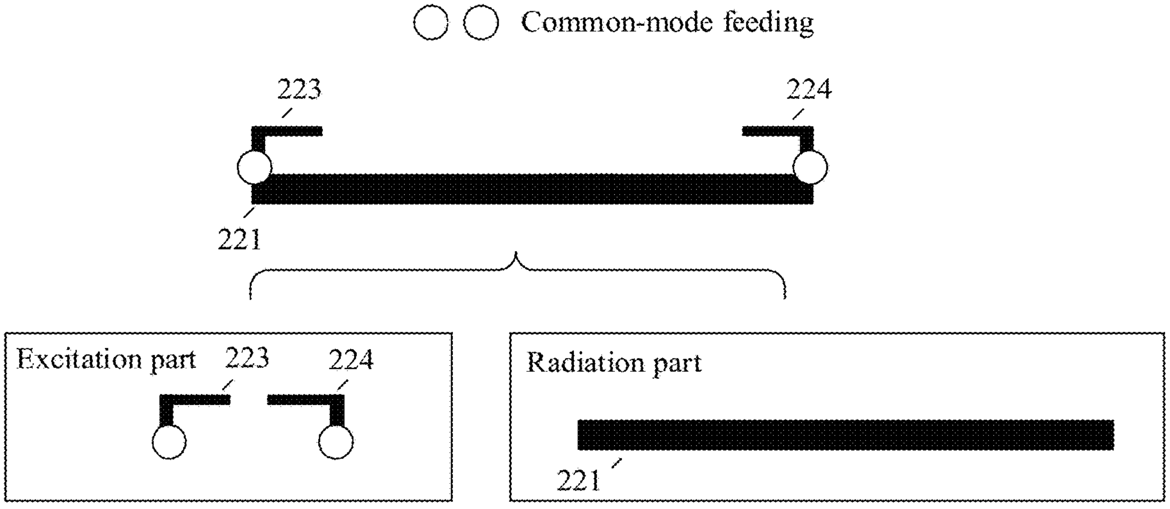
FIG. 22 is a schematic diagram of a terminal antenna solution according to an embodiment of this application.

With reference to antenna compositions provided in FIG. 22 and FIG. 23, the following describes, by using a simulation result, an effect that can be achieved in an operating process of this structure.

Figure 24:
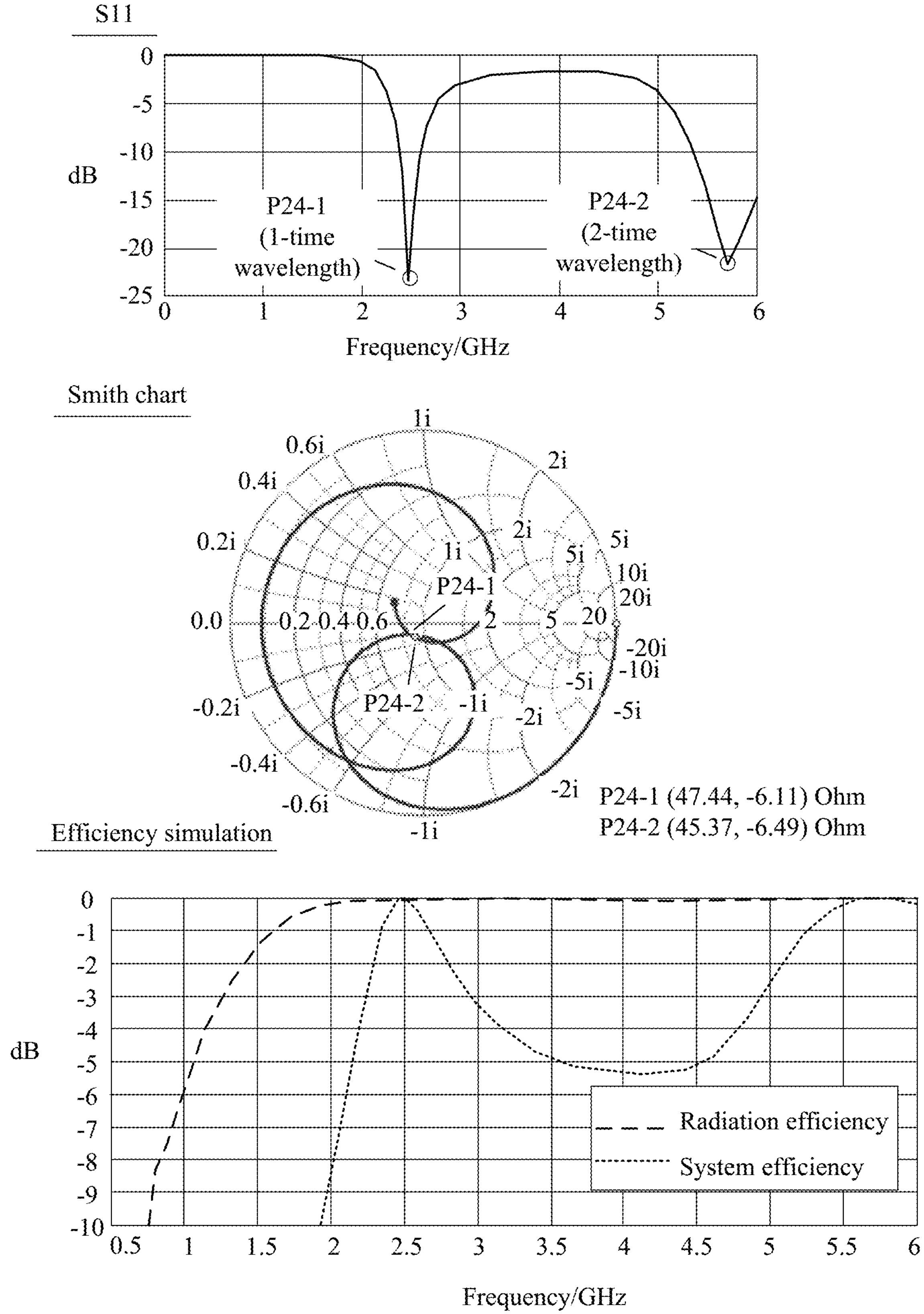
FIG. 24 is a schematic diagram of S parameter simulation of a terminal antenna solution according to an embodiment of this application.

For example, FIG. 24 shows simulation of an antenna solution with the composition shown in FIG. 22 or FIG. 23. It can be seen from S11 simulation shown in FIG. 24 that a 1-time wavelength and a 2-time wavelength can be excited through electric field excitation. For example, the 1-time wavelength may be at a location shown by P24-1 in S11, and the 2-time wavelength may be at a location shown by P24-2 in S11. Based on a Smith chart, a port matching situation corresponding to each frequency of current excitation resonance can be seen. As shown by the Smith chart in FIG. 24, impedance of P24-1 corresponding to the 1-time wavelength is 47.44 ohms (Ohm), namely, low impedance. Similarly, impedance of P24-2 corresponding to the 2-time wavelength is 45.37 ohms (Ohm), and is also low impedance. Therefore, P24-1 and P24-2 can be excited through low-impedance excitation, that is, the 1-time wavelength and the 2-time wavelength are excited. It should be understood that in this example, only excitation within 6 GHz is shown. Based on the foregoing descriptions, a mode related to another N-time wavelength (for example, a 3-time wavelength and a 4-time wavelength) may also be excited and obtained by using the antenna composition shown in FIG. 22 or FIG. 23.

FIG. 24 also shows efficiency simulation of an antenna solution with the composition shown in FIG. 22 or FIG. 23. Simulation results of radiation efficiency and system efficiency are provided in this efficiency simulation. It can be seen that, near 2.5 GHz corresponding to P24-1, both radiation efficiency and system efficiency are close to 0 dB, indicating that resonance generated near the 1-time wavelength based on the antenna solution has good radiation performance. Similarly, near 5.6 GHz corresponding to P24-2, both radiation efficiency and system efficiency are close to 0 dB, indicating that resonance generated near the 2-time wavelength based on the antenna solution has good radiation performance.

Therefore, through simulation shown in FIG. 24, it can be learned that the antenna solution with the composition shown in FIG. 22 or FIG. 23 has good radiation performance.

Figure 25:
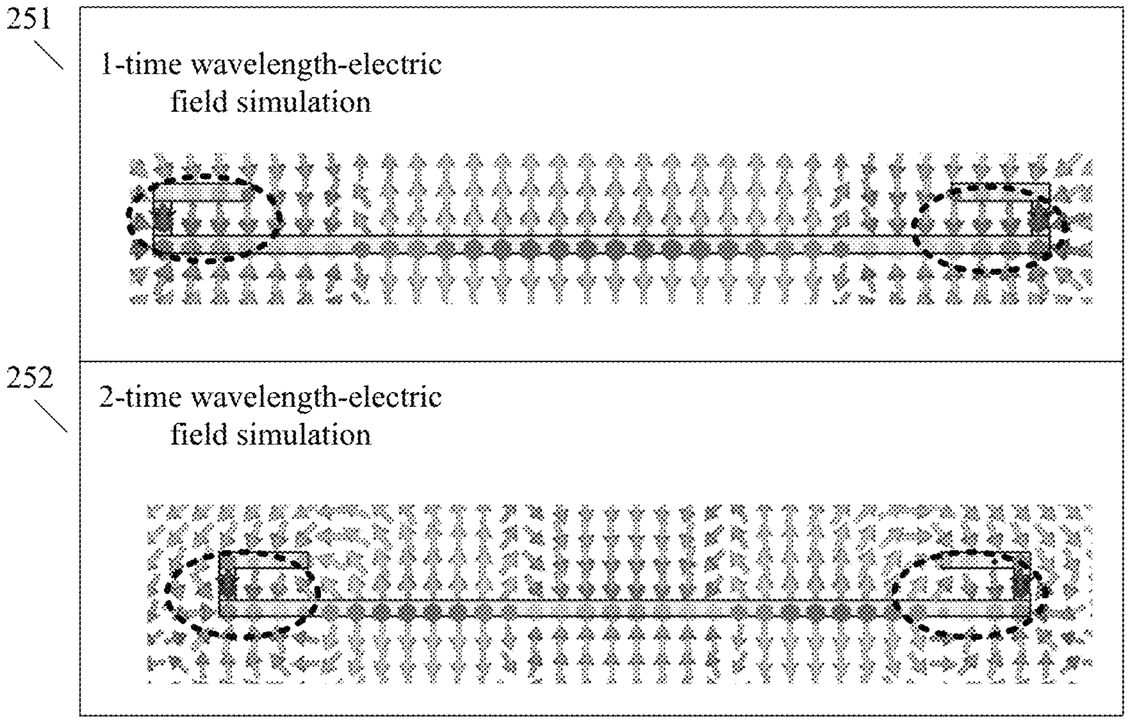
FIG. 25 is a schematic diagram of electric field parameter simulation of a terminal antenna solution according to an embodiment of this application.

FIG. 25 shows electric field distribution in an operating process of an antenna solution with the composition shown in FIG. 22 or FIG. 23. 251 shows an electric field of a corresponding frequency (namely, the 1-time wavelength) at P24-1. It can be seen that a same-direction electric field (for example, a downward same-direction electric field) may be distributed between the excitation part and the radiation part. Therefore, the description of electric field excitation in the description shown in FIG. 23 is supported. 252 shows an electric field of a corresponding frequency (namely, the 2-time wavelength) at P24-2. It can be seen that a same-direction electric field (for example, a downward same-direction electric field) may be distributed between the excitation part and the radiation part. Therefore, the description of electric field excitation in the description shown in FIG. 23 is also supported. Based on electric field simulation of the frequencies corresponding to the 1-time wavelength and the 2-time wavelength, an effect of electric field excitation in the operating process of the antenna solution is the same as that described in FIG. 23. It should be understood that for the mode related to the another N-time wavelength (for example, the 3-time wavelength and the 4-time wavelength), the antenna solution with the composition in FIG. 22 or FIG. 23 can also provide an effect of corresponding electric field excitation. Details are not described herein again.

Figure 26A:
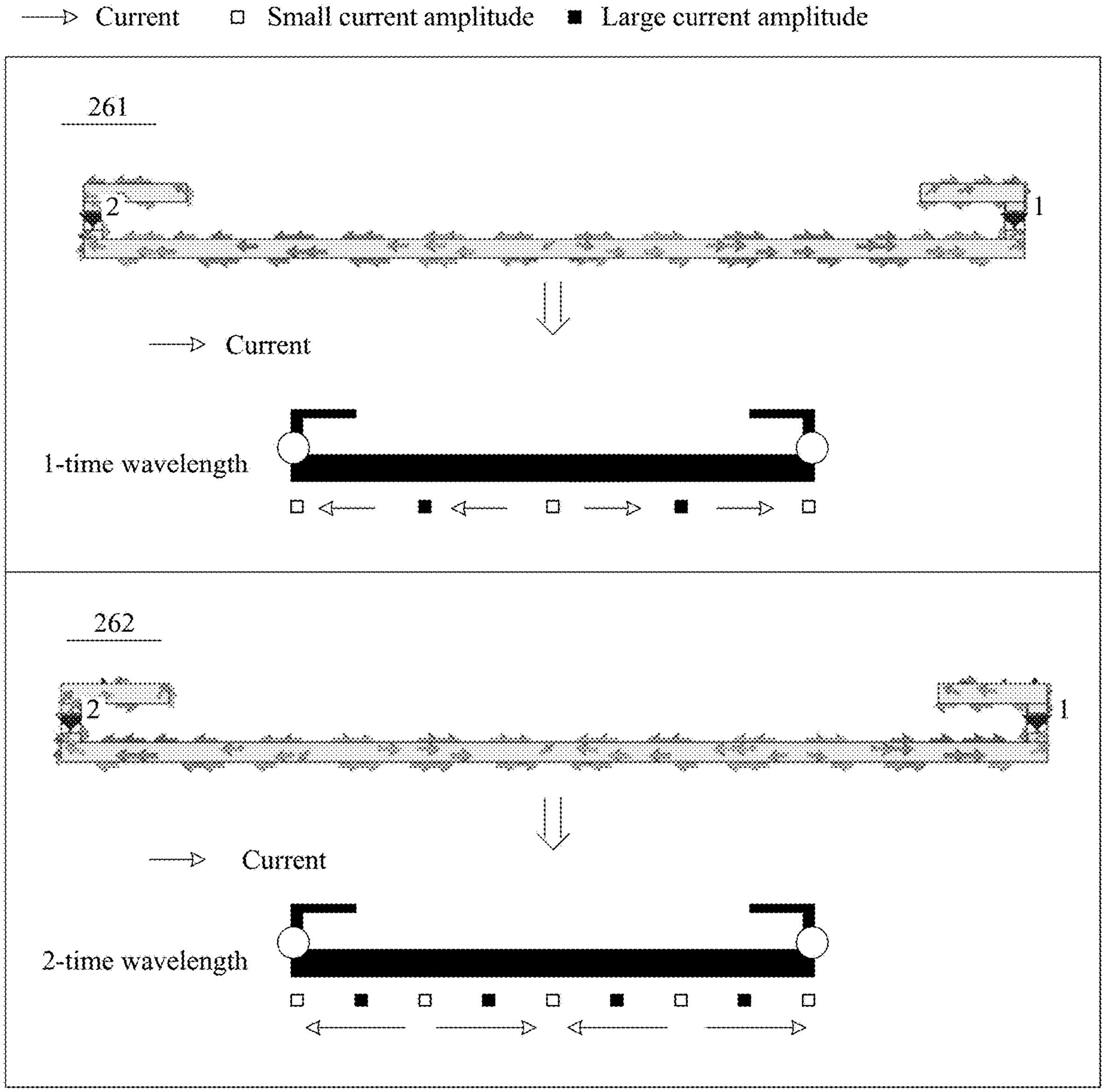
FIG. 26A is a schematic diagram of current parameter simulation of a terminal antenna solution according to an embodiment of this application.

To describe the solution provided in this embodiment of this application more clearly, FIG. 26A shows current distribution simulation of a radiation part that mainly plays a radiation role when the antenna solution with the composition shown in FIG. 22 or FIG. 23 operates. For ease of description, logic of current distribution in a corresponding case is also shown. With reference to current distribution, shown in FIG. 18, in the case in which the excitation part is disposed at the middle location of the radiation part, as shown in FIG. 26A, although a disposition location of the excitation part is different from a disposition location corresponding to the effect shown in FIG. 18, current distribution on the excited radiation part is similar because the excitation part is disposed at a point with a large eigenmode electric field of the radiation part.

For example, in an example in FIG. 26A, 261 shows current distribution of a frequency near the 1-time wavelength. Three points with a small current and two points with a large current may be distributed on the radiation part. Two ends of the radiation part are points with a small current. The points with a small current and the points with a large current are alternately distributed on the radiation part.

A current flow direction is similar to that in the current distribution in the solution shown in FIG. 18. In this example, in comparison with current distribution of the 1-time wavelength excited through conventional high-impedance differential-mode feeding shown in FIG. 5, it can be seen that although distribution of the points with a large current and the points with a small current is similar, there is a significant difference between current directions at the middle location of the radiation part. To be specific, for the N-time wavelength mode obtained based on electric field excitation provided in this application, current distribution thereof is different from that of the N-time wavelength mode in the conventional high-impedance differential-mode feeding solution.

262 in FIG. 26A further shows current distribution on the radiation part at the 2-time wavelength. It can be seen that there is also a current reverse point at the middle location of the radiation part. By analogy, this current reverse characteristic is caused by electric field excitation based on common-mode feeding. Therefore, during operating in the mode related to the another N-time wavelength (for example, the 3-time wavelength and the 4-time wavelength), there is also a current reverse characteristic at the middle location of the radiation part.

It should be understood that the solutions in FIG. 21-FIG. 26A in which the excitation part is disposed at the two ends are described by using an example in which the excitation part includes the L-shaped probe having an inverted L-shaped structural characteristic. With reference to the foregoing descriptions in FIG. 19 and FIG. 20, in the solution in which the excitation part is disposed at the two ends, a structural solution of the excitation part provided in either of FIG. 19 and FIG. 20 may be used, to implement the effect of electric field excitation.

In the foregoing descriptions, an example in which the excitation part is disposed at the middle location of the radiation part is used in FIG. 13-FIG. 20 for description, and an example in which the excitation part is disposed at the two ends of the radiation part is used in FIG. 21-FIG. 26A for description. It should be understood that, when another N-time wavelength needs to be excited, the excitation part may be disposed at a location corresponding to a point with a large electric field in a corresponding mode. An idea and a mechanism thereof are similar to those in the foregoing descriptions. Therefore, an effect that can be achieved is also similar, that is, electric field excitation performed based on low-impedance common-mode feeding can be implemented to excite the N-time wavelength.

Figure 26B:
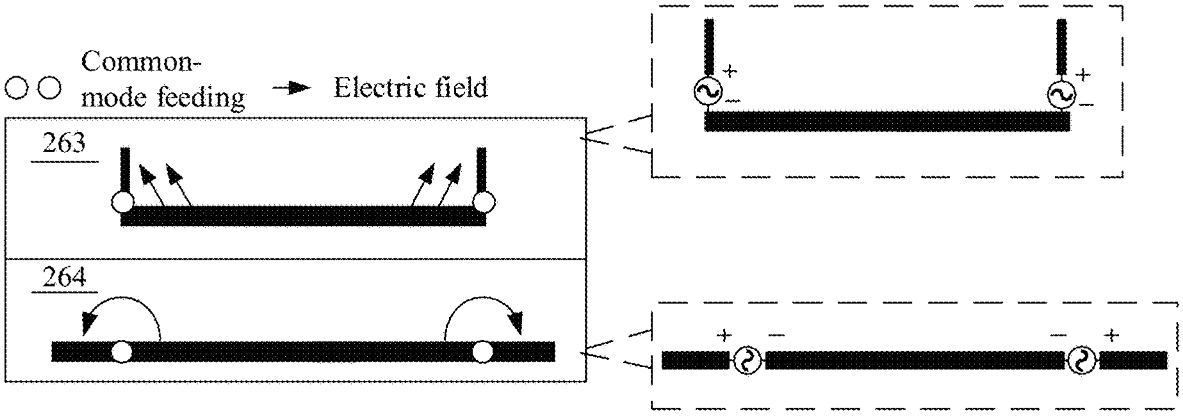
FIG. 26B is a schematic diagram of two specific implementations of a terminal antenna solution according to an embodiment of this application.

It should be noted that, similar to the foregoing solution of performing excitation at the middle location of the radiation part, in the excitation solution in which low-impedance common-mode feeding is performed at the points with a large electric field at the two ends, a plurality of different structural variations may also be included. The foregoing descriptions in FIG. 22-FIG. 26A are made by using excitation of the two ends of the L-shaped probe as an example. As shown in FIG. 26B, examples of several other solutions, in which excitation is performed at the two ends, provided in this embodiment of this application are further provided.

For example, as shown in 263 in FIG. 26B, the excitation part may be disposed at two ends of the dipole antenna. In this example, for one end of the dipole antenna, the disposed excitation part may include a radiator perpendicular to a long side of a radiator of the dipole antenna, and the radiator may be connected to the dipole antenna by using a feed. Correspondingly, a similar excitation part may be disposed at the other end of the dipole antenna through mirroring. To be specific, in this example, the excitation part may include two radiators perpendicular to the dipole antenna. The two radiators are respectively disposed at the two ends of the dipole antenna, and the two radiators are respectively connected to the two ends of the dipole antenna by using feeds. During operating, equi-amplitude in-phase feeding signals may be fed into the two feeds to implement common-mode feeding on the excitation part. In this way, an electric field generated by a current on the excitation part can implement electric field excitation on a nearby end of the dipole antenna, to excite the antenna to operate in the N-time wavelength mode.

264 shown in FIG. 26B further shows another low-impedance common-mode feeding excitation solution. In this example, the excitation part may also include two radiators. Different from the example in 263, in a structure shown in 264, the two radiators of the excitation part and the radiator of the dipole antenna may be on a same straight line. The two radiators of the excitation part are separately connected to the dipole antenna at the two ends of the dipole antenna by using feeds. During operating, equi-amplitude in-phase feeding signals may be fed into the two feeds to implement common-mode feeding on the excitation part. In this way, an electric field generated by a current on the excitation part can implement electric field excitation on a nearby end of the dipole antenna, to excite the N-time mode to operate.

Through comparison between the examples in 263 and 264 in FIG. 26B, it can be seen that when the excitation part is disposed at the two ends of the dipole antenna for feeding, if an included angle between the radiator of the excitation part and the radiator of the dipole antenna is changed, the effect of electric field excitation is not significantly affected. In other words, in some other embodiments of this application, an included angle between the dipole antenna and a radiator that is of the excitation part and that is correspondingly disposed at the two ends of the dipole antenna may be different from 90 degrees shown in 263 or 180 degrees shown in 264. For example, a small included angle between any radiator of the excitation part and a straight line in which the radiator of the dipole antenna is located may be any angle between 0 degrees and 180 degrees. In some implementations, to obtain better symmetry, the excitation part may be disposed at the two ends of the radiation part to be axisymmetric about a perpendicular bisector of the radiation part. In this way, a person skilled in the art should have a comprehensive understanding of the solution, provided in this application, for correspondingly setting electric field excitation based on eigenmode distribution of the antenna to excite the N-time wavelength.

Similarly, another mode can also be excited based on a characteristic of eigenmode magnetic field distribution of the antenna. For example, at a point with a large magnetic field in the eigenmode, a 0.5 M-time wavelength mode may be obtained based on magnetic field excitation. For another example, at a point with a small magnetic field in the eigenmode, the N-time wavelength mode may be obtained based on high-impedance magnetic field excitation.

Figure 27:
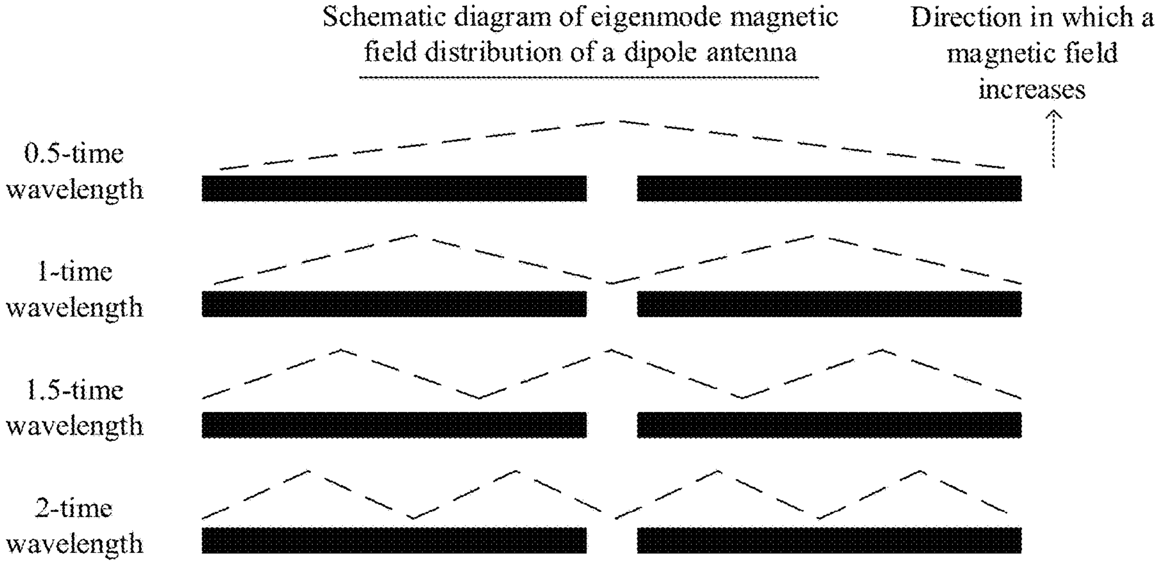
FIG. 27 is a schematic diagram of eigenmode magnetic field distribution of a dipole antenna.

For example, FIG. 27 shows eigenmode magnetic field distribution of a dipole antenna. It can be seen that, in each mode, a magnitude change of magnetic field distribution corresponds to a magnitude change of current distribution.

With reference to the descriptions in FIG. 5, differential-mode feeding is used as common magnetic field excitation. When a low-impedance differential-mode feed is disposed at a middle location of the dipole antenna, as shown in FIG. 27, the location may correspond to a point with a large magnetic field at the 0.5 M-time wavelength. Therefore, the 0.5 M-time wavelength mode can be excited. Correspondingly, a when high-impedance differential-mode feed is disposed at the middle location of the dipole antenna, as shown in FIG. 27, the location may correspond to a point with a small magnetic field at the N-time wavelength. Therefore, the N-time wavelength mode can be excited.

In this embodiment of this application, based on the characteristic of eigenmode magnetic field distribution of the antenna, a mode different from the differential-mode feeding mode shown in FIG. 5 is further provided to implement a mode excitation solution based on magnetic field excitation.

Figure 28:
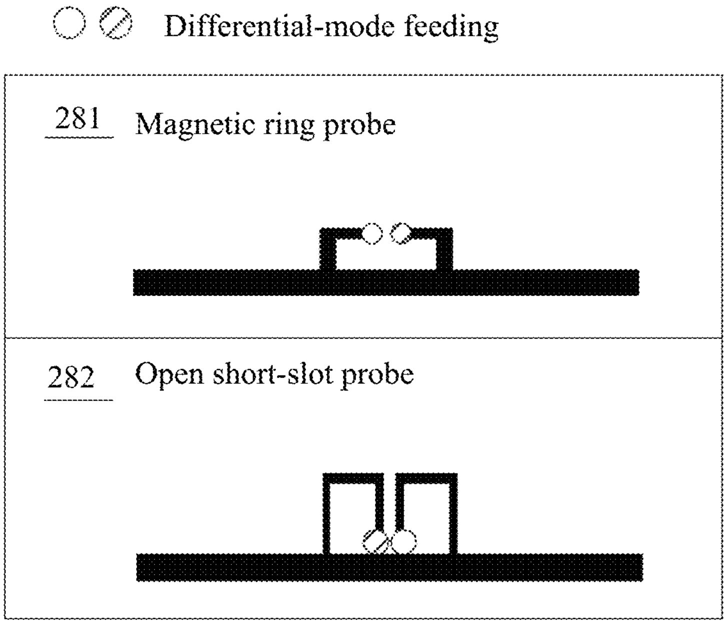
FIG. 28 is a schematic diagram of a direct feeding solution of a terminal antenna according to an embodiment of this application.

For example, the radiation part is a dipole. FIG. 28 shows several magnetic field excitation solutions according to an embodiment of this application. Structural compositions of different excitation parts are provided, to provide magnetic field excitation with reference to the foregoing idea.

As shown in FIG. 28, 281 shows a magnetic field excitation solution implemented by using low-impedance differential-mode feeding. In this solution, the excitation part may also be referred to as a magnetic ring probe. The magnetic ring probe may include an annular radiator provided with an opening, and two feeding points may be respectively disposed at two ends opposite to each other at the opening, to input a low-impedance differential-mode signal into the magnetic ring probe. The annular radiator corresponding to the magnetic ring probe may include a part of radiator connected to (or shared with) the radiation part. For example, the annular radiator is a rectangular radiator, a rectangular side opposite to the opening may be connected to a radiator of the radiation part. In some embodiments, the magnetic ring probe may be disposed at the middle location of the radiation part, and corresponds to the point with a large magnetic field at the 0.5 M-time wavelength, to implement low-impedance magnetic field excitation. This antenna including the magnetic ring probe and the radiation part may have an axisymmetric structural characteristic. When the antenna solution shown in 281 operates, a same-direction magnetic field can be generated inside the magnetic ring probe through low-impedance differential-mode feeding. Therefore, magnetic field excitation is implemented on the magnetic ring probe and the radiator shared with the radiation part, so that the radiation part can generate the 0.5 M-time wavelength mode for radiation, for example, perform radiation by using a 0.5-time wavelength mode and a 1.5-time wavelength mode.

As shown in FIG. 28, 282 shows another magnetic field excitation solution implemented by using low-impedance differential-mode feeding. In this solution, the excitation part may also be referred to as an open short-slot probe. The open short-slot probe may include two N-shaped structures, and openings of the two N-shaped structures may be disposed in a same direction, for example, the opening of the N-shaped structure may point to the radiation part. In this example, a feeding point may be disposed at an end of each of the two N-shaped structures, to perform low-impedance differential-mode feeding. For example, a feeding point corresponding to low-impedance differential-mode feeding may be separately disposed at ends of the two N-shaped structures close to each other. Ends that are of the two N-shaped structures and that are different from the feeding point may be separately connected to the radiation part. In some embodiments, the open short-slot probe may be disposed at the middle location of the radiation part, and corresponds to the point with a large magnetic field at the 0.5 M-time wavelength, to implement low-impedance magnetic field excitation. When the antenna solution shown in 282 operates, a same-direction magnetic field can be generated inside the open short-slot probe through low-impedance differential-mode feeding. Therefore, magnetic field excitation is implemented on the open short-slot probe and a radiator shared with the radiation part, so that the radiation part can generate the 0.5 M-time wavelength mode for radiation, for example, perform radiation by using a 0.5-time wavelength mode and a 1.5-time wavelength mode.

It should be understood that, as shown in FIG. 28, that an excitation part with low-impedance differential-mode feeding is disposed at the middle location of the radiation part to excite the 0.5 M-time wavelength is used as an example. In some other embodiments, the excitation part with low-impedance differential-mode feeding may alternatively be disposed at another point with a large magnetic field to excite the 0.5 M-time wavelength. In some other embodiments, the excitation part may alternatively be disposed at a point with a small magnetic field, to excite the N-time wavelength through high-impedance differential-mode feeding.

In an example in FIG. 28, the excitation part is directly connected to the radiation part to implement direct-feeding magnetic field excitation. This embodiment of this application further provides a magnetic field excitation solution based on coupling feeding.

Figure 29:
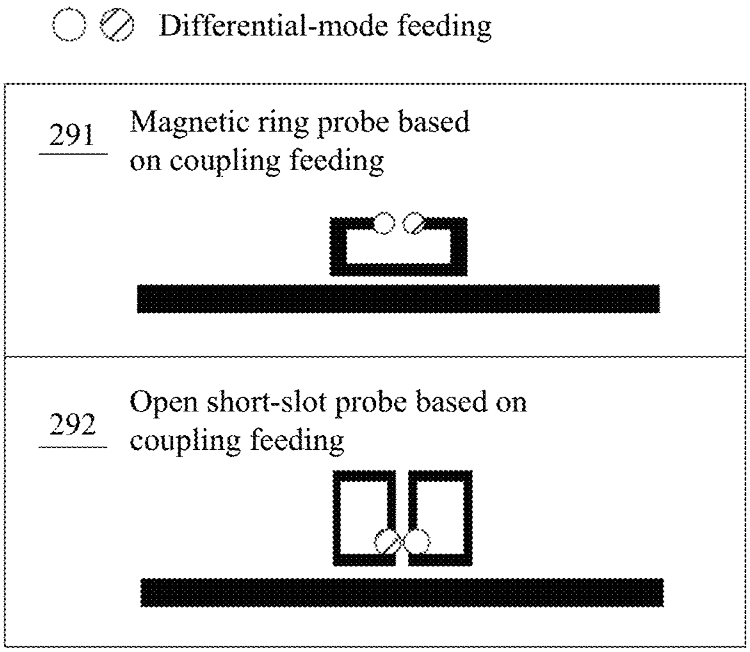
FIG. 29 is a schematic diagram of a coupling feeding solution of a terminal antenna according to an embodiment of this application.

For example, FIG. 29 shows compositions of several excitation parts based on coupling feeding according to an embodiment of this application.

291 shown in FIG. 29 shows a magnetic ring probe based on coupling feeding according to an embodiment of this application. A structure of the magnetic ring probe in this example corresponds to 281 shown in FIG. 28. To be specific, the magnetic ring probe may include an annular radiator provided with an opening, and two feeding points may be respectively disposed at two ends opposite to each other at the opening, to input a low-impedance differential-mode signal into the magnetic ring probe. Different from the direct feeding solution in 281, in this example, the annular radiator corresponding to the magnetic ring probe is not connected to the radiation part. In some embodiments, the magnetic ring probe based on coupling feeding may be disposed at the middle location of the radiation part, and corresponds to the point with a large magnetic field at the 0.5 M-time wavelength, to implement low-impedance magnetic field excitation. This antenna including the magnetic ring probe and the radiation part may have an axisymmetric structural characteristic. When the antenna solution shown in 291 operates, a same-direction magnetic field can be generated between the magnetic ring probe and the radiation part through low-impedance differential-mode feeding. Therefore, magnetic field excitation is implemented on the radiation part, so that the radiation part can generate the 0.5 M-time wavelength mode for radiation, for example, perform radiation by using a 0.5-time wavelength mode and a 1.5-time wavelength mode.

292 shown in FIG. 29 shows an open short-slot probe based on coupling feeding according to an embodiment of this application. A structure of the open short-slot probe in this example corresponds to that shown in 282 in FIG. 28. The open short-slot probe may include two annular structures, and one feeding point may be disposed on each of the two annular structures to perform low-impedance differential-mode feeding. For example, the feeding point corresponding to low-impedance differential-mode feeding may be disposed on sides of the two annular structures close to each other. In this example, the two annular structures are close to each other, and the open short-slot probe including the two annular structures is not connected to the radiation part. In some embodiments, the open short-slot probe may be disposed at the middle location of the radiation part, and corresponds to the point with a large magnetic field at the 0.5 M-time wavelength, to implement low-impedance magnetic field excitation. When the antenna solution shown in 292 operates, a same-direction magnetic field can be generated between the open short-slot probe and the radiation part through low-impedance differential-mode feeding. Therefore, magnetic field excitation is implemented on a radiator of the radiation part, so that the radiation part can generate the 0.5 M-time wavelength mode for radiation, for example, perform radiation by using a 0.5-time wavelength mode and a 1.5-time wavelength mode.

In some other embodiments of this application, a coupling feeding solution based on a short dipole may be used. For example, a short dipole probe based on coupling feeding may include a dipole antenna, and the dipole antenna may be excited through low-impedance differential-mode feeding. It should be understood that, because the short dipole probe is used to generate a same-direction magnetic field near the radiation part, a length of the short dipole probe may be less than a ¼ wavelength of an operating band. In some embodiments, the short dipole probe may be disposed at the middle location of the radiation part, and corresponds to the point with a large magnetic field at the 0.5 M-time wavelength, to implement low-impedance magnetic field excitation.

In this embodiment of this application, that the solution is applied to an electronic device (for example, a mobile phone) is used as an example. An operating band covered by an antenna may include a low band, an intermediate band, and/or a high band. In some embodiments, the low band may include a band range of 450 MHz-1 GHz. The intermediate band may include a band range of 1 GHz-3 GHz. The high band may include a band range of 3 GHz-10 GHz. It may be understood that, in different embodiments, the low, intermediate, and high bands may include but are not limited to operating bands required by a Bluetooth (Bluetooth, BT) communication technology, a global positioning system (global positioning system, GPS) communication technology, a wireless fidelity (wireless fidelity, Wi-Fi) communication technology, a global system for mobile communications (global system for mobile communications, GSM) communication technology, a wideband code division multiple access (wideband code division multiple access, WCDMA) communication technology, a long term evolution (long term evolution, LTE) communication technology, a 5G communication technology, a SUB-6G communication technology, another future communication technology, and the like. In some implementations, the LB, the MB, and the HB may include common bands such as 5G NR, Wi-Fi 6E, and UWB.

It should be understood that, similar to the descriptions in FIG. 28, in the coupling feeding solution shown in FIG. 29, the excitation part may alternatively be disposed at another point with a large magnetic field to excite the 0.5 M-time wavelength. In some other embodiments, the excitation part may alternatively be disposed at a point with a small magnetic field, to excite the N-time wavelength through high-impedance differential-mode feeding.

Figure 30:
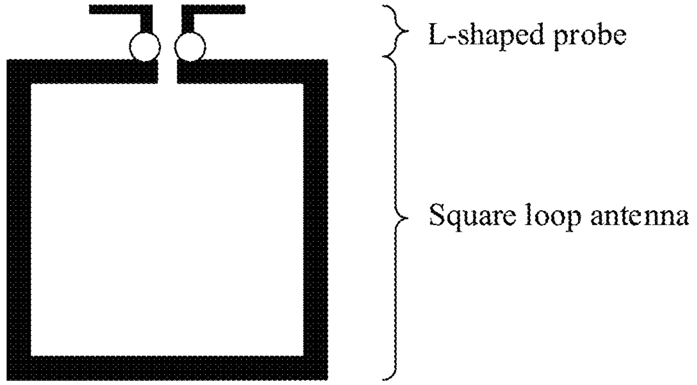
FIG. 30 is a schematic diagram of a terminal antenna solution according to an embodiment of this application.

In the foregoing descriptions, the following solution provided in this application is described in detail: Electric field-based excitation and magnetic field-based excitation are implemented by using a corresponding excitation part and based on eigenmode distribution (including electric field distribution, magnetic field distribution, and the like) of the antenna, to excite each mode. In the example of the radiation part, the dipole antenna is used as an example for description. It should be understood that, in another typical antenna other than the dipole antenna, a corresponding electric field feeding solution and a corresponding magnetic field feeding solution may also be set based on eigenmode distribution thereof by using the solution provided in this embodiment of this application. For example, the radiation part may further include an antenna with a symmetrical structure, such as a symmetric square loop antenna, a symmetric circular loop antenna, and a symmetric polygon antenna. In an example, FIG. 30 shows another solution example based on low-impedance common-mode feeding according to an embodiment of this application. In this example, that the radiation part is implemented by using a square loop antenna is used as an example. As shown in FIG. 30, the radiation part may include an annular radiator. An opening may be disposed on one side of the annular radiator. Two ends of the opening may be separately connected to the excitation part by using common-mode feeds. In different implementations, a specific implementation of any excitation part in the foregoing descriptions may be used for the excitation part. For example, in an example in FIG. 30, that the excitation part is implemented by using an L-shaped probe is used as an example. For a specific composition of the L-shaped probe, refer to descriptions in 191 shown in FIG. 19. Details are not described herein again. In the antenna solution provided in this embodiment of this application, the common-mode feed connected to the radiator of the antenna may be low-impedance common-mode feed. When the antenna operates, an operating mode of the N-time wavelength such as the 1-time wavelength and the 2-time wavelength can be excited on the annular radiator. A specific operating mechanism thereof is similar to a case in which the radiation part is a dipole antenna in the foregoing descriptions, and references may be made to each other.

The operating mechanism of the antenna solution provided in this embodiment of this application is different from an existing antenna. For example, in the excitation solution of low-impedance common-mode excitation feeding shown in FIG. 14-FIG. 26A and FIG. 30, current distribution of the radiation part operating in the N-time wavelength mode is totally different from current distribution in a conventional differential-mode feeding solution. Therefore, in an actual application process, based on different current distribution characteristics, the antenna solution provided in this embodiment of this application and another antenna can have good isolation. In this case, when a multi-antenna system (such as a multi-input multiple-output (MIMO) antenna system) including the antenna provided in this embodiment of this application and another solution operates, good radiation performance can be provided due to a high isolation characteristic between a plurality of antennas.

With reference to the accompanying drawings, the following describes in detail a multi-antenna system that has a high isolation characteristic and that is formed based on the antenna solution in the foregoing examples and another antenna solution.

It should be understood that, in an antenna system including at least two antennas, when operating bands of the at least two antennas overlap at least partially, attention needs to be paid to isolation between the at least two antennas. Isolation can be used to identify a degree to which two antennas affect each other when the two antenna simultaneously operate. Isolation is generally represented by a normalized dB value, and is a number less than or equal to 0. A smaller isolation value, namely, a larger absolute value, indicates better isolation, and corresponds to a smaller mutual impact between the two antennas. On the contrary, a larger isolation value, namely, a smaller absolute value, indicates poorer isolation, and corresponds to a larger mutual impact between the two antennas. When isolation between the two antennas is evaluated, isolation of each frequency may be identified by using a two-port S parameter (for example, S12 and S21).

Figure 31:
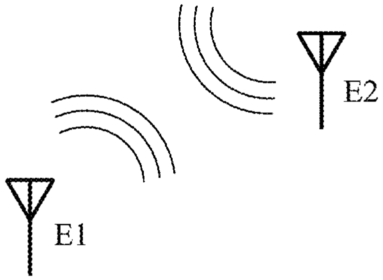
FIG. 31 is a schematic diagram of a multi-antenna operating scenario.

Referring to FIG. 31, from a perspective of spatial distribution, the mutual impact between the two antennas may be caused by cancellation or distortion of electromagnetic waves in space that are generated by the two antennas. For example, the two antennas included in the antenna system are respectively E1 and E2. In this case, when E1 and E2 separately send/receive signals by using corresponding electromagnetic waves, signal transmission between E1 and E2 is affected by interaction of the electromagnetic waves in space. However, spatial distribution of the electromagnetic wave generated by the antenna corresponds to current distribution corresponding to a case in which the antenna operates. Therefore, when the two antennas simultaneously operate, and current distribution on radiators of the two antennas is different, isolation between the two antennas is generally good.

With reference to the foregoing descriptions, the antenna solution based on electric field/magnetic field excitation provided in this embodiment of this application has different current distribution from a conventional antenna solution. For example, low-impedance common-mode feeding is used to excite an N-time wavelength through electric field excitation. When the solution provided in this embodiment of this application operates at the N-time wavelength, a current reverse point is distributed at a middle location of a radiation part. For details, refer to the example in FIG. 18 in the foregoing descriptions. In a conventional high-impedance differential-mode feeding solution, no current reverse point is generated at the middle location of the radiation part due to a characteristic of a differential-mode feed. For details, refer to the example in FIG. 5 in the foregoing descriptions. In this way, the antenna solution provided in this embodiment of this application and another conventional antenna may simultaneously operate to form an antenna system with a high isolation characteristic.

Figure 32:
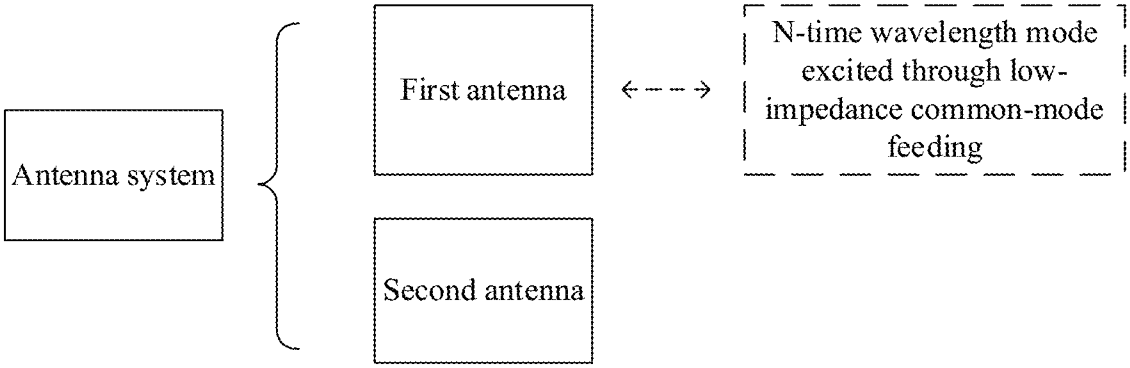
FIG. 32 is a schematic diagram of a composition of an antenna system according to an embodiment of this application.

In the following examples, the antenna system provided in this embodiment of this application is described. Referring to FIG. 32, the antenna system provided in this embodiment of this application may include at least two antennas (for example, a first antenna and a second antenna). Operating bands of the first antenna and the second antenna overlap at least partially. Therefore, when the first antenna and the second antenna have a high isolation characteristic, radiation performance of each antenna can be improved, thereby achieving an effect of improving radiation performance of the antenna system.

The first antenna may use the antenna solution provided in this embodiment of this application. That an N-time wavelength mode of the first antenna is excited through low-impedance common-mode feeding is used as an example. For the antenna solution of exciting the N-time wavelength through low-impedance common-mode feeding, refer to the corresponding technical solutions in FIG. 10-FIG. 26A in the foregoing descriptions. In this example, any possible implementation in the foregoing solutions may be used. The detailed implementation of the solution is not described below. In the antenna system, the second antenna may be another conventional antenna. For example, the second antenna may be an antenna with differential-mode feed or the like.

Based on radiator distribution of the first antenna and the second antenna, the antenna solution that is provided in this embodiment of this application and that is applied to the antenna system may include an integration antenna solution and a non-integration antenna solution.

First, the non-integration antenna solution is described.

It may be understood that in the non-integration solution, when the operating bands of the first antenna and the second antenna overlap at least partially, because the first antenna and the second antenna may have different radiator lengths, the operating bands of the first antenna and the second antenna may be covered by using different wavelength modes. However, current distribution corresponding to the different wavelength modes is generally different. Therefore, the two antennas in the non-integration solution can obtain good isolation. In some other embodiments, when the first antenna and the second antenna have a same radiator length, the operating bands are covered by using a same wavelength mode. Because current distribution of the first antenna is different from current distribution of the second antenna, the two antennas can also obtain good isolation.

For example, the first antenna has the composition shown in 191 in FIG. 19 and the second antenna is a differential-mode dipole.

Figure 33:
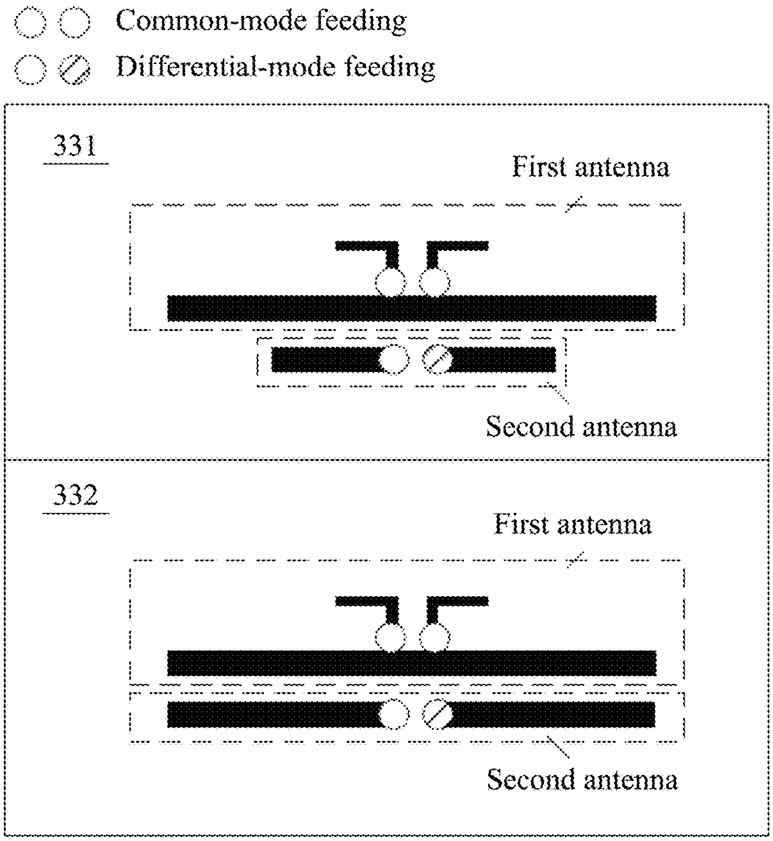
FIG. 33 is a schematic diagram of an implementation of a split solution of an antenna system according to an embodiment of this application.

FIG. 33 shows two antenna systems. As shown in 331, the first antenna may operate at the N-time wavelength, for example, in a 1-time wavelength mode. Correspondingly, a length of a radiation part of the first antenna may correspond to a size at the 1-time wavelength of the operating band. The second antenna may operate at a 0.5 M-time wavelength, for example, in a 0.5-time wavelength mode. The operating band of the second antenna may be the same as the operating band of the first antenna. Therefore, a total radiator length of the second antenna may correspond to a size at the 0.5-time wavelength of the operating band. Current distribution (current distribution shown in FIG. 18) in the 1-time wavelength mode is clearly different from current distribution (current distribution at the 0.5-time wavelength shown in FIG. 5) in the 0.5-time wavelength mode. Therefore, the first antenna and the second antenna can have a high isolation characteristic.

As shown in FIG. 33, 332 shows a composition of another antenna system. The first antenna may still operate in the N-time wavelength mode, for example, the 1-time wavelength mode, under electric field excitation of low-impedance common-mode feeding. Correspondingly, a length of a radiation part of the first antenna may correspond to a size at a 1-time wavelength of the operating band. In this example, the second antenna may also operate at the 1-time wavelength. In this case, a size of the second antenna may be comparable to that of the radiation part of the first antenna. Current distribution (current distribution shown in FIG. 18) of the first antenna operating in the 1-time wavelength mode is different from current distribution (current distribution at the 1-time wavelength shown in FIG. 5) of the second antenna operating in the 1-time wavelength mode. Therefore, the first antenna and the second antenna can have a high isolation characteristic.

In the following, 332 in FIG. 33 is used as an example to describe, with reference to a simulation result thereof, isolation existing when the antenna system operates.

Figure 34:
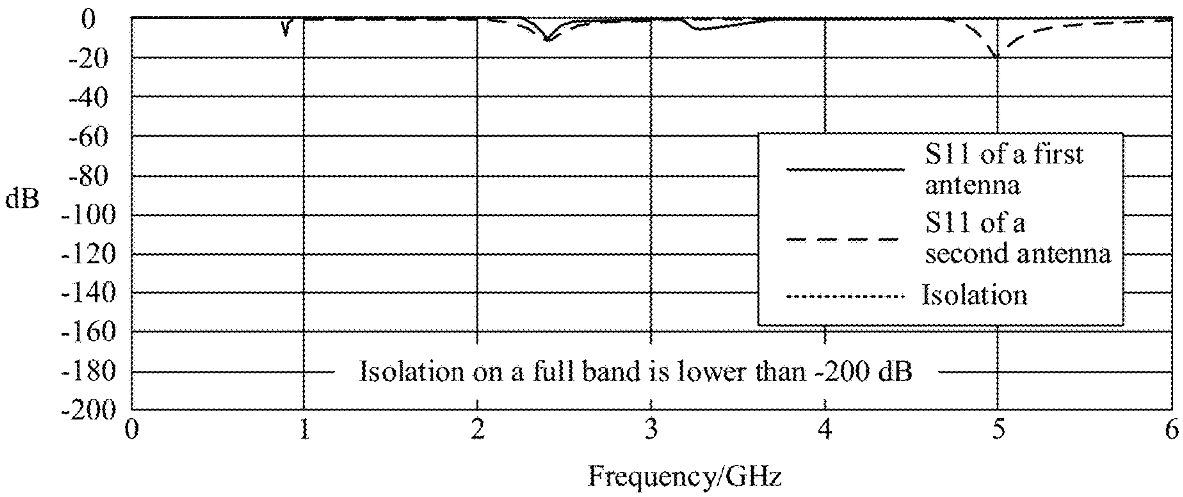
FIG. 34 is a schematic diagram of S parameter simulation of an antenna system according to an embodiment of this application.

For example, FIG. 34 shows S parameter simulation of a structure shown in 332 in FIG. 33. It can be seen that the operating bands of both the first antenna and the second antenna cover 2.4 GHz. Isolation between the first antenna and the second antenna is also shown in the figure. It can be seen that a simulation result in FIG. 34 includes no isolation curve, and therefore isolation between the two antennas is not included in a range of −200 dB. To be specific, in the antenna system that has the structure shown in 332 in FIG. 33 and that is provided in this embodiment of this application, isolation between the two antennas is below −200 dB within 6 GHz. In this case, it indicates that electromagnetic waves respectively excited when the first antenna and the second antenna operate have no energy coupling within the band (namely, within 6 GHz), and are in a close-to or fully orthogonal state, so that the two antennas do not affect each other during operating.

Figure 35:
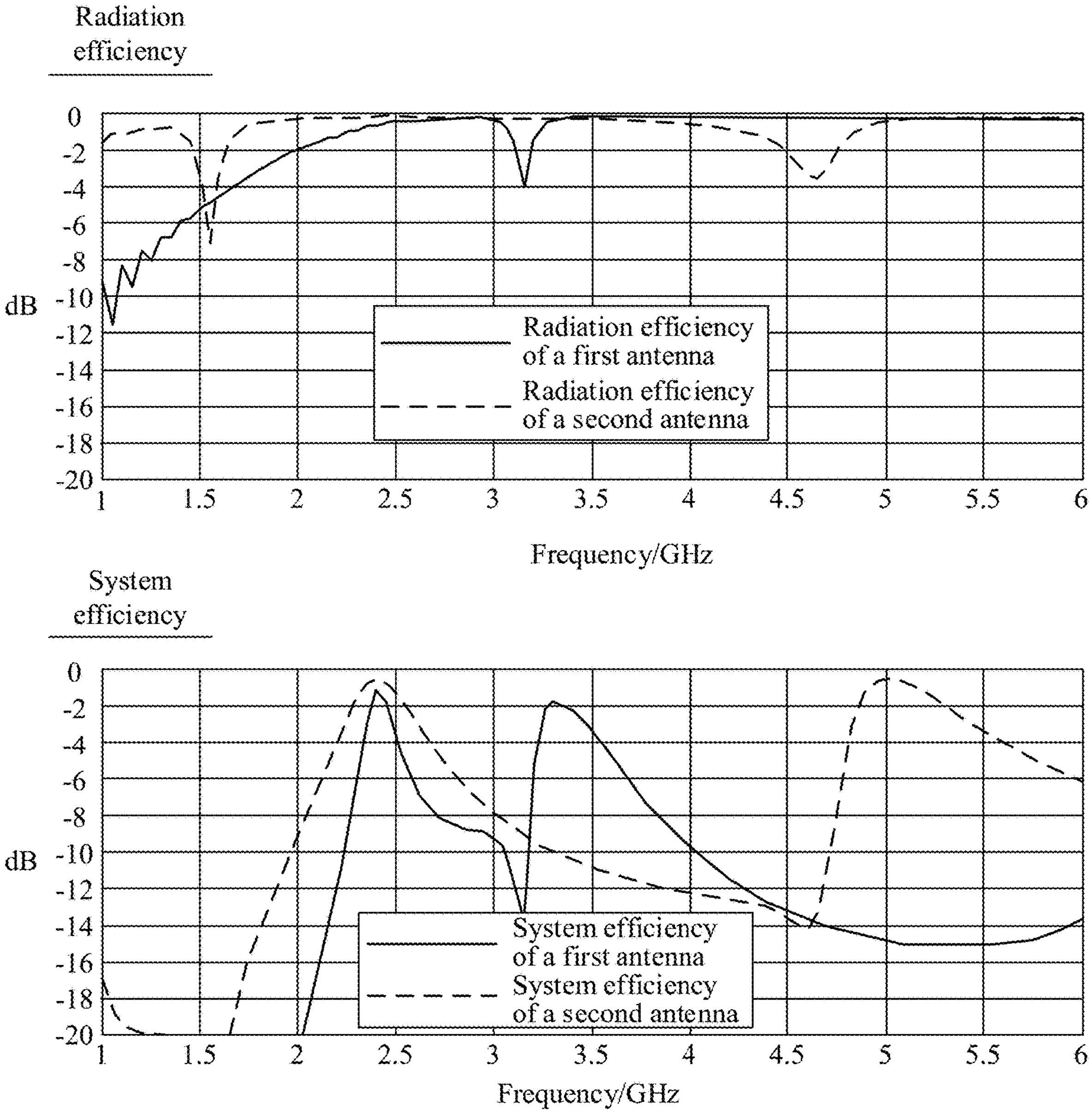
FIG. 35 is a schematic diagram of efficiency simulation of an antenna system according to an embodiment of this application.

FIG. 35 shows efficiency simulation of a structure shown in 332 in FIG. 33. From a perspective of radiation efficiency, radiation efficiency of the two antennas is close to 0 dB near the operating band, for example, near 2.4 GHz. Therefore, good radiation performance can be obtained through port matching. From a perspective of system efficiency, when the two antennas operate near 2.4 GHz, system efficiency of the two antennas exceeds −2 dB, which proves that the two antennas can provide good coverage of the operating band during operating. It should be understood that because isolation between the two antennas is very good (less than −200 dB), the two antennas operate relatively independently, and can perform high efficiency radiation.

To further describe a high isolation mechanism shown in 332 in FIG. 33, the following continues to be described with reference to current simulation and pattern simulation.

Figure 36:
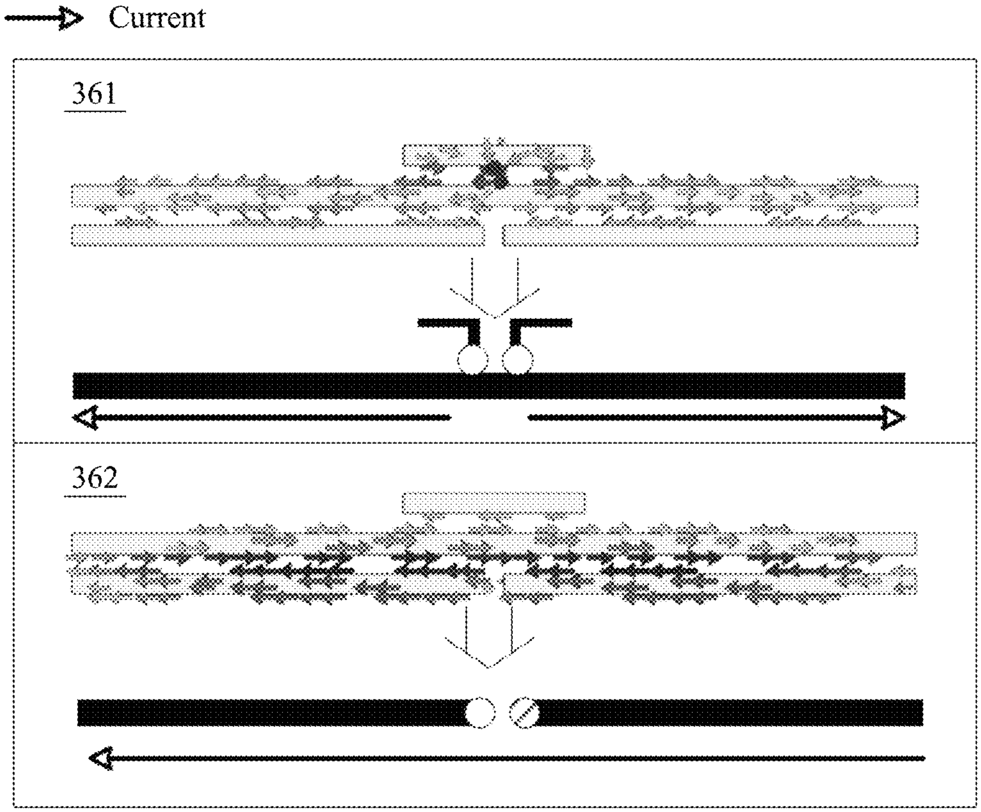
FIG. 36 is a schematic diagram of current simulation of an antenna system according to an embodiment of this application.

FIG. 36 shows current distribution simulation of a first antenna and a second antenna within an operating band (for example, a band near 2.4 GHz). 361 shows current distribution of the first antenna. It can be seen that the first antenna operates in the 1-time wavelength mode, and a current reverse point is distributed at the middle location of the radiation part. This characteristic is consistent with current distribution that is in the N-time wavelength mode in case of low-impedance common-mode feeding and that is provided in this application in the foregoing descriptions. Current distribution of the second antenna is shown in 362. It can be seen that, based on a magnitude change of a current, it is determined that the second antenna operates in the 1-time wavelength mode. A current flow direction in this simulation result is similar to that in current distribution shown in FIG. 5, that is, there is no current reverse point on the entire radiator. Therefore, although both the first antenna and the second antenna operate in the 1-time wavelength mode, there is a significant difference between current distribution.

Figure 37:
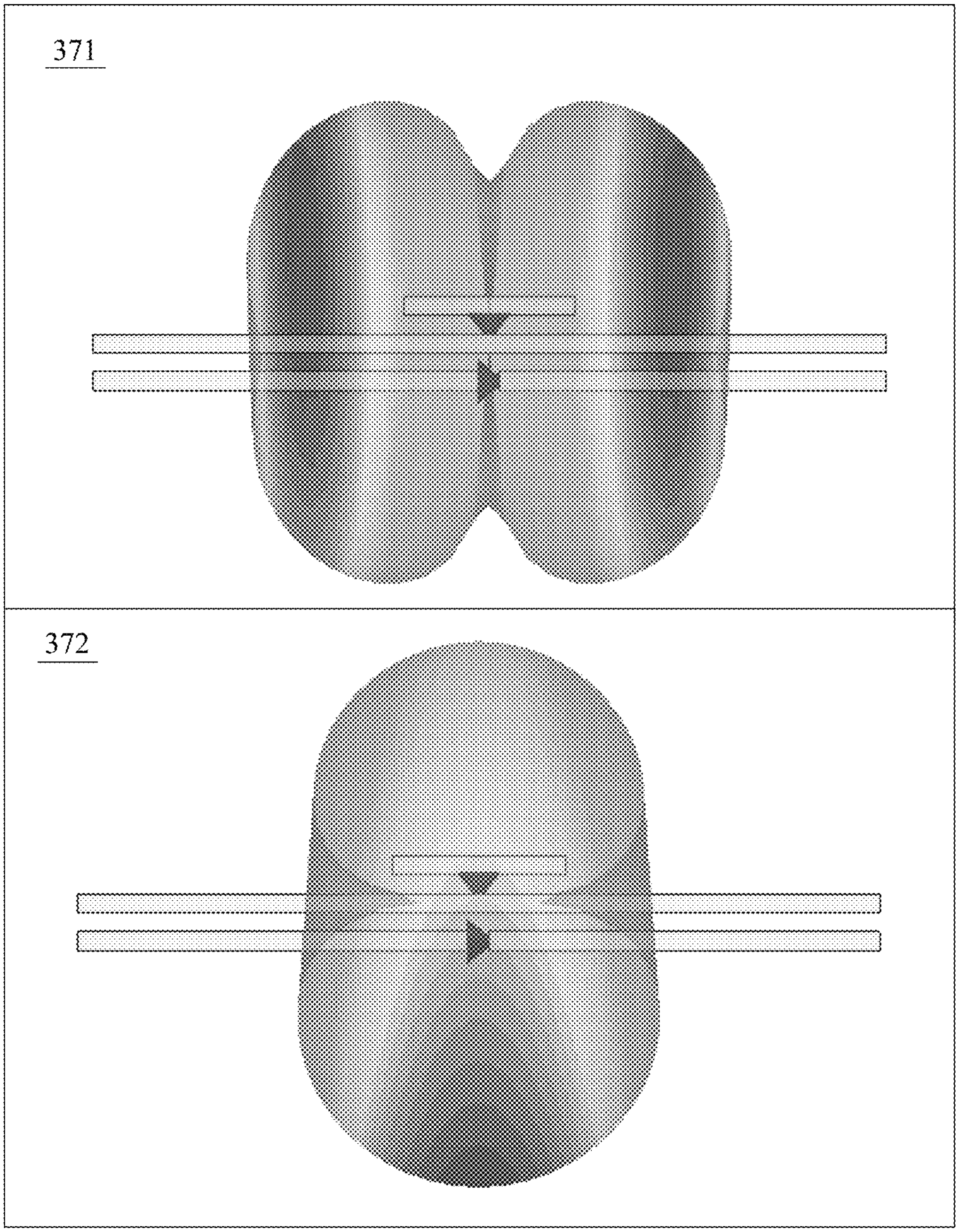
FIG. 37 is a schematic diagram of pattern simulation of an antenna system according to an embodiment of this application.

FIG. 37 shows pattern simulation of two antennas during operating. 371 shows a pattern of the first antenna during operating. It can be seen that a direction with a strong gain is mainly distributed on two sides in a lateral direction, and there is an obvious weak gain point in a longitudinal direction corresponding to a center axis of the antenna. The gain decrease corresponds to current reversal in 361 shown in FIG. 36. In comparison with a pattern of the second antenna shown in 372, when the second antenna operates, a direction with a strong gain of the second antenna is mainly distributed in a longitudinal direction, and correspondingly, gains on two sides in a lateral direction are weak. Therefore, the first antenna and the second antenna have an orthogonal relationship in terms of gain distribution. In other words, when the second antenna and the first antenna operate, energy in space is basically not coupled with each other, so that a high isolation effect close to orthogonality is obtained.

In the foregoing descriptions in FIG. 33-FIG. 37, a high isolation application of the following solution provided in this embodiment of this application in a multi-antenna scenario is described: Low-impedance common-mode feeding is used to implement N-time wavelength radiation through electric field excitation. It should be emphasized that the foregoing descriptions do not constitute a limitation on the structure of the first antenna in this embodiment of this application. In another embodiment, the first antenna may use any antenna solution provided in the foregoing descriptions.

The following describes in detail an application of an integration high isolation antenna solution in the antenna system.

With reference to the foregoing descriptions, in this example, because the first antenna and the second antenna are designed to be integrated, radiator sizes of the first antenna and the second antenna are the same. For example, the radiator length may correspond to a size at an N-time wavelength of the operating band. In the following example, that the radiator length corresponds to the 1-time wavelength of an operating wavelength is used as an example.

In this example, when the first antenna and the second antenna operate, because the radiator sizes are the same and the operating bands overlap at least partially, the first antenna and the second antenna may simultaneously operate in the N-time wavelength mode (for example, simultaneously operate in the 1-time wavelength mode or the 2-time wavelength mode) to cover respective operating bands. In addition, current distribution in the N-time wavelength mode excited by the first antenna is different. Therefore, based on the high isolation characteristic existing when the two antennas operate, the two antennas on a same radiator operate without affecting each other.

For example, based on feeding modes of the first antenna and the second antenna, the solution provided in this embodiment of this application may include an integration high isolation solution based on direct feeding and an integration high isolation solution based on coupling feeding.

In the direct feeding solution in this example, the first antenna may use any antenna solution based on low-impedance common-mode feeding shown in FIG. 19 or the antenna solution shown in FIG. 14 in the foregoing examples. The second antenna may use any differential-mode feeding solution shown in FIG. 28 or the differential-mode feeding solution shown in FIG. 5 in the foregoing examples.

Figure 38:
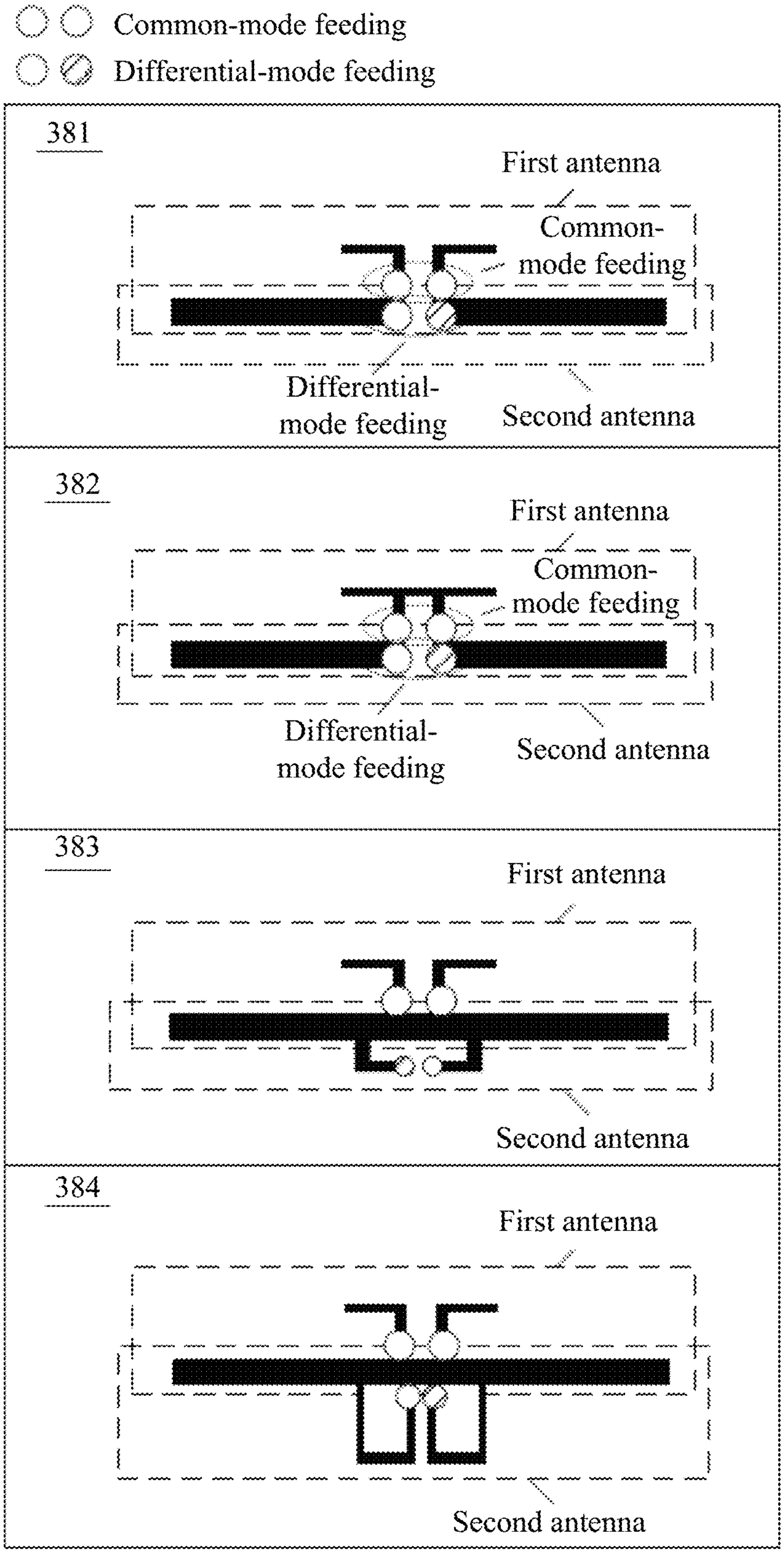
FIG. 38 is a schematic diagram of an implementation of an integration direct feeding solution of an antenna system according to an embodiment of this application.

In an example, FIG. 38 shows some possible compositions for description.

In an example in 381 in FIG. 38, the first antenna may use a low-impedance common-mode feeding solution implemented by using an L-shaped probe. This solution corresponds to the antenna solution shown in FIG. 14. For a specific composition, refer to the descriptions for FIG. 14. For example, the first antenna may include an excitation part and a radiation part. That the radiation part is a dipole antenna is used as an example. The excitation part may include two inverted L-shaped radiators disposed on the left and right through mirroring. A feeding point is separately disposed on the radiators of the excitation part perpendicular to the radiation part, to feed a low-impedance common-mode signal. The excitation part may be further connected to the radiation part at the feeding point. When the first antenna operates, a same-direction electric field may be generated between the radiation part and the excitation part parallel to the radiation part, to excite the radiation part to operate in the N-time wavelength mode. In the example in 381 in FIG. 38, for disposition of the second antenna, refer to the conventional differential-mode feeding excitation solution in FIG. 5. For example, a radiator of the second antenna may share the radiation part (namely, the dipole antenna) of the first antenna. A differential-mode feed of the second antenna may be disposed at the middle location of the dipole antenna. For example, a feeding point of the second antenna is separately disposed on two arms of the dipole antenna, to feed a differential-mode feeding signal of the second antenna. In this case, when the antenna system operates, the first antenna may operate in the N-time wavelength mode under electric field excitation of the L-shaped probe. That the first antenna operates in the 1-time wavelength mode is used as an example. The second antenna may operate in the 1-time wavelength mode under excitation of differential-mode feed. For example, the differential-mode feed of the second antenna may be a high-impedance differential-mode feed, to successfully excite the 1-time wavelength mode on the second antenna. When the first antenna and the second antenna operate, currents corresponding to the two excitations may be separately distributed on the radiation part, and current distribution respectively corresponding to the two excitations is different. Therefore, two high isolation radiation modes corresponding to the two excitations (namely, low-impedance common-mode feed and high-impedance differential-mode feed) can be obtained.

In an example in 382 in FIG. 38, the first antenna may use a low-impedance common-mode feeding solution implemented by using a π-shaped probe. This solution corresponds to the antenna solution shown in 192 in FIG. 19. For a specific composition, refer to the descriptions for 192 in FIG. 19. In the example in 382 in FIG. 38, for disposition of the second antenna, refer to the disposition of the second antenna in 381 in FIG. 38, namely, the conventional differential-mode feeding excitation solution in FIG. 5. In this way, when the first antenna and the second antenna operate, currents corresponding to the two excitations may be separately distributed on the radiation part, and current distribution respectively corresponding to the two excitations is different. Therefore, two high isolation radiation modes corresponding to the two excitations (namely, low-impedance common-mode feeding and high-impedance differential-mode feeding) can be obtained.

In an example in 383 in FIG. 38, the first antenna may use a low-impedance common-mode feeding implemented solution by an L-shaped probe. This solution corresponds to the antenna solution shown in FIG. 14. For a specific composition, refer to the descriptions for FIG. 14. In the example in 383 in FIG. 38, for disposition of the second antenna, refer to disposition of the magnetic ring probe solution in 281 in FIG. 28. It should be noted that in this example, magnetic field excitation of the magnetic ring probe is used for the second antenna, and therefore this differential-mode feeding may be low-impedance differential-mode feeding. In this way, when the first antenna and the second antenna operate, currents corresponding to the two excitations may be separately distributed on the radiation part, and current distribution respectively corresponding to the two excitations is different. Therefore, two high isolation radiation modes corresponding to the two excitations (namely, low-impedance common-mode feed and low-impedance differential-mode feed) can be obtained.

In an example in 384 in FIG. 38, the first antenna may use a low-impedance common-mode feeding solution implemented by using an L-shaped probe. This solution corresponds to the antenna solution shown in FIG. 14. For a specific composition, refer to the descriptions for FIG. 14. In the example in 384 in FIG. 38, for disposition of the second antenna, refer to disposition of the open short-slot probe solution in 282 in FIG. 28. It should be noted that in this example, magnetic field excitation of the open short-slot probe is used for the second antenna, and therefore this differential-mode feeding may be low-impedance differential-mode feeding. In this way, when the first antenna and the second antenna operate, currents corresponding to the two excitations may be separately distributed on the radiation part, and current distribution respectively corresponding to the two excitations is different. Therefore, two high isolation radiation modes corresponding to the two excitations (namely, low-impedance common-mode feed and low-impedance differential-mode feed) can be obtained.

The foregoing four solution implementations provided in FIG. 38 are merely examples. In another implementation, the first antenna and the second antenna may alternatively have different compositions. For example, an implementation of the first antenna and/or the second antenna may be different from that in the foregoing example. For another example, a relative location relationship between the first antenna and the second antenna may be different from that in the foregoing example.

In this embodiment of this application, the first antenna and/or the second antenna that are/is included in the antenna system may use based on coupling feeding. For example, an implementation of the first antenna may be any solution in FIG. 20. An implementation of the second antenna may be any solution in FIG. 29.

Figure 39:
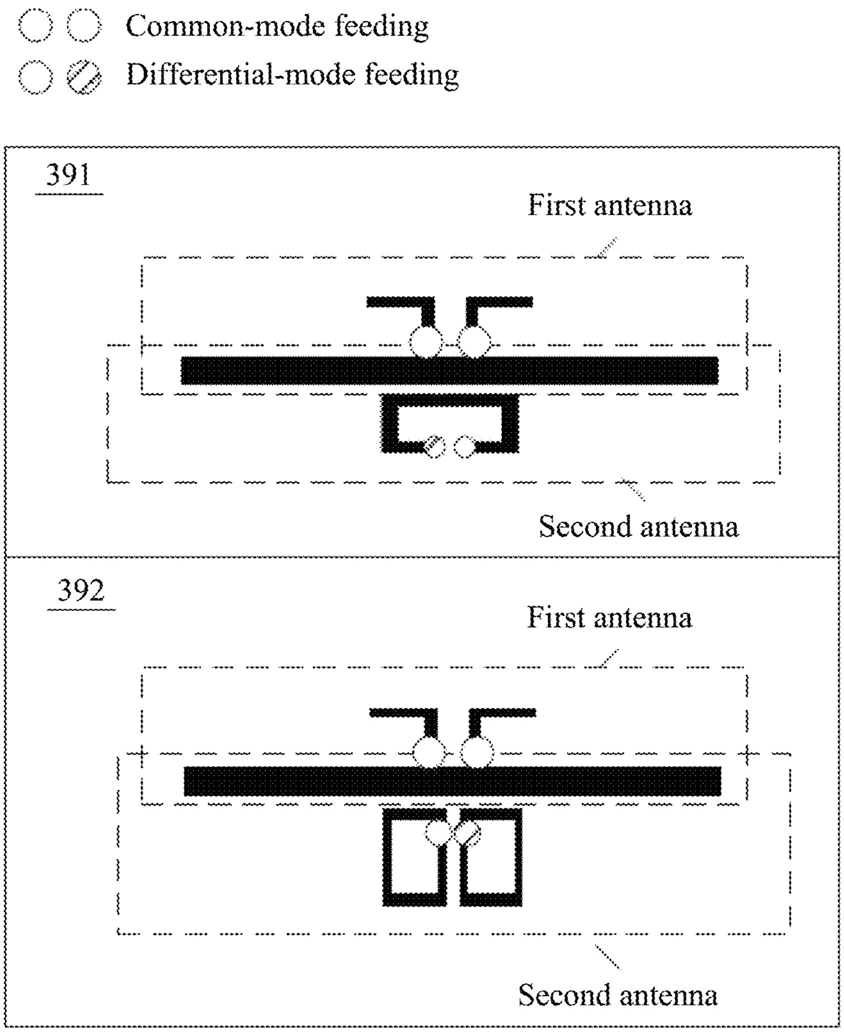
FIG. 39 is a schematic diagram of an implementation of an integration coupling feeding solution of an antenna system according to an embodiment of this application.

In an example, in FIG. 39, that the first antenna is based on direct feeding and the second antenna is based on coupling feeding is used as an example to describe some possible compositions.

In an example in 391 in FIG. 39, the first antenna may use a low-impedance common-mode feeding implemented solution by an L-shaped probe. This solution corresponds to the antenna solution shown in FIG. 14. For a specific composition, refer to the descriptions for FIG. 14. For example, the first antenna may include an excitation part and a radiation part. That the radiation part is a dipole antenna is used as an example. The excitation part may include two inverted L-shaped radiators disposed on the left and right through mirroring. A feeding point is separately disposed on the radiators of the excitation part perpendicular to the radiation part, to feed a low-impedance common-mode signal. The excitation part may be further connected to the radiation part at the feeding point. When the first antenna operates, a same-direction electric field may be generated between the radiation part and the excitation part parallel to the radiation part, to excite the radiation part to operate in the N-time wavelength mode. In the example in 391 in FIG. 39, the second antenna may use a magnetic ring probe solution based on coupling feeding. Disposition of the second antenna may correspond to the structural descriptions in 291 shown in FIG. 29. For example, the second antenna may include a radiation part shared with the first antenna. The second antenna may further include magnetic field excitation, and the magnetic field excitation may include an annular radiator. An opening is disposed on the annular radiator, and a feeding point is separately disposed at two ends of the opening, to feed a low-impedance differential-mode feeding signal. In some examples, a side on which the opening of the annular radiator is located may be away from the radiation part. The annular radiator corresponding to the magnetic field excitation may be disposed on a side of the excitation part, to excite, by using a magnetic field, the radiation part to perform N-time wavelength radiation. In this way, when the first antenna operates at the N-time wavelength (for example, the 1-time wavelength), a reverse current may be distributed at a middle location of the radiation part. When the second antenna operates at the 1-time wavelength, a non-reverse current may be distributed at the middle location of the radiation part. In this case, current distribution corresponding to the two excitations is different. Therefore, two high isolation radiation modes corresponding to the two excitations (namely, low-impedance common-mode feed and low-impedance differential-mode feed) can be obtained.

In an example in 392 in FIG. 39, the first antenna may use a low-impedance common-mode feeding solution implemented by using an L-shaped probe. This solution corresponds to the antenna solution shown in FIG. 14. For a specific composition, refer to the descriptions for FIG. 14. In the example in 392 in FIG. 39, the second antenna may be an open short-slot probe based on coupling feeding. Disposition of the second antenna may correspond to structural descriptions in 292 shown in FIG. 29. In this way, when the first antenna operates at the N-time wavelength (for example, the 1-time wavelength), a reverse current may be distributed at a middle location of the radiation part. When the second antenna operates at the 1-time wavelength, a non-reverse current may be distributed at the middle location of the radiation part. In this case, current distribution corresponding to the two excitations is different. Therefore, two high isolation radiation modes corresponding to the two excitations (namely, low-impedance common-mode feed and low-impedance differential-mode feed) can be obtained.

In some other embodiments of this application, in a design of the second antenna, a short dipole probe solution based on coupling feeding may be used. For example, the first antenna may use a low-impedance common-mode feeding solution implemented by using an L-shaped probe. This solution corresponds to the antenna solution shown in FIG. 14. For a specific composition, refer to the descriptions for FIG. 14. The second antenna may use the short dipole probe solution based on coupling feeding. In this way, when the first antenna operates at the N-time wavelength (for example, the 1-time wavelength), a reverse current may be distributed at a middle location of the radiation part. When the second antenna operates at the 1-time wavelength, a non-reverse current may be distributed at the middle location of the radiation part. In this case, current distribution corresponding to the two excitations is different. Therefore, two high isolation radiation modes corresponding to the two excitations (namely, low-impedance common-mode feed and low-impedance differential-mode feed) can be obtained.

The foregoing solution implementations provided in FIG. 39 are merely examples. In another implementation, the first antenna and the second antenna may alternatively have different compositions. For example, an implementation of the first antenna and/or the second antenna may be different from that in the foregoing example. For another example, a relative location relationship between the first antenna and the second antenna may be different from that in the foregoing example.

It should be understood that, in the foregoing solution examples in FIG. 38, a solution implementation in which both the first antenna and the second antenna are based on direct feeding is provided. In the solution examples in FIG. 39, a solution implementation in which the first antenna is based on direct feeding and the second antenna is based on coupling feeding is provided. In some other implementations of this application, the first antenna may alternatively be based on coupling feeding, and the corresponding second antenna based on direct feeding and the first antenna may form an antenna system with a high isolation characteristic. In some other embodiments, the first antenna may alternatively be based on coupling feeding, and the corresponding second antenna based on coupling feeding and the first antenna may form an antenna system with a high isolation characteristic.

The following describes, with reference to specific simulation, operating situations of several integration solutions provided in the embodiments of this application.

For example, FIG. 40-FIG. 44 show descriptions an operating situation of an antenna system with the composition shown in 382 in FIG. 38.

Figure 40:
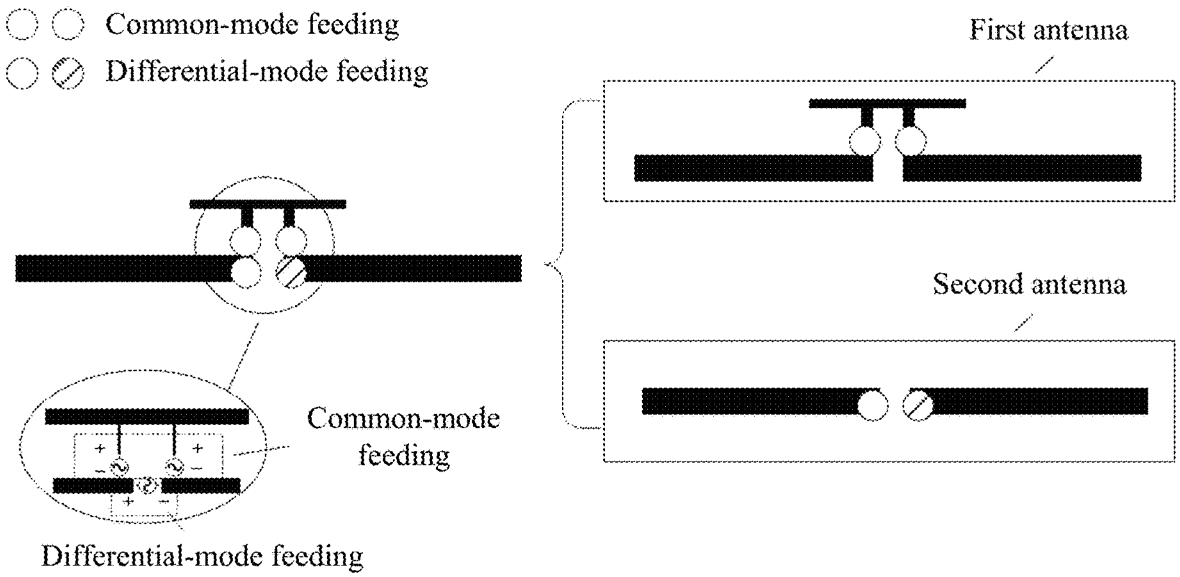
FIG. 40 is a schematic diagram of a specific composition of an antenna system according to an embodiment of this application.

As shown in FIG. 40, with reference to the foregoing descriptions for 382 in FIG. 38, the antenna system may include a first antenna and a second antenna. The first antenna may use a direct feeding solution in which excitation is performed by using a π-shaped probe. For example, the first antenna may include an excitation part disposed in a π-shape and a radiation part corresponding to a dipole antenna. Low-impedance common-mode feed may be disposed at a location (for example, two ends of the π-shaped structure close to the radiation part) at which the excitation part and the radiation part are connected. When the first antenna operates, the excitation part excites, by using a same-direction electric field generated between the excitation part and the radiation part, the radiation part to perform N-time wavelength radiation. A middle location of the radiation part may be a current reverse point. To enable a person skilled in the art to better understand an implementation of the solution, FIG. 40 also provides a solution for implementing common-mode feeding and differential-mode feeding.

In this example, the second antenna may use a conventional differential-mode feeding solution. To be specific, a feeding point is separately disposed at ends of two arms close to each other that are of the dipole antenna (namely, the radiation part of the first antenna), to feed a differential-mode signal. In this example, to enable the operating bands of the second antenna and the first antenna to overlap at least partially, for example, both operate on a 2.4 GHz band, a matching circuit may be added to a port of the second antenna while a differential-mode signal is fed to the second antenna, to tune the 1-time wavelength mode to be near 2.4 GHz close to the first antenna. It may be understood that, under excitation, a current at the middle location of the dipole antenna is not reversed.

In this way, because current distribution corresponding to two types of different excitation is different, the first antenna and the second antenna can have a high isolation characteristic during operating.

Figure 41:
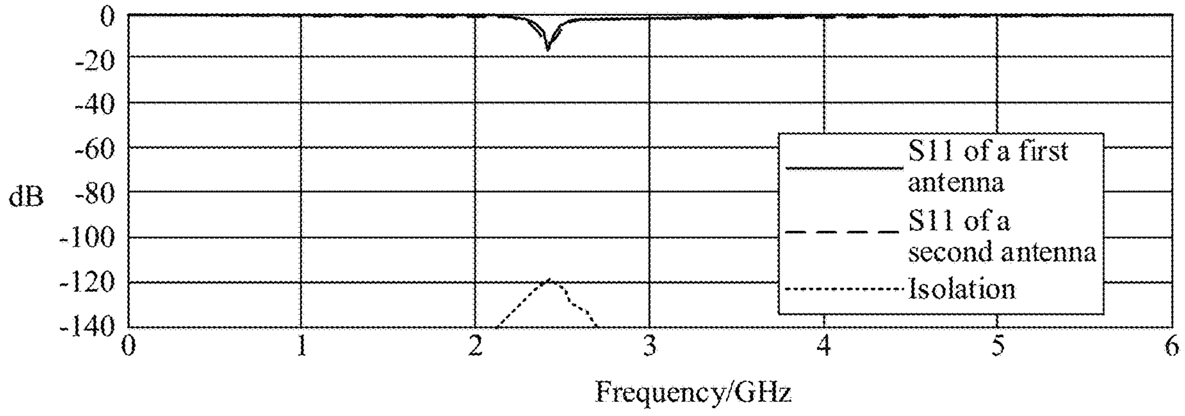
FIG. 41 is a schematic diagram of S parameter simulation of an antenna system according to an embodiment of this application.

FIG. 41 shows S parameter simulation of a first antenna and a second antenna when an antenna system with the composition shown in 382 in FIG. 38 operates. It can be seen that in this example, operating bands of both the first antenna and the second antenna cover 2.4 GHz. Isolation between the first antenna and the second antenna is also shown in FIG. 41. It can be seen that a curve of isolation between the first antenna and the second antenna reaches a highest level near 2.4 GHz, namely, −120 dB. It should be understood that, when isolation is less than −120 dB, operating of the first antenna and operating of the second antenna basically do not affect each other. In this case, it indicates that electromagnetic waves respectively excited when the first antenna and the second antenna operate have only a small amount of energy coupling within the band, and are in a close-to orthogonal state, so that the two antennas do not affect each other during operating.

Figure 42:
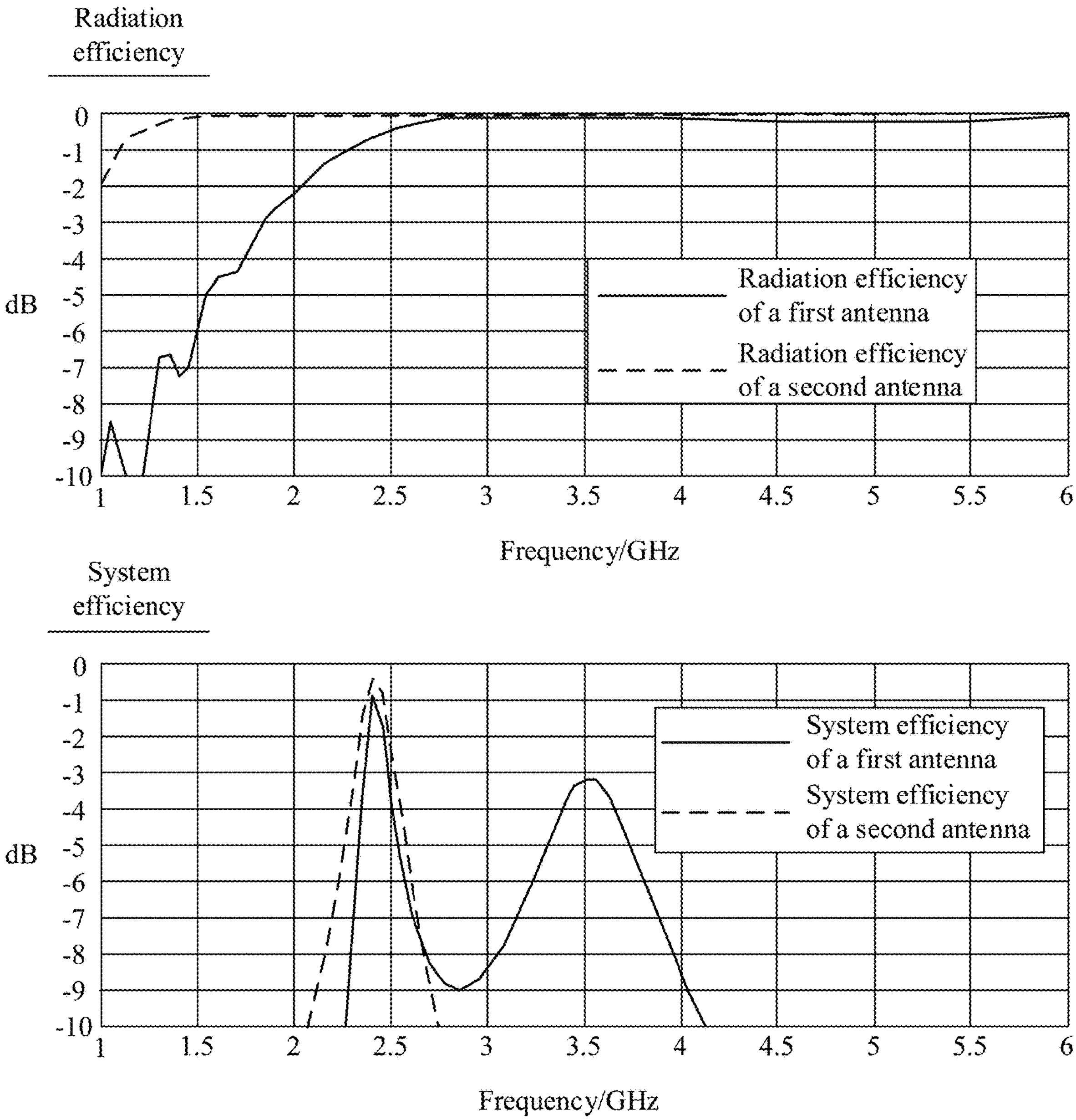
FIG. 42 is a schematic diagram of efficiency simulation of an antenna system according to an embodiment of this application.

FIG. 42 shows efficiency simulation of a structure shown in 382 in FIG. 38. From a perspective of radiation efficiency, radiation efficiency of the two antennas exceeds −1 dB near the operating band, for example, near 2.4 GHz. Therefore, good radiation performance can be obtained through port matching. From a perspective of system efficiency, when the two antennas operate near 2.4 GHz, peak efficiency of the first antenna reaches −1 dB and peak efficiency of the second antenna exceeds −0.5 dB, which proves that the two antennas can provide good coverage of the operating band during operating. It should be understood that because isolation between the two antennas is very good (less than −120 dB), the two antennas operate relatively independently, and can perform high efficiency radiation.

To further describe a high isolation mechanism shown in 382 in FIG. 38, the following continues to be described with reference to current simulation and pattern simulation.

Figure 43:
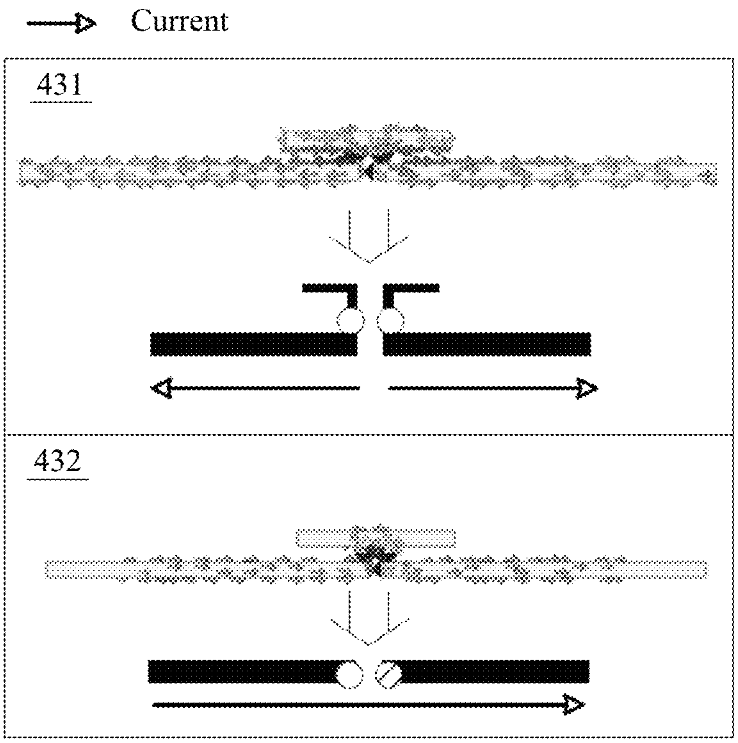
FIG. 43 is a schematic diagram of current simulation of an antenna system according to an embodiment of this application.

FIG. 43 shows current distribution simulation of a first antenna and a second antenna within an operating band (for example, a band near 2.4 GHz). 431 shows current distribution of the first antenna. It can be seen that the first antenna operates in the 1-time wavelength mode, and a current reverse point is distributed at the middle location of the radiation part. This characteristic is consistent with current distribution that is in the N-time wavelength mode in case of low-impedance common-mode feeding and that is provided in this application in the foregoing descriptions. Current distribution of the second antenna is shown in 432. A current flow direction in this simulation result is similar to that in current distribution at the 0.5-time wavelength shown in FIG. 5, that is, there is no current reverse point on the entire radiator. Therefore, although the operating bands of both the first antenna and the second antenna are near 2.4 GHz, there is a significant difference between current distribution.

Figure 44:
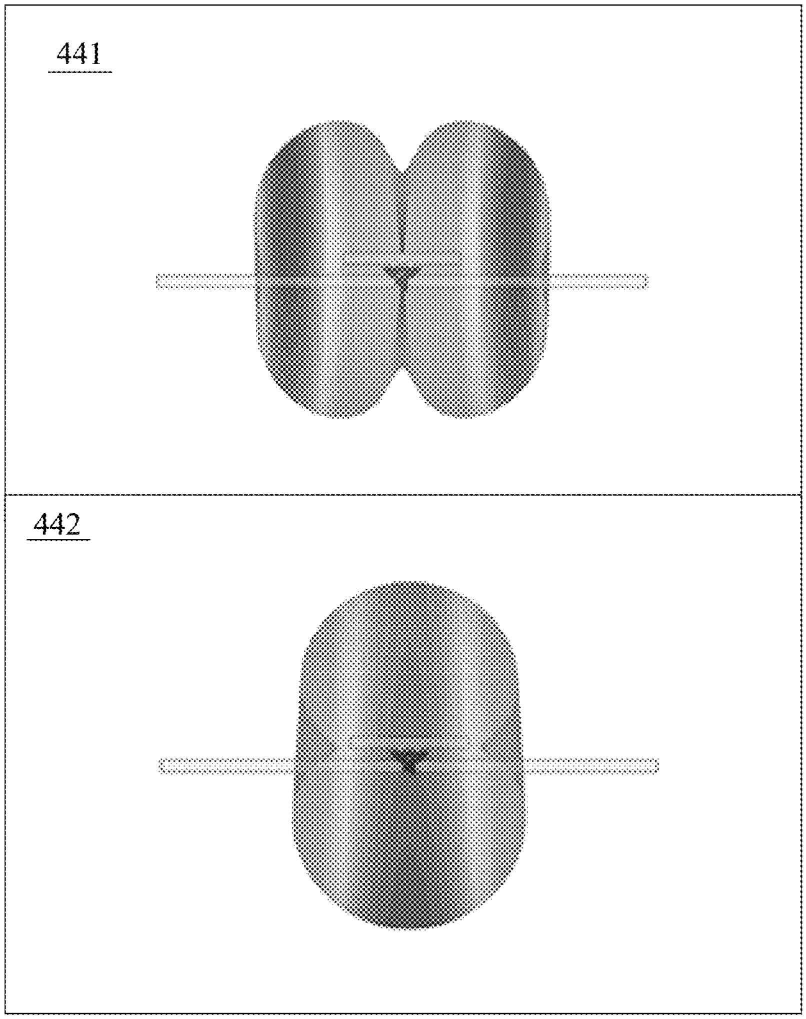
FIG. 44 is a schematic diagram of pattern simulation of an antenna system according to an embodiment of this application.

FIG. 44 shows pattern simulation of two antennas during operating. 441 shows a pattern of the first antenna during operating. It can be seen that a direction with a strong gain is mainly distributed on two sides in a lateral direction, and there is an obvious weak gain point in a longitudinal direction corresponding to a center axis of the antenna. The gain decrease corresponds to current reversal in 431 shown in FIG. 43. In comparison with a pattern of the second antenna shown in 442, when the second antenna operates, a direction with a strong gain of the second antenna is mainly distributed on in a longitudinal direction, and correspondingly, gains on two sides in a lateral direction are weak. Therefore, the first antenna and the second antenna have an orthogonal relationship in terms of gain distribution. In other words, when the second antenna and the first antenna operate, energy in space is basically not coupled with each other, so that a high isolation effect close to orthogonality is obtained.

With reference to FIG. 45-FIG. 49, the following provides descriptions of an operating situation of another antenna system provided in this application.

Figure 45:
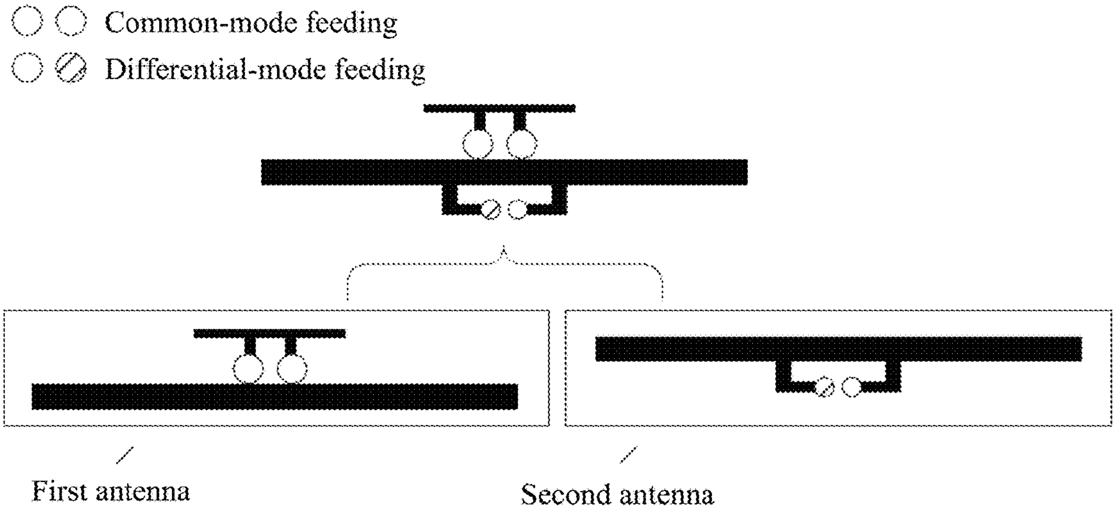
FIG. 45 is a schematic diagram of a specific composition of an antenna system according to an embodiment of this application.

As shown in FIG. 45, with reference to the foregoing descriptions in FIG. 38, in this example, the antenna system may include a first antenna and a second antenna. The first antenna may use a direct feeding solution in which excitation is performed by using a π-shaped probe. The first antenna may include an excitation part disposed in a π-shape and a radiation part corresponding to a dipole antenna. Low-impedance common-mode feed may be disposed at a location at which the excitation part and the radiation part are connected. When the first antenna operates, the excitation part excites, by using a same-direction electric field generated between the excitation part and the radiation part, the radiation part to perform N-time wavelength radiation. A middle location of the radiation part may be a current reverse point.

In this example, the magnetic ring probe solution shown in 383 in FIG. 38 may be used for the second antenna. For example, the magnetic ring probe may be an annular radiator on which an opening is disposed, and a feeding point is separately disposed at a location of the opening to feed a differential-mode signal. One side of the magnetic ring probe overlaps the radiation part. Magnetic field excitation of the magnetic ring probe is used for the second antenna, and therefore this differential-mode feeding may be low-impedance differential-mode feeding. Under this excitation, a current of the second antenna at the middle location of the dipole antenna is not reversed.

In this way, because current distribution corresponding to two types of different excitation is different, the first antenna and the second antenna can have a high isolation characteristic during operating.

Figure 46:
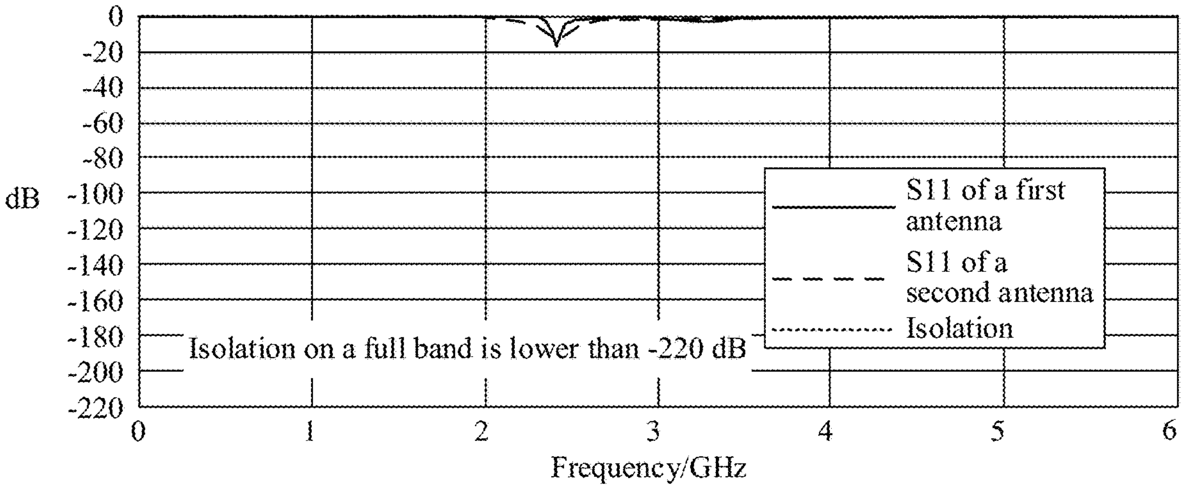
FIG. 46 is a schematic diagram of S parameter simulation of an antenna system according to an embodiment of this application.

FIG. 46 shows S parameter simulation of a first antenna and a second antenna when an antenna system with the composition shown in FIG. 45 operates. It can be seen that in this example, operating bands of both the first antenna and the second antenna cover 2.4 GHz. Isolation between the first antenna and the second antenna is also shown in FIG. 46. It can be seen that a curve of isolation between the first antenna and the second antenna is not included in FIG. 46, that is, isolation between the first antenna and the second antenna exceeds −220 dB within a band range of 6 GHz. In this case, it indicates that electromagnetic waves respectively excited when the first antenna and the second antenna operate have no energy coupling within the band, and are in a close-to or fully orthogonal state, so that the two antennas do not affect each other during operating.

Figure 47:
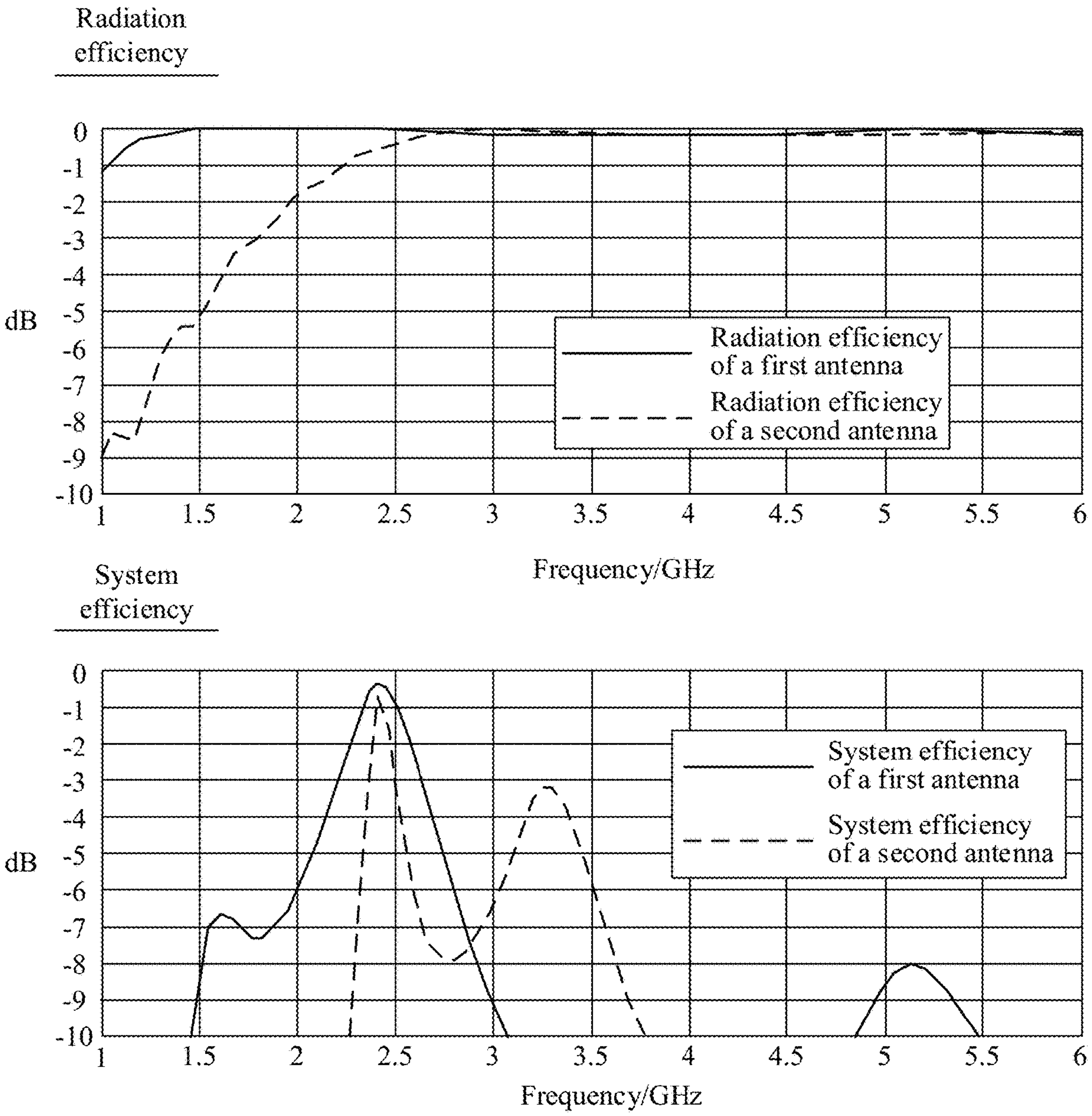
FIG. 47 is a schematic diagram of efficiency simulation of an antenna system according to an embodiment of this application.

FIG. 47 shows efficiency simulation of a structure shown in FIG. 45. From a perspective of radiation efficiency, radiation efficiency of the two antennas exceeds −1 dB near the operating band, for example, near 2.4 GHz. Therefore, good radiation performance can be obtained through port matching. From a perspective of system efficiency, when the two antennas operate near 2.4 GHz, peak efficiency of the first antenna exceeds −1 dB and peak efficiency of the second antenna exceeds −0.5 dB, which proves that the two antennas can provide good coverage of the operating band during operating. It should be understood that because isolation between the two antennas is very good (less than −220 dB), the two antennas operate relatively independently, and can perform high efficiency radiation.

To further describe a high isolation mechanism of the structure shown in FIG. 45, the following continues to be described with reference to current simulation and pattern simulation.

Figure 48:
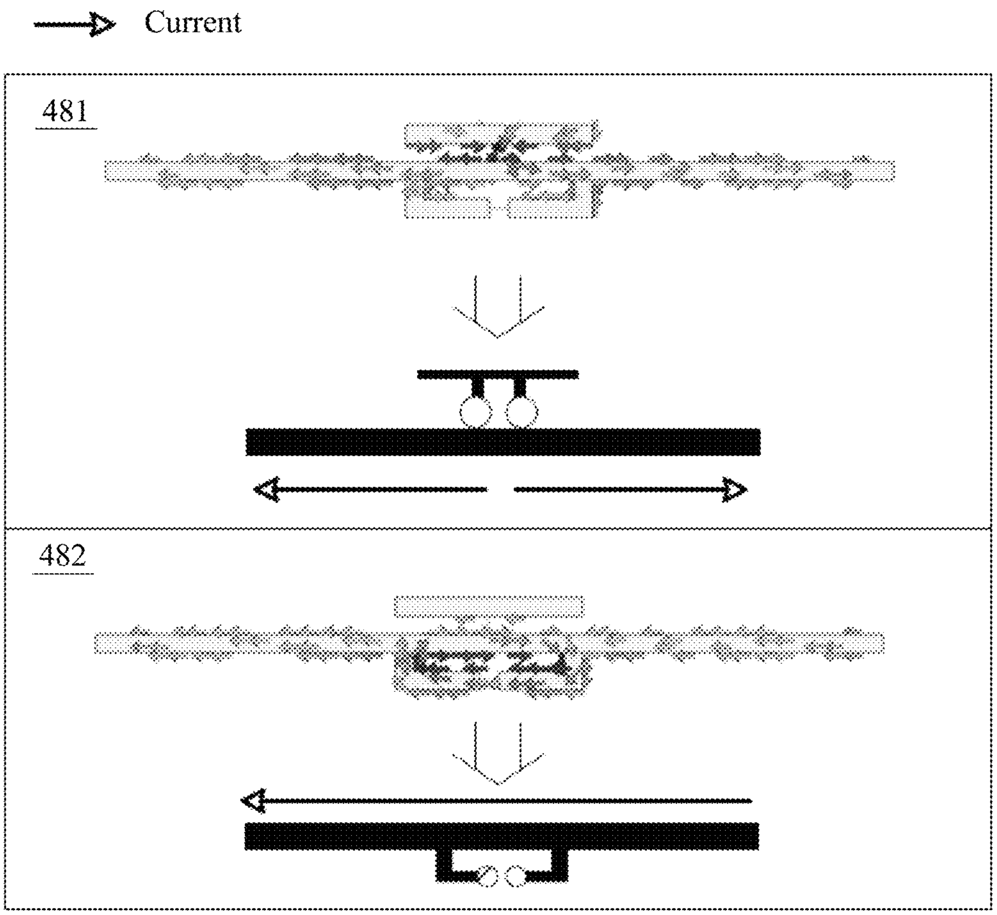
FIG. 48 is a schematic diagram of current simulation of an antenna system according to an embodiment of this application.

FIG. 48 shows current distribution simulation of a first antenna and a second antenna within an operating band (for example, a band near 2.4 GHz). 481 shows current distribution of the first antenna. It can be seen that the first antenna operates in the 1-time wavelength mode, and a current reverse point is distributed at the middle location of the radiation part. This characteristic is consistent with current distribution that is in the N-time wavelength mode in case of low-impedance common-mode feeding and that is provided in this application in the foregoing descriptions. Current distribution of the second antenna is shown in 482. It can be seen that, based on a magnitude change of a current, it is determined that the second antenna operates in the 1-time wavelength mode. A current flow direction in this simulation result is similar to that in current distribution at the 1-time wavelength shown in FIG. 5, that is, there is no current reverse point on the entire radiator. It should be noted that in this example, the magnetic ring probe disposed on the second antenna and a the radiator (namely, the radiation part of the first antenna, namely, the dipole antenna) of the second antenna are considered as a whole. In current simulation in 482, current directions on the dipole antenna on two sides of the magnetic ring probe are from right to left. A current direction on the magnetic ring probe is also from right to left. In this case, an overall current direction on the second antenna is from right to left. Therefore, although both the first antenna and the second antenna operate in the 1-time wavelength mode, there is a significant difference between current distribution.

Figure 49:
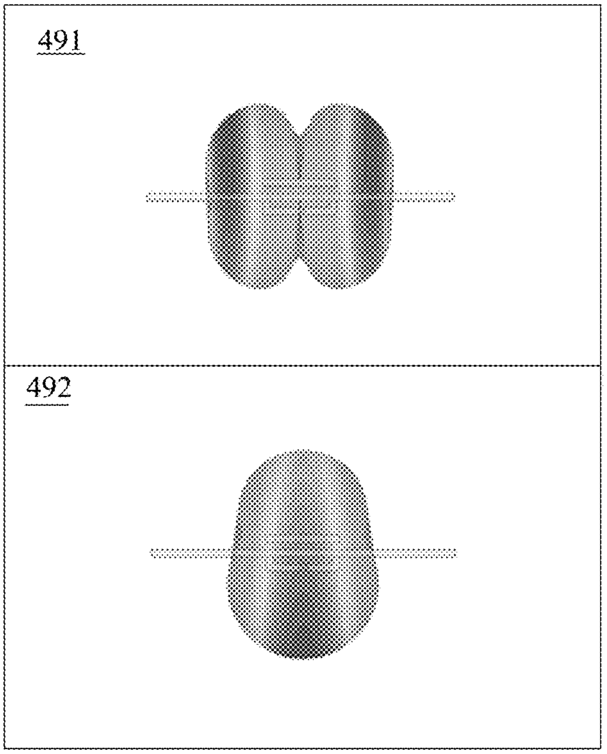
FIG. 49 is a schematic diagram of pattern simulation of an antenna system according to an embodiment of this application.

FIG. 49 shows pattern simulation of two antennas during operating. 491 shows a pattern of the first antenna during operating. It can be seen that a direction with a strong gain is mainly distributed on two sides in a lateral direction, and there is an obvious weak gain point in a longitudinal direction corresponding to a center axis of the antenna. The gain decrease corresponds to current reversal in 481 shown in FIG. 48. In comparison with a pattern of the second antenna shown in 492, when the second antenna operates, a direction with a strong gain of the second antenna is mainly distributed in a longitudinal direction, and correspondingly, gains on two sides in a lateral direction are weak. Therefore, the first antenna and the second antenna have an orthogonal relationship in terms of gain distribution. In other words, when the second antenna and the first antenna operate, energy in space is basically not coupled with each other, so that a high isolation effect close to orthogonality is obtained.

The foregoing solution examples in FIG. 40 and FIG. 45 are described by using an example in which feeding is performed by using a low-impedance feed. In some other embodiments, when low-impedance common-mode feeding is used for the first antenna, high-impedance feeding may be further used for the second antenna. For example, FIG. 50 shows a composition of another antenna system according to an embodiment of this application.

Figure 50:
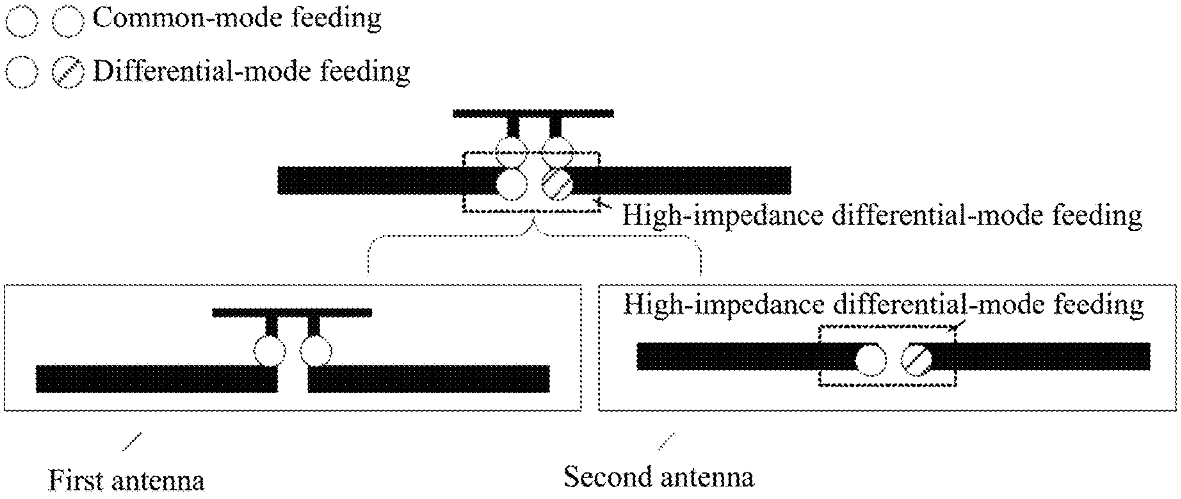
FIG. 50 is a schematic diagram of a specific composition of an antenna system according to an embodiment of this application.

As shown in FIG. 50, with reference to the foregoing descriptions for 381 in FIG. 38, the antenna system may include a first antenna and a second antenna. The first antenna may use a direct feeding solution in which excitation is performed by using a π-shaped probe. Disposition of the first antenna is similar to that of the first antenna shown in FIG. 40, and low-impedance common-mode feed may be disposed at a location at which an excitation part and a radiation part are connected. When the first antenna operates, the excitation part excites, by using a same-direction electric field generated between the excitation part and the radiation part, the radiation part to perform N-time wavelength radiation. A middle location of the radiation part may be a current reverse point. Disposition of the first antenna in this example may be similar to disposition of the first antenna in the antenna system shown in FIG. 40.

In this example, the second antenna may use a conventional high-impedance differential-mode feeding solution. To be specific, a feeding point is separately disposed at ends of two arms close to each other that are of a dipole antenna (namely, the radiation part of the first antenna), to feed a high-impedance differential-mode signal, so that the dipole antenna operates in the N-time wavelength mode for radiation. Under this excitation, a current at the middle location of the dipole antenna is not reversed.

In this way, because current distribution corresponding to two types of different excitation is different, the first antenna and the second antenna can have a high isolation characteristic during operating.

Figure 51:
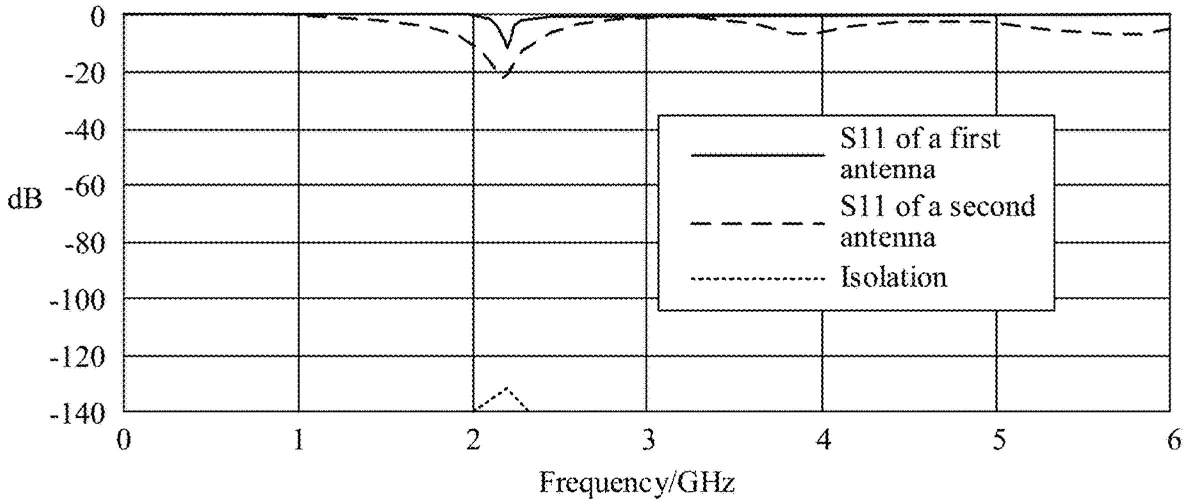
FIG. 51 is a schematic diagram of S parameter simulation of an antenna system according to an embodiment of this application.

FIG. 51 shows S parameter simulation of a first antenna and a second antenna when an antenna system with the composition shown in FIG. 50 operates. It can be seen that in this example, operating bands of both the first antenna and the second antenna cover 2.4 GHz. Isolation between the first antenna and the second antenna is also shown in FIG. 51. It can be seen that a curve of isolation between the first antenna and the second antenna reaches a highest level near 2.4 GHz, namely, below −130 dB. It should be understood that, when isolation is less than −130 dB, operating of the first antenna and operating of the second antenna basically do not affect each other. In this case, it indicates that electromagnetic waves respectively excited when the first antenna and the second antenna operate have no energy coupling within the band, and are in a close-to or fully orthogonal state, so that the two antennas do not affect each other during operating.

Figure 52:
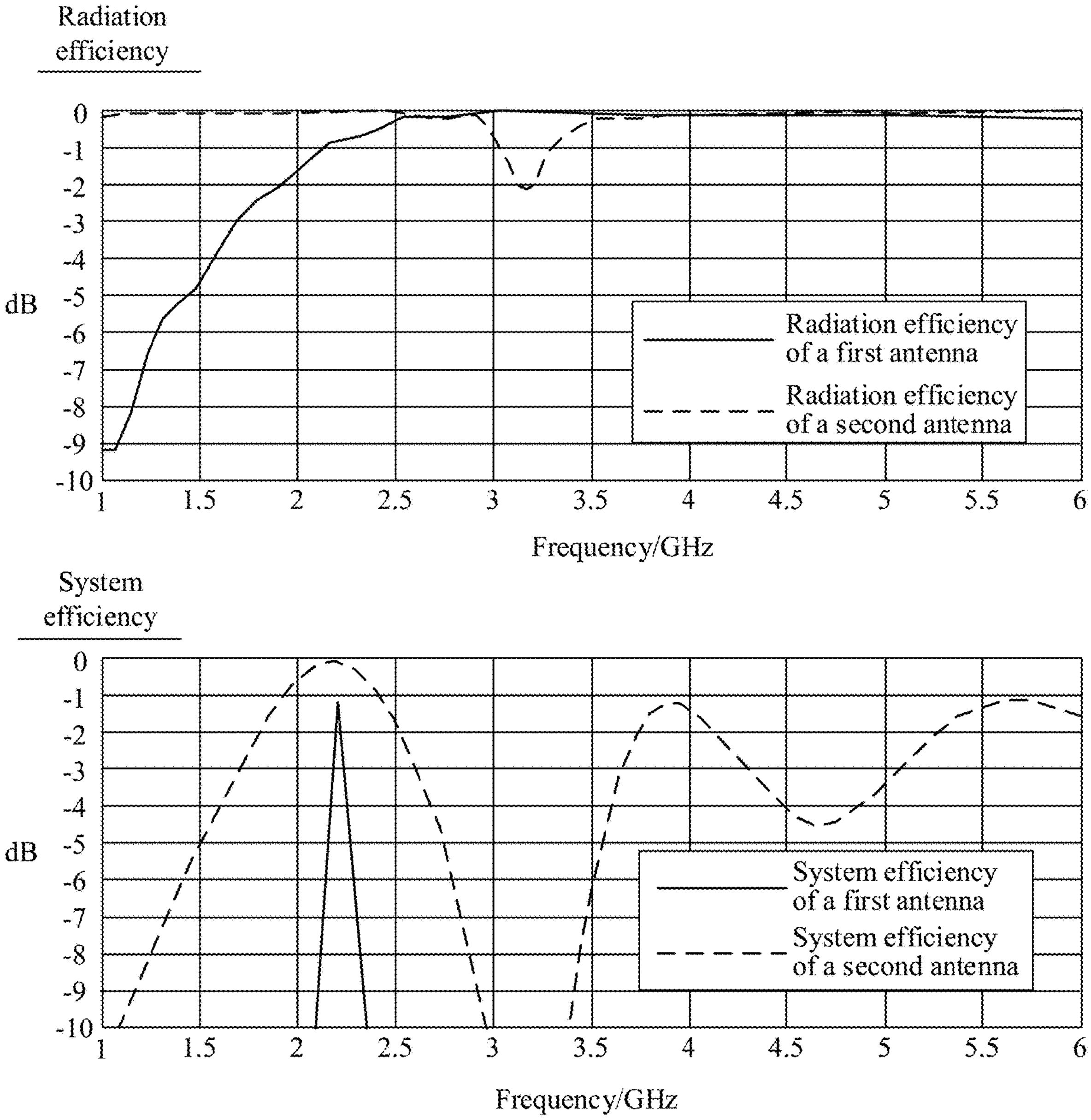
FIG. 52 is a schematic diagram of efficiency simulation of an antenna system according to an embodiment of this application.

FIG. 52 shows efficiency simulation of a structure shown in FIG. 50. From a perspective of radiation efficiency, when the two antennas are near the operating band, for example, near 2.4 GHz, radiation efficiency of the first antenna exceeds −1 dB and radiation efficiency of the second antenna is close to 0 dB. Therefore, good radiation performance can be obtained through port matching. From a perspective of system efficiency, when the two antennas operate near 2.4 GHz, peak efficiency of the first antenna reaches −1 dB and peak efficiency of the second antenna exceeds −0.5 dB, which proves that the two antennas can provide good coverage of the operating band during operating. It should be understood that because isolation between the two antennas is very good (less than −130 dB), the two antennas operate relatively independently, and can perform high efficiency radiation.

To further describe a high isolation mechanism of the structure shown in FIG. 50, the following continues to be described with reference to current simulation and pattern simulation.

Figure 53:
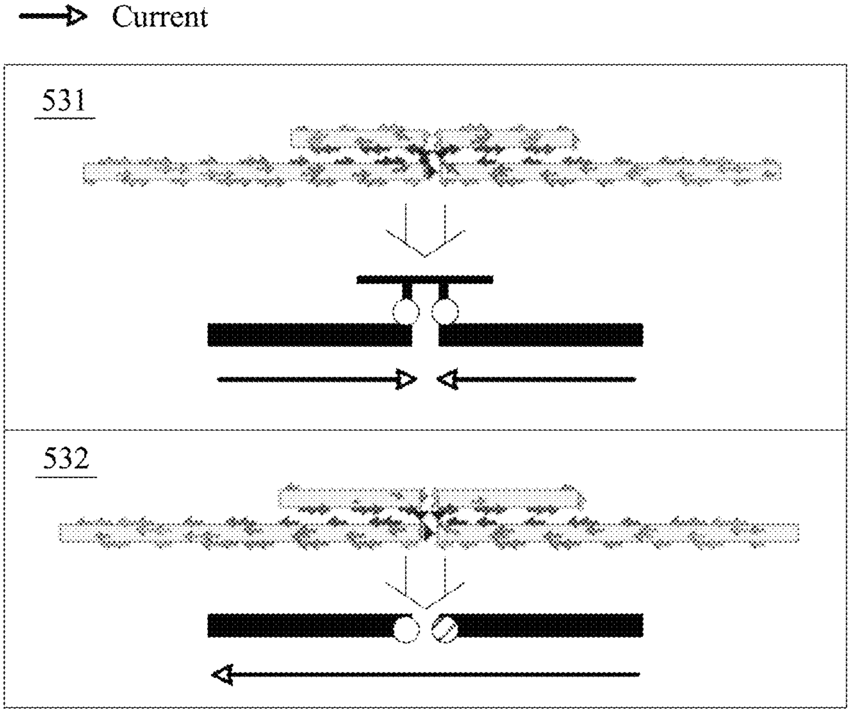
FIG. 53 is a schematic diagram of current simulation of an antenna system according to an embodiment of this application.

FIG. 53 shows current distribution simulation of a first antenna and a second antenna within an operating band (for example, a band near 2.4 GHz). 531 shows current distribution of the first antenna. It can be seen that the first antenna operates in the 1-time wavelength mode, and a current reverse point is distributed at the middle location of the radiation part. This characteristic is consistent with current distribution that is in the N-time wavelength mode in case of low-impedance common-mode feeding and that is provided in this application in the foregoing descriptions. Current distribution of the second antenna is shown in 532. It can be seen that, based on a magnitude change of a current, it is determined that the second antenna operates in the 1-time wavelength mode. A current flow direction in this simulation result is similar to that in current distribution at the 1-time wavelength shown in FIG. 5, that is, there is no current reverse point on the entire radiator. Therefore, although both the first antenna and the second antenna operate in the 1-time wavelength mode, there is a significant difference between current distribution.

Figure 54:
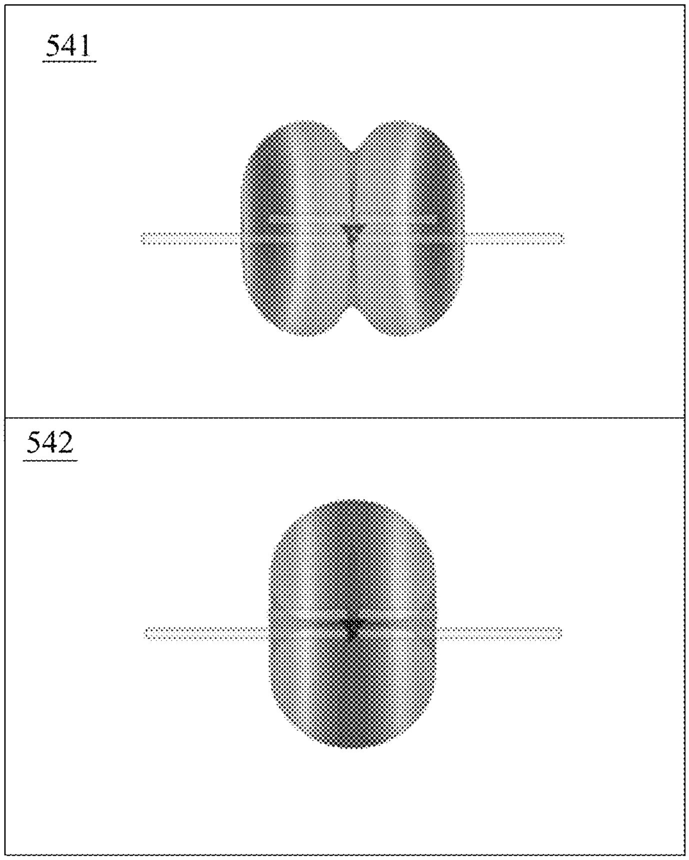
FIG. 54 is a schematic diagram of pattern simulation of an antenna system according to an embodiment of this application.

FIG. 54 shows pattern simulation of two antennas during operating. 541 shows a pattern of the first antenna during operating. It can be seen that a direction with a strong gain is mainly distributed on two sides in a lateral direction, and there is an obvious weak gain point in a longitudinal direction corresponding to a center axis of the antenna. The gain decrease corresponds to current reversal in 531 shown in FIG. 53. In comparison with a pattern of the second antenna shown in 542, when the second antenna operates, a direction with a strong gain of the second antenna is mainly distributed in a longitudinal direction, and correspondingly, gains on two sides in a lateral direction are weak. Therefore, the first antenna and the second antenna have an orthogonal relationship in terms of gain distribution. In other words, when the second antenna and the first antenna operate, energy in space is basically not coupled with each other, so that a high isolation effect close to orthogonality is obtained.

In the foregoing descriptions of the antenna system having a high isolation effect, that the radiation part playing a radiation role is a dipole antenna is used an example for description. With reference to the example in FIG. 30, in some other embodiments of this application, the radiation part may further have another composition. For example, the radiation part may be a symmetric square loop antenna, a symmetric circular loop antenna, and a symmetric polygon antenna.

The following continues to describe, by using an example in which the radiation part is a symmetric square loop antenna, the antenna system including a high isolation antenna provided in this embodiment of this application.

Figure 55:
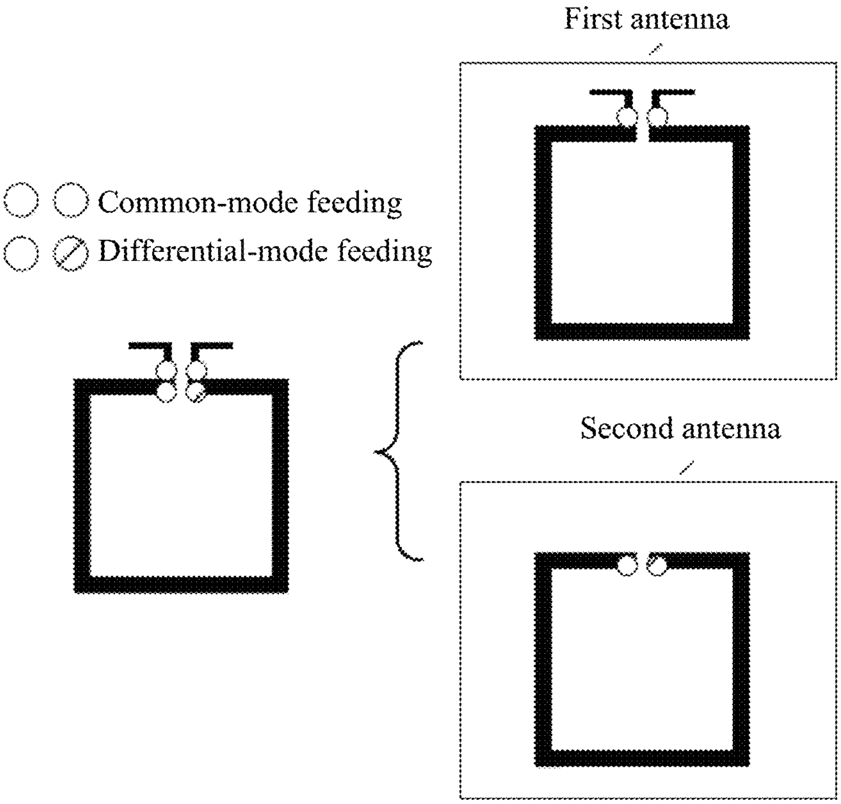
FIG. 55 is a schematic diagram of a specific composition of an antenna system according to an embodiment of this application.

For example, FIG. 55 shows another antenna system according to an embodiment of this application. In this example, the first antenna and the second antenna may be designed in an integrated structure. For example, the first antenna has the structure shown in FIG. 30. The second antenna may be fed by using a differential-mode feed. For example, the differential-mode feed may be disposed at two ends corresponding to an opening of the symmetric square loop antenna. In some embodiments, the differential-mode feed may use high impedance to excite the N-time wavelength for operating. In some other embodiments, the differential-mode feed may alternatively be a low-impedance feed. In this case, a similar wavelength mode is tuned to the N-time wavelength through port matching to cover a corresponding operating band. When the antenna operates, the first antenna may operate at the N-time wavelength (for example, the 1-time wavelength) under electric field excitation of the L-shaped probe shown in FIG. 55. Current distribution near the feed, namely, an opening location of a square annular radiator, may include a reverse point. The second antenna may cover the operating band under excitation of the foregoing differential-mode feed. An example in which the operating band is covered by using the N-time wavelength is used. On the second antenna, current distribution at the opening location of the square annular radiator may be in a same direction.

In the following example, that a peripheral side length of a the symmetric square loop antenna is 30 mm is used as an example for simulation description. This size does not constitute a limitation on the antenna solution provided in the example of this application.

Figure 56:
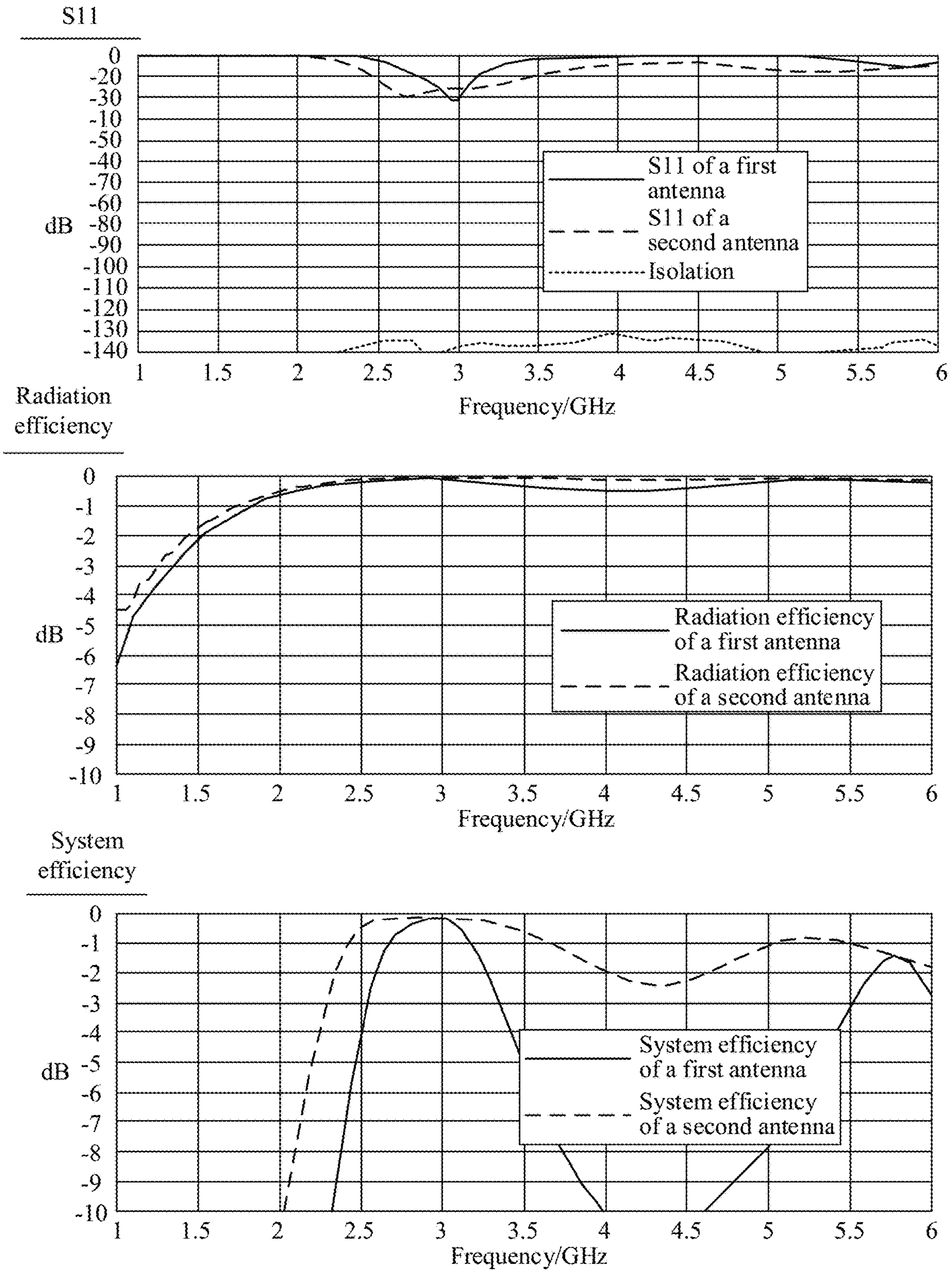
FIG. 56 is a schematic diagram of S parameter simulation of an antenna system according to an embodiment of this application.

For example, FIG. 56 shows S parameter simulation and efficiency simulation of a first antenna and a second antenna when an antenna system with the composition shown in FIG.

55 operates. It can be seen that in this example, operating bands of both the first antenna and the second antenna cover a band near 3 GHz. Isolation between the first antenna and the second antenna is also shown in S11 simulation in FIG. 56. It can be seen that a curve of isolation between the first antenna and the second antenna between 1 GHz-6 GHz is less than −130 dB. In this case, electromagnetic waves respectively excited when the first antenna and the second antenna operate have no energy coupling within the band, and are in a close-to or fully orthogonal state, so that the two antennas do not affect each other during operating.

Refer to efficiency simulation shown in FIG. 56. From a perspective of radiation efficiency, when the two antennas are near the operating band (for example, a band near 3 GHz), radiation efficiency of both the first antenna and the second antenna is close to 0 dB. Therefore, good radiation performance can be obtained through port matching. From a perspective of system efficiency, when the two antennas operate near 3 GHz, peak efficiency of both the first antenna and the second antenna exceeds −0.5 dB, which proves that the two antennas can provide good coverage of the operating band during operating. It should be understood that because isolation between the two antennas is very good (less than −130 dB), the two antennas operate relatively independently, and can perform high efficiency radiation.

To further describe a high isolation mechanism of the structure shown in FIG. 55, the following continues to be described with reference to current simulation and pattern simulation.

Figure 57:
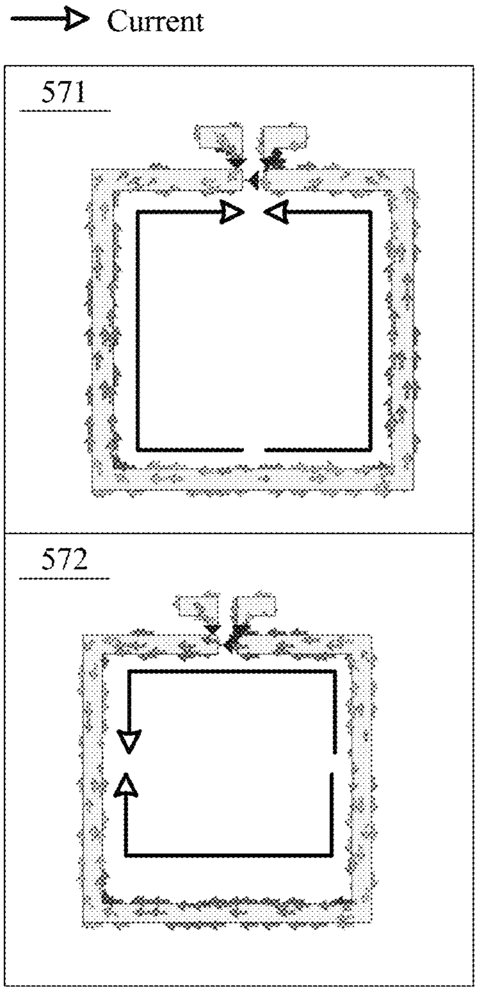
FIG. 57 is a schematic diagram of current simulation of an antenna system according to an embodiment of this application.
Figure 58:
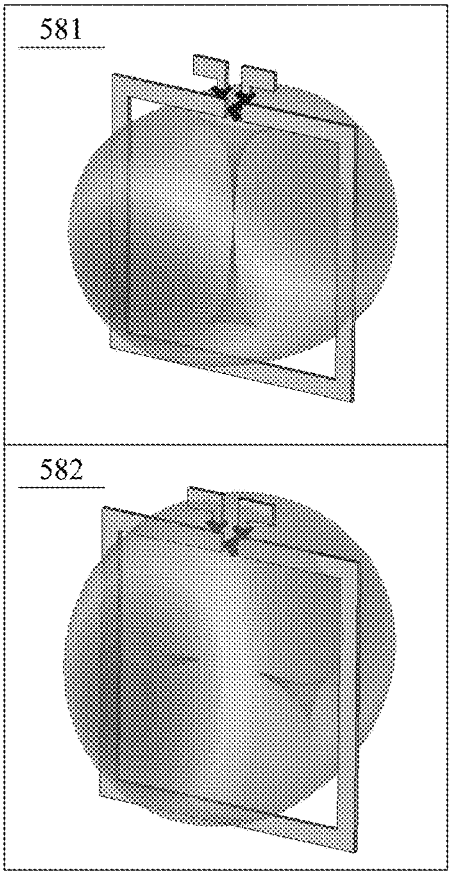
FIG. 58 is a schematic diagram of pattern simulation of an antenna system according to an embodiment of this application.

FIG. 57 shows current distribution simulation of a first antenna and a second antenna within an operating band (for example, a band near 3 GHz). 571 shows current distribution of the first antenna. It can be seen that the first antenna operates in the 1-time wavelength mode, and a current reverse point is distributed at the middle location of the radiation part (namely, an opening location of a square loop). This characteristic is consistent with current distribution that is in the N-time wavelength mode in case of low-impedance common-mode feeding and that is provided in this application in the foregoing descriptions. Current distribution of the second antenna is shown in 572. It can be seen that, based on a magnitude change of a current, it is determined that the second antenna operates in the 1-time wavelength mode. For a current flow direction in this simulation result, a current direction near the opening location of the square loop has a same direction characteristic. Therefore, although both the first antenna and the second antenna operate in the 1-time wavelength mode, there is a significant difference between current distribution. FIG. 58 shows pattern simulation of two antennas during operating. It can be seen that the two antennas have an orthogonal relationship in terms of gain distribution. In other words, when the second antenna and the first antenna operate, energy in space is basically not coupled with each other, so that a high isolation effect close to orthogonality is obtained.

Figure 59:
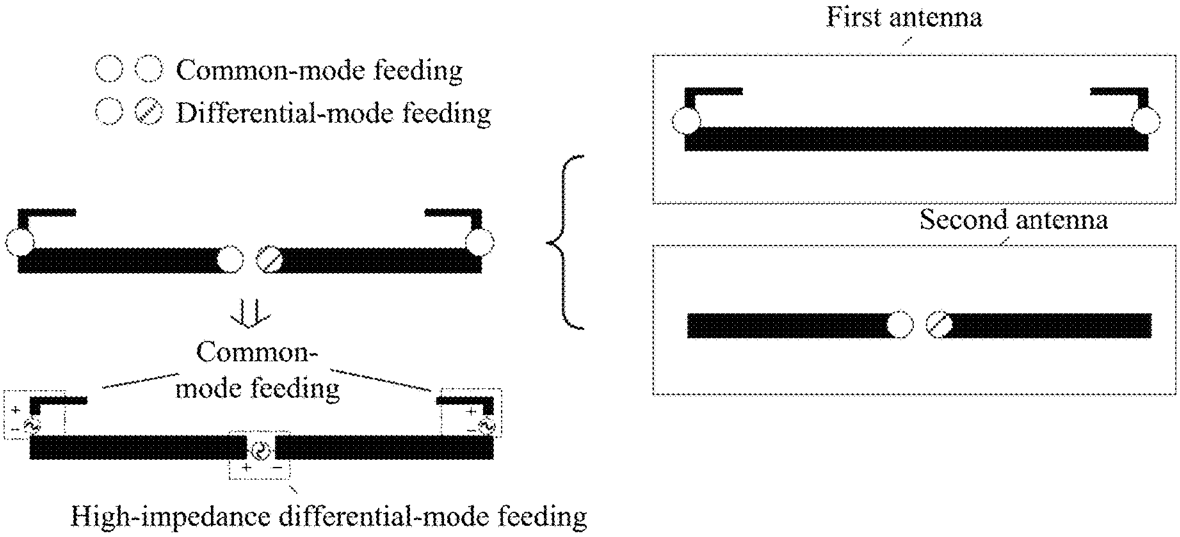
FIG. 59 is a schematic diagram of a specific composition of an antenna system according to an embodiment of this application.

In the foregoing examples of the antenna system provided in this application, the excitation part of the first antenna is disposed at the middle location of the radiation part for electric field excitation. With reference to the foregoing examples in FIG. 21-FIG. 26A, in some other embodiments, the excitation part of the first antenna may alternatively be disposed at two ends of the radiation part for electric field excitation. For example, the second antenna is a dipole antenna based on high-impedance differential-mode feeding. FIG. 59 shows an antenna system solution in which electric field excitation is performed at two ends of a first antenna. As shown in FIG. 59, the first antenna may include the composition of the antenna shown in FIG. 22, and the second antenna may be with high-impedance differential-mode feeding. Both the first antenna and the second antenna may operate in the N-time wavelength (for example, the 1-time wavelength) mode. A specific implementation of the antenna system is also provided in FIG. 59. For example, common-mode feeding may be implemented by using two feeds whose positive poles and negative poles are disposed in a same direction. For example, ends that are of the feeds and that are connected to the L-shaped probe may be the positive pole, and ends that are of the feeds and that are connected to the radiation part may be the negative pole. A direction in which a feed for high-impedance differential-mode feeding is connected to a positive pole and a negative pole may not be limited. Similar to the foregoing embodiments, an effect of high-impedance differential-mode feeding can be implemented.

Although this application is described with reference to specific features and embodiments, it is obvious that various modifications and combinations may be made to this application without departing from the spirit and scope of this application. Accordingly, the specification and the accompanying drawings are merely example descriptions of this application defined by the appended claims and are considered to cover any and all modifications, variations, combinations, or equivalents in the scope of this application. Clearly, a person skilled in the art can make various modifications and variations to this application without departing from the spirit and scope of this application. In this way, this application is also intended to include these modifications and variants made to this application if they fall within the scope of the claims and equivalent technologies thereof.

What is claimed is:

1. An electronic device, wherein the electronic device comprises a terminal antenna, the terminal antenna comprises a first antenna, and the first antenna comprises:
  - a first excitation part;
  - a first radiation part, wherein the first excitation part is disposed at a middle location of the first radiation part, the first excitation part is configured to excite the first radiation part to work in an N-time wavelength mode for radiation, N is a positive integer larger than 1, a plurality of current reverse points are distributed on the first radiation part, and one of the plurality of current reverse points is at the middle location of the first radiation part; and
  - a common-mode feed disposed between the first radiation part and the first excitation part, wherein the common-mode feed comprises one or two feeds disposed between the first excitation part and the first radiation part.

2. The electronic device according to claim 1, wherein the first excitation part is configured to generate an electric field between the first excitation part and the first radiation part under excitation of the common-mode feed, and the electric field excites the first radiation part for radiation.

3. The electronic device according to claim 1, wherein the first antenna comprising the first excitation part and the first radiation part is an axisymmetric structure, and an axis of symmetry of the axisymmetric structure is a perpendicular bisector of a radiator of the first radiation part.

4. The electronic device according to claim 1, wherein;
  - the middle location of the first radiation part is a point with a large eigenmode electric field at an N-time wavelength of the first radiation part.

5. The electronic device according to claim 1, wherein the common-mode feed is a low-impedance feed, and port impedance of the low-impedance feed is less than 100 ohms.

6. The electronic device according to claim 1, wherein:
  - the common-mode feed comprises two feeds;
  - the first excitation part comprises two inverted L-shaped radiators that are not connected to each other; and one arm of each of the two inverted L-shaped radiators is connected to the first radiation part by using a corresponding feed of the two feeds, and ends of the two inverted L-shaped radiators away from the corresponding feed are away from each other.

7. The electronic device according to claim 1, wherein:

a coupling radiator is disposed on the first excitation part, the coupling radiator is disposed between the common-mode feed and the first radiation part, the coupling radiator is connected to the first excitation part by using the common-mode feed, and the coupling radiator is coupled to the first radiation part through coupling by using a slot between the coupling radiator and the first radiation part.

8. The electronic device according to claim 7, wherein:

the common-mode feed comprises two feeds;

the first excitation part comprises two inverted L-shaped radiators that are not connected to each other; and one arm of each of the two inverted L-shaped radiators is connected to the coupling radiator by using a corresponding feed of the two feeds, and ends of the two inverted L-shaped radiators away from the corresponding feed are away from each other.

9. The electronic device according to claim 1, wherein the first radiation part comprises any one of the following:

a dipole antenna, a symmetric square loop antenna, a symmetric circular loop antenna, or a symmetric polygon antenna.

10. The electronic device according to claim 1, wherein:

the terminal antenna further comprises a second antenna, a differential-mode feed is disposed on the second antenna, and the second antenna comprises a second radiation part;

the differential-mode feed of the second antenna is disposed at a middle location of the second radiation part, and is parallel to the common-mode feed of the first antenna; and the first radiation part is the second radiation part, or the first radiation part and the second radiation part are two different radiation parts.

11. The electronic device according to claim 10, wherein a current at the middle location of the second radiation part of the second antenna is not reversed.

12. The electronic device according to claim 11, wherein the first radiation part and the second radiation part are two different radiation parts;

the first antenna and the second antenna are not connected to each other, and the first antenna operates in the N-time wavelength mode; and the second antenna operates in the N-time wavelength mode, or the second antenna operates in another mode different from the N-time wavelength mode.

13. The electronic device according to claim 10, wherein:

the first radiation part is the second radiation part; and both the first antenna and the second antenna operate in the N-time wavelength mode.

14. The electronic device according to claim 10, wherein the second radiation part of the second antenna is a dipole antenna.

15. The electronic device according to claim 10, wherein:

a second excitation part is further disposed on the second antenna, and the second excitation part is disposed at the middle location of the second radiation part;

the second excitation part comprises a U-shaped structure radiator, two ends of the U-shaped structure radiator are separately connected to the second radiation part, and a differential-mode feed connected in series is disposed at the bottom of the U-shaped structure radiator; or the second excitation part comprises two U-shaped structure radiators, the two U-shaped structure radiators are not connected to each other and have openings in a same direction, one feed is disposed on each of ends of the two U-shaped structure radiators close to each other, and is connected to the second radiation part, ends of the two U-shaped structure radiators away from each other are separately connected to the second radiation part directly, and feeds on the two U-shaped structure radiators are separately configured to feed an equal-amplitude phase-inverted differential-mode feeding signal.

16. The electronic device according to claim 10, wherein:

a second excitation part is further disposed on the second antenna, the second excitation part is disposed at the middle location of the second radiation part, and the second excitation part and the second radiation part are not connected to each other;

the second excitation part comprises an annular structure radiator, and a differential-mode feed is connected in series on the annular structure radiator; or the second excitation part comprises two annular structure radiators, the two annular structure radiators are disposed axisymmetrically, two feeds are respectively disposed on sides of the two annular structure radiators close to each other, and the two feeds are separately configured to feed an equal-amplitude phase-inverted differential-mode feeding signal.

17. The electronic device according to claim 15, wherein when the second antenna operates, the second antenna operates in a 0.5*M-time wavelength mode, and M is an odd number.

18. The electronic device according to claim 16, wherein when the second antenna operates, the second antenna operates in a 0.5*M-time wavelength mode, and M is an odd number.

19. An electronic device, wherein the electronic device comprises a terminal antenna, and the terminal antenna comprises:

a first excitation part;

a first radiation part, wherein a radiator of the first excitation part comprises two parts, the two parts are respectively disposed at two ends of the first radiation part, the first excitation part is configured to excite the first radiation part to work in an N-time wavelength mode for radiation, N is a positive integer larger than 1, a plurality of current reverse points are distributed on the first radiation part, and one of the plurality of current reverse points is at a middle location of the first radiation part; and common-mode feeds respectively disposed on the two parts of the radiator of the first excitation part, and the common-mode feeds comprise two feeds disposed between the first excitation part and the first radiation part.

20. The electronic device according to claim 19, wherein the radiator of the first excitation part is an inverted L-shaped structure or a vertical structure.

* * * * *